US012804739B2

(12) United States Patent
B S et al.

(10) Patent No.: US 12,804,739 B2
(45) Date of Patent: Nov. 17, 2026

(54) DEPLOYMENT OF A PRIVATE NETWORK USING INTEGRATION WITH A TRUSTED BACKUP NETWORK

(71) Applicant: QUALCOMM Incorporated, San Diego, CA (US)

(72) Inventors: Sankara Subramaniam B S, Bengaluru (IN); Subramanian Anantharaman, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 355 days.

(21) Appl. No.: 18/359,750

(22) Filed: Jul. 26, 2023

(65) Prior Publication Data

US 2025/0039959 A1 Jan. 30, 2025

(51) Int. Cl.
*H04W 76/12* (2018.01)
*H04W 24/10* (2009.01)
(Continued)

(52) U.S. Cl.
CPC ........... *H04W 76/12* (2018.02); *H04W 24/10* (2013.01); *H04W 60/005* (2013.01); *H04W 76/15* (2018.02); *H04W 88/16* (2013.01)

(58) Field of Classification Search
CPC . H04W 24/10; H04W 28/24; H04W 74/8363; H04W 76/10; H04W 76/12
(Continued)

(56) References Cited

U.S. PATENT DOCUMENTS

2016/0095018 A1* 3/2016 Vajapeyam ....... H04W 74/0833 370/331
2019/0124544 A1* 4/2019 Shaw .................... H04W 28/24
(Continued)

OTHER PUBLICATIONS

M. Chen, J. Wan, S. Gonzalez, X. Liao and V. C. M. Leung, "A Survey of Recent Developments in Home M2M Networks," in IEEE Communications Surveys & Tutorials, vol. 16, No. 1, pp. 98-114, First Quarter 2014, doi: 10.1109/SURV.2013.110113.00249. (Year: 2014).*
(Continued)

*Primary Examiner* — William D Cumming
(74) *Attorney, Agent, or Firm* — HOLLAND & HART LLP

(57) ABSTRACT

Methods, systems, and devices for wireless communications are described. In some systems, a first network type may be integrated with a second network type during deployment of the second network type. The first network type may support communications of a first radio access technology (RAT) via unlicensed radio frequency (RF) bands and the second network type may support communications of a second RAT via unlicensed RF bands, licensed RF bands, or both. A gateway function of the first network type may establish an interface with a network intelligent controller of the second network type. The gateway function may receive a request to connect with a wireless device based on a failed connection between the device and the second network type. The gateway function may indicate the connection with the wireless device to the network intelligent controller. The network intelligent controller may perform a communication management operation based on the indication.

30 Claims, 25 Drawing Sheets

(51) Int. Cl.
*H04W 60/00* (2009.01)
*H04W 76/15* (2018.01)
*H04W 88/16* (2009.01)

(58) Field of Classification Search
USPC .................................................. 370/235, 331
See application file for complete search history.

(56) References Cited

U.S. PATENT DOCUMENTS

| | | | | |
|---|---|---|---|---|
| 2023/0007576 A1* | 1/2023 | Akman | ................. | H04W 76/10 |
| 2023/0199870 A1* | 6/2023 | Peng | ..................... | H04W 76/10<br>370/235 |
| 2025/0039959 A1* | 1/2025 | B S | ....................... | H04W 76/12 |

OTHER PUBLICATIONS

ETSI: "5G, Procedures for the 5G System (5GS) (3GPP TS 23.502 version 16.16.0 Release 16)", Technical Specification, ETSI TS 123 502 V16.16.0 (Jul. 23, 2023), 618 Pages.

* cited by examiner

DEPLOYMENT OF A PRIVATE NETWORK USING INTEGRATION WITH A TRUSTED BACKUP NETWORK

FIELD OF TECHNOLOGY

The following relates to wireless communications, including deployment of a private network using integration with a trusted backup network.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support a private network, which may be a non-public mobile network that may use licensed, unlicensed, or shared radio frequency (RF) spectrum bands. The private network may be intended for private (e.g., non-public use) by a customer or organization.

SUMMARY

The described techniques relate to improved methods, systems, devices, and apparatuses that support deployment of a private network using integration with a trusted backup network. For example, the described techniques provide for integration of a first network type with a second network type to facilitate deployment of the second network type. The first network type may support communications of a first radio access technology (RAT) via unlicensed radio frequency (RF) bands (e.g., a Wi-Fi network, or some other type of network). The second network type may support communications of a second RAT via unlicensed RF bands, licensed RF bands, or both (e.g., a 3rd Generation Partnership Project (3GPP) network, or some other type of network). A gateway function of the first network type may establish a first interface with a first network intelligent controller of the second network type. The gateway function may establish a second interface with a second network intelligent controller of the second network type. The first and second interfaces may be referred to as E2tr and O2t interfaces, respectively, in some examples.

The gateway function may receive a request to connect with a wireless device (e.g., a user equipment (UE)) based on a failed connection between the device and the second network type. The gateway function may establish a connection with the wireless device and indicate the connection with the wireless device to the first network intelligent controller. The first network intelligent controller may perform a communication management operation based on the indication. The gateway function of the first network type may continue to monitor one or more key performance indicators (KPIs) associated with a connection between the wireless device and the second network type. The gateway function may forward the KPIs to the second network intelligent controller periodically via the second interface. The second network intelligent controller may perform a communication management operation for one or more network entities of the second network type based on the KPIs. The communication management operations may adjust one or more parameters associated with the second network type to improve a subsequent connection attempt with the wireless device. The wireless device may subsequently re-connect to the second network type.

A method for wireless communication at a gateway function of a first network type is described. The method may include receiving a first message including a first request to establish, as part of a network integration, an interface between the gateway function of the first network type and a network intelligent controller of a second network type, where the first network type supports communications of a first RAT via unlicensed RF spectrum bands and the second network type supports communications of a second RAT via unlicensed RF spectrum bands, licensed RF spectrum bands, or both, the second RAT different than the first RAT, receiving, based on the network integration and a failed connection between a wireless device and the second network type, a second message including a second request to establish a connection with the wireless device in accordance with the first RAT, the failed connection associated with the second RAT, and transmitting, to the network intelligent controller of the second network type via the interface, a third message indicating that the connection between the gateway function of the first network type and the wireless device is established.

An apparatus for wireless communication at a gateway function of a first network type is described. The apparatus may include at least one processor, at least one memory coupled with the at least one processor, and instructions stored in the at least one memory. The instructions may be executable by the at least one processor to cause the apparatus to receive a first message including a first request to establish, as part of a network integration, an interface between the gateway function of the first network type and a network intelligent controller of a second network type, where the first network type supports communications of a first RAT via unlicensed RF spectrum bands and the second network type supports communications of a second RAT via unlicensed RF spectrum bands, licensed RF spectrum bands, or both, the second RAT different than the first RAT, receive, based on the network integration and a failed connection between a wireless device and the second network type, a second message including a second request to establish a connection with the wireless device in accordance with the first RAT, the failed connection associated with the second RAT, and transmit, to the network intelligent controller of the second network type via the interface, a third message indicating that the connection between the gateway function of the first network type and the wireless device is established.

Another apparatus for wireless communication at a gateway function of a first network type is described. The apparatus may include means for receiving a first message including a first request to establish, as part of a network integration, an interface between the gateway function of the first network type and a network intelligent controller of a second network type, where the first network type supports communications of a first RAT via unlicensed RF spectrum bands and the second network type supports communications of a second RAT via unlicensed RF spectrum bands, licensed RF spectrum bands, or both, the second RAT different than the first RAT, means for receiving, based on the network integration and a failed connection between a wireless device and the second network type, a second message including a second request to establish a connection with the wireless device in accordance with the first RAT, the failed connection associated with the second RAT, and means for transmitting, to the network intelligent controller of the second network type via the interface, a third message indicating that the connection between the gateway function of the first network type and the wireless device is established.

A non-transitory computer-readable medium storing code for wireless communication at a gateway function of a first network type is described. The code may include instructions executable by a processor to receive a first message including a first request to establish, as part of a network integration, an interface between the gateway function of the first network type and a network intelligent controller of a second network type, where the first network type supports communications of a first RAT via unlicensed RF spectrum bands and the second network type supports communications of a second RAT via unlicensed RF spectrum bands, licensed RF spectrum bands, or both, the second RAT different than the first RAT, receive, based on the network integration and a failed connection between a wireless device and the second network type, a second message including a second request to establish a connection with the wireless device in accordance with the first RAT, the failed connection associated with the second RAT, and transmit, to the network intelligent controller of the second network type via the interface, a third message indicating that the connection between the gateway function of the first network type and the wireless device is established.

In some examples of the method, apparatuses, and non-transitory computer-readable medium described herein, receiving the second message may include operations, features, means, or instructions for receiving an indication of a globally unique temporary identifier (GUTI), an international mobile subscriber identity (IMSI), a subscription permanent identifier (SUPI), public land mobile network identifier (PLMN), network slice assistance information (NSAI), or any combination thereof associated with the wireless device.

In some examples of the method, apparatuses, and non-transitory computer-readable medium described herein, receiving the second message may include operations, features, means, or instructions for receiving an early access protocol message that indicates an identifier (ID) of the wireless device and indicates the second request to establish the connection with the wireless device.

Some examples of the method, apparatuses, and non-transitory computer-readable medium described herein may further include operations, features, means, or instructions for transmitting, via the third message based on establishing the connection with the wireless device, an ID of the wireless device and an ID of an access point (AP) associated with the first network type.

Some examples of the method, apparatuses, and non-transitory computer-readable medium described herein may further include operations, features, means, or instructions for establishing a second interface between the gateway function of the first network type and a second network intelligent controller of the second network type.

Some examples of the method, apparatuses, and non-transitory computer-readable medium described herein may further include operations, features, means, or instructions for monitoring a registration between the wireless device and the second network type and transmitting, via the second interface, a fourth message that indicates the registration between the wireless device and the second network type may be successful, where the fourth message includes an ID of the wireless device and an ID of an AP associated with the first network type.

Some examples of the method, apparatuses, and non-transitory computer-readable medium described herein may further include operations, features, means, or instructions for measuring one or more KPIs associated with a second connection between the wireless device and the second network type and transmitting, via the second interface and in accordance with a periodicity, an indication of the one or more KPIs.

Some examples of the method, apparatuses, and non-transitory computer-readable medium described herein may further include operations, features, means, or instructions for receiving, via the second interface, an indication that values of the one or more KPIs exceed a threshold, where the indication includes a trigger to disable the connection between the wireless device and the gateway function, disabling the connection between the wireless device and the gateway function based on the indication, and disabling the interface and the second interface based on the indication.

Some examples of the method, apparatuses, and non-transitory computer-readable medium described herein may further include operations, features, means, or instructions for receiving a resource release request based on a quality of a second connection between the wireless device and the second network type exceeding a threshold quality, disabling the connection between the gateway function of the first network type and the wireless device based on the resource release request, and transmitting, based on disabling the connection, an acknowledgment message responsive to the resource release request.

Some examples of the method, apparatuses, and non-transitory computer-readable medium described herein may further include operations, features, means, or instructions for monitoring a registration between the wireless device and the second network type and transmitting, via the interface, a fourth message indicating that the registration between the wireless device and the second network type failed, where the fourth message includes an ID of the wireless device and an ID of an AP associated with the first network type.

In some examples of the method, apparatuses, and non-transitory computer-readable medium described herein, the first network type includes a trusted non-third generation partnership project (3GPP) network and the second network type includes a 3GPP network.

A method for wireless communication at a network intelligent controller of a second network type is described. The method may include transmitting a first message including a request to establish, as part of a network integration, an interface between the network intelligent controller of the second network type and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT, receiving, via the interface, a second message indicating that a connection between the gateway function of the first network type and a wireless device is established in accordance with the first RAT, the connection between the gateway function and the wireless device established based on a failed connection between the wireless device and the second network type, the failed connection associated with the second RAT, and performing a communication management operation for one or more radio access network (RAN) components of the second network type based on the second message.

An apparatus for wireless communication at a network intelligent controller of a second network type is described. The apparatus may include at least one processor, at least one memory coupled with the at least one processor, and instructions stored in the at least one memory. The instructions may be executable by the at least one processor to cause the apparatus to transmit a first message including a request to establish, as part of a network integration, an interface between the network intelligent controller of the second network type and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT, receive, via the interface, a second message indicating that a connection between the gateway function of the first network type and a wireless device is established in accordance with the first RAT, the connection between the gateway function and the wireless device established based on a failed connection between the wireless device and the second network type, the failed connection associated with the second RAT, and perform a communication management operation for one or more RAN components of the second network type based on the second message.

Another apparatus for wireless communication at a network intelligent controller of a second network type is described. The apparatus may include means for transmitting a first message including a request to establish, as part of a network integration, an interface between the network intelligent controller of the second network type and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT, means for receiving, via the interface, a second message indicating that a connection between the gateway function of the first network type and a wireless device is established in accordance with the first RAT, the connection between the gateway function and the wireless device established based on a failed connection between the wireless device and the second network type, the failed connection associated with the second RAT, and means for performing a communication management operation for one or more RAN components of the second network type based on the second message.

A non-transitory computer-readable medium storing code for wireless communication at a network intelligent controller of a second network type is described. The code may include instructions executable by a processor to transmit a first message including a request to establish, as part of a network integration, an interface between the network intelligent controller of the second network type and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT, receive, via the interface, a second message indicating that a connection between the gateway function of the first network type and a wireless device is established in accordance with the first RAT, the connection between the gateway function and the wireless device established based on a failed connection between the wireless device and the second network type, the failed connection associated with the second RAT, and perform a communication management operation for one or more RAN components of the second network type based on the second message.

Some examples of the method, apparatuses, and non-transitory computer-readable medium described herein may further include operations, features, means, or instructions for receiving, via the interface, a third message indicating that a registration between the wireless device and the second network type failed, where the third message includes an ID of the wireless device and an ID of an AP associated with the first network type.

Some examples of the method, apparatuses, and non-transitory computer-readable medium described herein may further include operations, features, means, or instructions for performing a second communication management operation for the one or more RAN components of the second network type based on the third message.

Some examples of the method, apparatuses, and non-transitory computer-readable medium described herein may further include operations, features, means, or instructions for transmitting, to one or more network entities of the second network type based on the second message, a control request that indicates the connection between the gateway function and the wireless device may be established, where the control request indicates one or more network optimization parameters associated with the communication management operation.

Some examples of the method, apparatuses, and non-transitory computer-readable medium described herein may further include operations, features, means, or instructions for establishing, before receiving the second message, a first connection with the wireless device via the second network type in accordance with the second RAT, where the connection between the gateway function and the wireless device may be based on a failure of the first connection.

In some examples of the method, apparatuses, and non-transitory computer-readable medium described herein, performing the communication management operation may include operations, features, means, or instructions for modifying an allocation of one or more radio resources within the second network type, modifying one or more parameters associated with radio access control for the second network type, modifying one or more parameters associated with a connection management for the second network type, or modifying one or more parameters associated with a mobility management for the second network type.

In some examples of the method, apparatuses, and non-transitory computer-readable medium described herein, the first network type includes a trusted non-3GPP network and the second network type includes a 3GPP network.

In some examples of the method, apparatuses, and non-transitory computer-readable medium described herein, the network intelligent controller includes a near-real-time intelligent controller of a network entity of the second network type.

A method for wireless communication at a network intelligent controller of a second network type is described. The method may include establishing, as part of a network integration, an interface between the network intelligent controller and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT, receiving, periodically via the interface, an indication of one or more KPIs associated with a connection between a wireless device and the second network type, and performing, based on the one or more KPIs, a communication management operation for one or more network entities of the second network type.

An apparatus for wireless communication at a network intelligent controller of a second network type is described. The apparatus may include at least one processor, at least one memory coupled with the at least one processor, and instructions stored in the at least one memory. The instructions may be executable by the at least one processor to cause the apparatus to establish, as part of a network integration, an interface between the network intelligent controller and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT, receive, periodically via the interface, an indication of one or more KPIs associated with a connection between a wireless device and the second network type, and perform, based on the one or more KPIs, a communication management operation for one or more network entities of the second network type.

Another apparatus for wireless communication at a network intelligent controller of a second network type is described. The apparatus may include means for establishing, as part of a network integration, an interface between the network intelligent controller and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT, means for receiving, periodically via the interface, an indication of one or more KPIs associated with a connection between a wireless device and the second network type, and means for performing, based on the one or more KPIs, a communication management operation for one or more network entities of the second network type.

A non-transitory computer-readable medium storing code for wireless communication at a network intelligent controller of a second network type is described. The code may include instructions executable by a processor to establish, as part of a network integration, an interface between the network intelligent controller and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT, receive, periodically via the interface, an indication of one or more KPIs associated with a connection between a wireless device and the second network type, and perform, based on the one or more KPIs, a communication management operation for one or more network entities of the second network type.

Some examples of the method, apparatuses, and non-transitory computer-readable medium described herein may further include operations, features, means, or instructions for receiving, via the interface, a message that indicates a successful registration between the wireless device and the second network type, where the message includes an ID of the wireless device and an ID of an AP associated with the first network type, and where periodically receiving the indication of the one or more KPIs may be based on the successful registration.

Some examples of the method, apparatuses, and non-transitory computer-readable medium described herein may further include operations, features, means, or instructions for transmitting, via the interface, an indication that values of the one or more KPIs exceed a threshold, where the indication includes a trigger to disable a second connection between the wireless device and the gateway function of the first network type.

In some examples of the method, apparatuses, and non-transitory computer-readable medium described herein, performing the communication management operation may include operations, features, means, or instructions for modifying one or more corrective network orchestration and optimization decisions for the one or more network entities of the second network type based on the one or more KPIs.

In some examples of the method, apparatuses, and non-transitory computer-readable medium described herein, the first network type includes a trusted non-3GPP network and the second network type includes a 3GPP network.

In some examples of the method, apparatuses, and non-transitory computer-readable medium described herein, the network intelligent controller includes a non-real-time intelligent controller of a network entity of the second network type.

DETAILED DESCRIPTION

Figure 1:
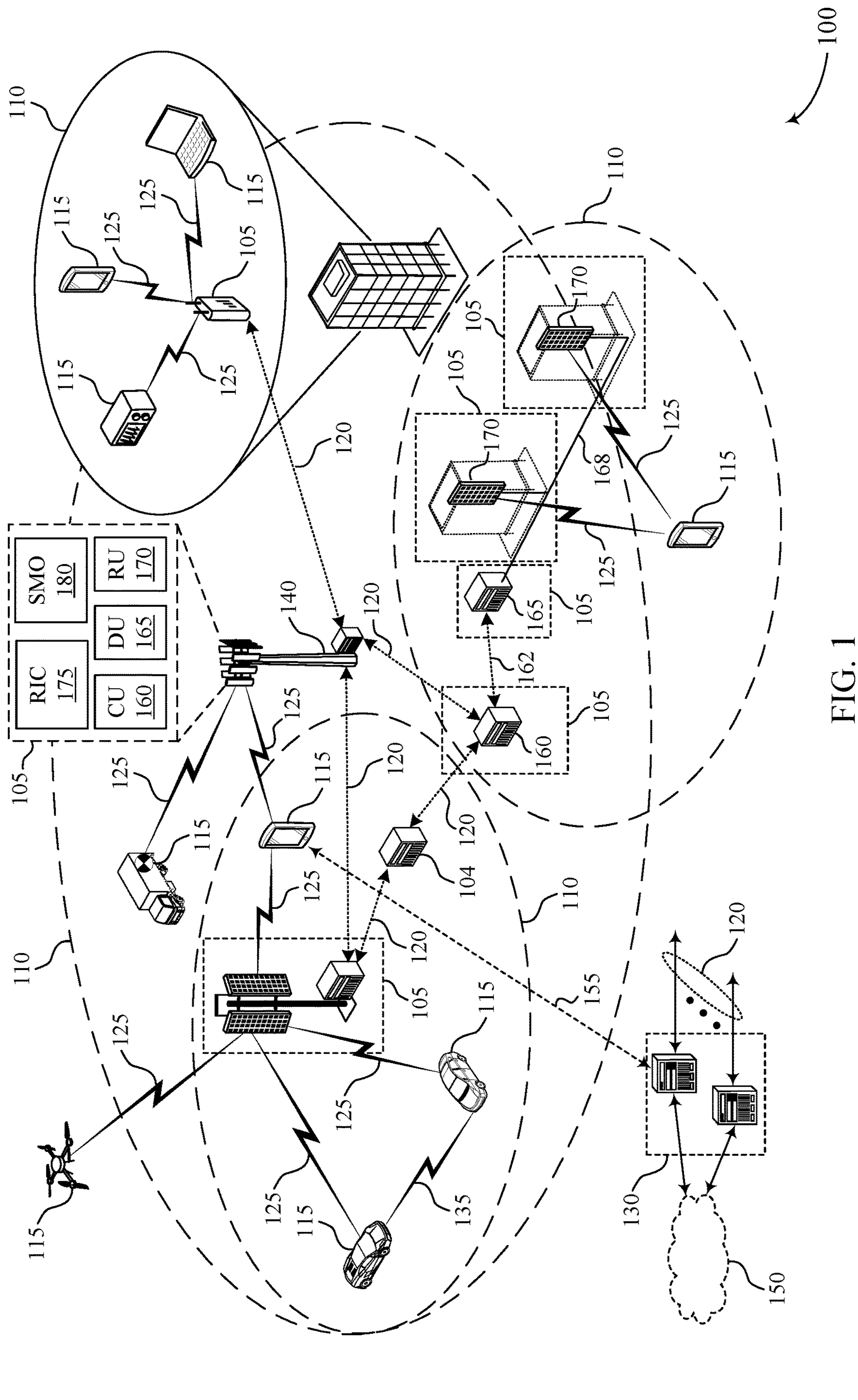
FIG. 1 shows an example of a wireless communications system that supports deployment of a private network using integration with a trusted backup network in accordance with one or more aspects of the present disclosure.

Some wireless communications systems may support a private network. A private network may be a non-public mobile network that may support use of a licensed, unlicensed, or shared spectrum and that is intended for private use by an organization or company. In some examples, a private network may operate in accordance with or be based on 3rd Generation Partnership Project (3GPP) protocols, or some other type of network protocols. The private network may be referred to as a second network or may be referred to as being associated with a second network type. In some cases, it may take a relatively long time (e.g., one to two days) to deploy a private network due to, for example, radio frequency (RF) site surveying, network dimensioning, and onboarding of wireless devices, such as user equipments (UEs), among other complexities involved in setting up the private network associated with the second network type. Such deployment time may be relatively long compared to other types of network deployments, including a first network type (e.g., a Wi-Fi network).

Techniques, systems, and devices described herein provide for integration of a trusted backup network of a first network type with the private network of the second network type to improve deployment of the private mobile network. In some examples, the first network type may be a non-3GPP network that uses unlicensed frequency bands, such as a Wi-Fi network, and the second network type may be a 3GPP network. During deployment of the private network, some network nodes of the first network type may be deployed and set up, which may be referred to as a greenfield deployment. Additionally, or alternatively, preexisting network nodes of the first network type may be leveraged to generate a trusted backup network, which may be referred to as a brownfield deployment.

As described herein, if a UE fails to connect to or onboard to the second network, the UE may be configured to establish a default or backup connection with the first network. The UE may transmit a registration request to a gateway function for the first (backup) network. The gateway function may forward an indication of the request from the UE and a connection established between the UE and the gateway function to the private network via an E2tr interface, which may be a new interface established between the gateway function and a first intelligent controller of the private network. The first intelligent controller may perform corrective action by adjusting one or more radio resource or mobility management parameters to improve the second network based on the indication. The gateway function may subsequently indicate, to a second intelligent controller of a service management and orchestration function (SMO) of the second network, one or more key performance indicators (KPIs) associated with a connection between the UE and the second network via the gateway function. The gateway function may indicate the KPIs to the second intelligent controller via a second new interface, referred to as an O1t interface. The UE may continue attempts to register with the second network iteratively until the private network is sufficiently optimized (e.g., meets or exceeds one or more metrics or performance target), at which point the connection between the UE and the private network may be established and the backup network may be disabled or deactivated. By integrating the backup network of the first network type with the second network, the second network may be deployed and may establish connections with client devices, such as the UE, more efficiently and reliably.

Aspects of the disclosure are initially described in the context of wireless communications systems. Additional aspects are described with reference to a network architecture, integrated network architectures, a greenfield deployment workflow, a brownfield deployment workflow, and process flows. Aspects of the disclosure are further illustrated by and described with reference to apparatus diagrams, system diagrams, and flowcharts that relate to deployment of a private network using integration with a trusted backup network.

FIG. 1 shows an example of a wireless communications system 100 that supports deployment of a private network using integration with a trusted backup network in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a RF access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point (AP), a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-real-time RIC (Near-RT RIC), a Non-real-time RIC (Non-RT RIC)), an SMO 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support deployment of a private network using integration with a trusted backup network as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s$=1/

($\Delta f_{max} \cdot N_f$) seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, the wireless communications system 100 may represent an example of a private network. A private network may be a non-public mobile network that may use a licensed, unlicensed, or shared RF spectrum and may be intended for non-public (e.g., private) use by, for example, an organization or company (e.g., for precision agriculture, construction and mining, digitized education, connected healthcare, connected cities, intelligent retail, smart manufacturing, and mobile experiences, among other examples). In some examples, the private network may leverage or be based on a second type of network protocols, such as 3GPP protocols, and may be referred to as a second type of network accordingly (e.g., a 3GPP network or a 5G network).

A time to deploy a private or enterprise network may be relatively long (e.g., one to two days, or some other deployment time) as compared with deployment times for other network types, such as a Wi-Fi network. The deployment of the private mobile network may include RF site surveying, network dimensioning, and onboarding of UEs 115, among other deployment procedures. Reducing the deployment time for the private mobile network may be challenging as compared with other network types due to one or more characteristics and parameters associated with the private mobile network. These characteristics may include, for example, installation of a subscriber identity module (SIM) or an embedded SIM (E-SIM) on each UE 115 in the network, setup of multiple components on the access network and the core network that may comply with standards (e.g., O-RAN and/or 3GPP specific components), fine tuning coverage and power requirements of one or more components, such as an RU, one or more other characteristics, or any combination thereof. Use of a network design and/or network interfaces without sufficient testing may result in outages, deployment issues, interoperability issues, and degradation of quality of service, among other examples.

Techniques, systems, and devices described herein provide for improved deployment of a private mobile network by integrating the private mobile network with a trusted backup network. The trusted backup network may be of a first network type that is different than a second network type of the private mobile network. For example, the trusted backup network may be a non-3GPP network, such as a Wi-Fi network, or some other type of network. A network type may represent or correspond to a set of standards or protocols that are followed by the network. A backup network may be considered "trusted" if the network is in a same deployment as the primary network (e.g., a Non-Public Core). The described techniques may provide methods for using a trusted network as a backup network or standby access network at the start of a deployment process for a private mobile network.

The described techniques may be applied to multiple different types (e.g., classifications) of network deployment, including greenfield and brownfield deployments. A greenfield deployment may be a network deployment in a system in which there is no historic or previous wireless private network deployment. A brownfield deployment may be a network deployment that includes a replacement and/or addition to an existing wireless private network deployment. For example, a network of the first type (e.g., Wi-Fi-based private network) may be deployed, and a network of the second type may be deployed as an addition to or replacement of the network of the first type.

Figure 2:
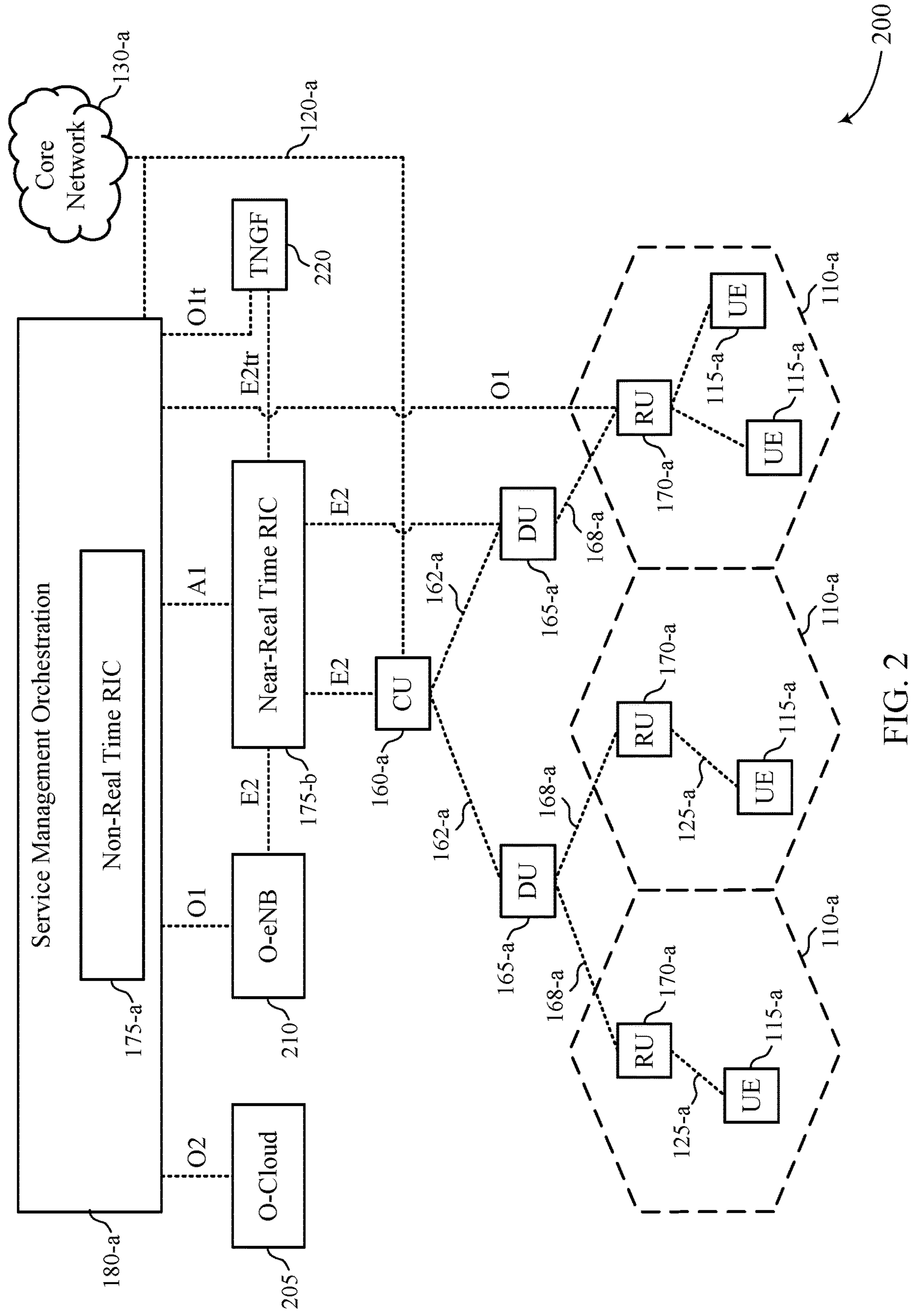
FIG. 2 shows an example of a network architecture that supports deployment of a private network using integration with a trusted backup network in accordance with one or more aspects of the present disclosure.

FIG. 2 shows an example of a network architecture 200 (e.g., a disaggregated base station architecture, a disaggregated RAN architecture) that supports deployment of a private network using integration with a trusted backup network in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a near-RT RIC 175-*b* via an E2 link, or a non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, non-RT RICs 175-*a*, near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3GPP. In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*. DUs 165-*a*. RUs 170-*a*, and near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a non-RT RIC 175-*a* configured to support functionality of the SMO 180-*a*.

The non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the near-RT RIC 175-*b*. The non-RT RIC 175-*a* may be coupled with or communicate with (e.g., via an A1 interface) the near-RT RIC 175-*b*. The near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the near-RT RIC 175-*b*.

In some examples, to generate AI/ML models to be deployed in the near-RT RIC 175-*b*, the non-RT RIC 175-*a* may receive parameters or external enrichment information from external servers. Such information may be utilized by the near-RT RIC 175-*b* and may be received at the SMO 180-*a* or the non-RT RIC 175-*a* from non-network data sources or from network functions. In some examples, the non-RT RIC 175-*a* or the near-RT RIC 175-*b* may be configured to tune RAN behavior or performance. For example, the non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

In some examples, the network architecture 200 may represent an example of a private network, which may be a non-public mobile network that may use a licensed, unlicensed, or shared RF spectrum and may be intended for non-public (e.g., private) use by, for example, an organization or company (e.g., for precision agriculture, construction and mining, digitized education, connected healthcare, connected cities, intelligent retail, smart manufacturing, and mobile experiences, among other examples). In some examples, the private network may leverage or be based on a second type of network protocols, such as 3GPP protocols, and may be referred to as a second type of network accordingly (e.g., a 3GPP network or a 5G network).

Techniques, systems, and devices described herein provide for reduced latency and improved reliability and efficiency associated with deployment of a network of the second type of network by integrating the second type of network with a trusted network of a first type at least during deployment of the second network type. The first network type may be a different type of network than the second network type and may use an unlicensed spectrum. In some examples, the first network type may be referred to as a non-3GPP network type and may be, for example, a Wi-Fi network, or some other type of network.

The trusted non-3GPP gateway function (TNGF) 220 illustrated in FIG. 2 may represent an example of a gateway function associated with the first network type. That is, the TNGF 220 may be a network node of the first network type. The first network may include one or more other network nodes not illustrated in FIG. 2. For example, the first network may include a trusted non-3GPP AP (TNAP), among one or more other nodes or components, as described in further detail elsewhere herein, including with reference to FIGS. 3-12.

Figure 4:
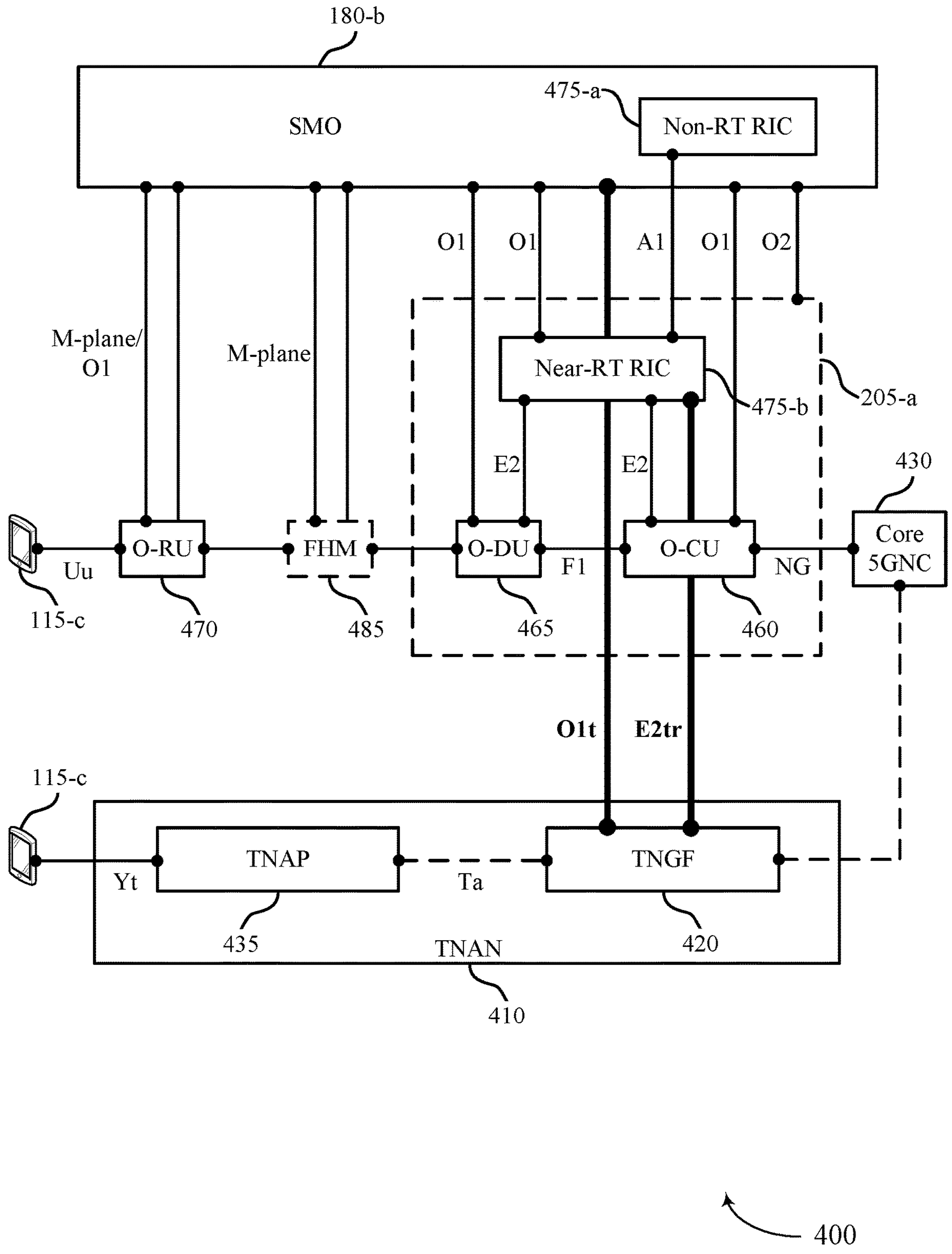

The TNGF 220 may communicate with one or more components of the second network via one or more interfaces, such as the E2tr interface and the O2t interface illustrated in FIG. 2. The E2tr interface may represent an interface between the TNGF 220 and the near-RT RIC 175-*b*, which may be included in or coupled with an O-cloud 205, as illustrated in FIG. 4. The O2t interface may represent an interface between the TNGF 220 and the SMO 180-*a*. In some examples, the O2t interface may connect the TNGF 220 with the non-RT RIC 175-*a* within the SMO 180-*a*. Although these are referred to as E2tr and O2t interfaces, it is to be understood that the E2tr and O2t interfaces may represent examples of any type of wired or wireless interface between a gateway function of a first network type and network intelligent controllers (e.g., the near-RT RIC 175-*b* and/or non-RT RIC 175-*a*) of a second network type.

The first network may establish a connection with one or more wireless devices, such as a UE 115-*a*, if a connection between the UE 115-*a* and the second network type fails. That is, the first network may operate as a backup or standby access network for the second network while the second network is being set up and deployed. The described interfaces between the TNGF 220 of the first network and the various network nodes of the second network may facilitate relatively efficient and reliable transitions, by the UE 115-*a*, between connections to the first network and connections to the second network, or vice versa. For example, the TNGF 220 may exchange one or more messages or signals with various components of the second network via the E2tr and O2t interfaces to indicate if the UE 115-*a* has connected to the TNGF 220 and facilitate adjustments to the second network type so the UE 115-*a* may transition back to connecting with the second network. Such network integration techniques are described in further detail elsewhere herein, including with reference to FIGS. 3-12.

Figure 3:
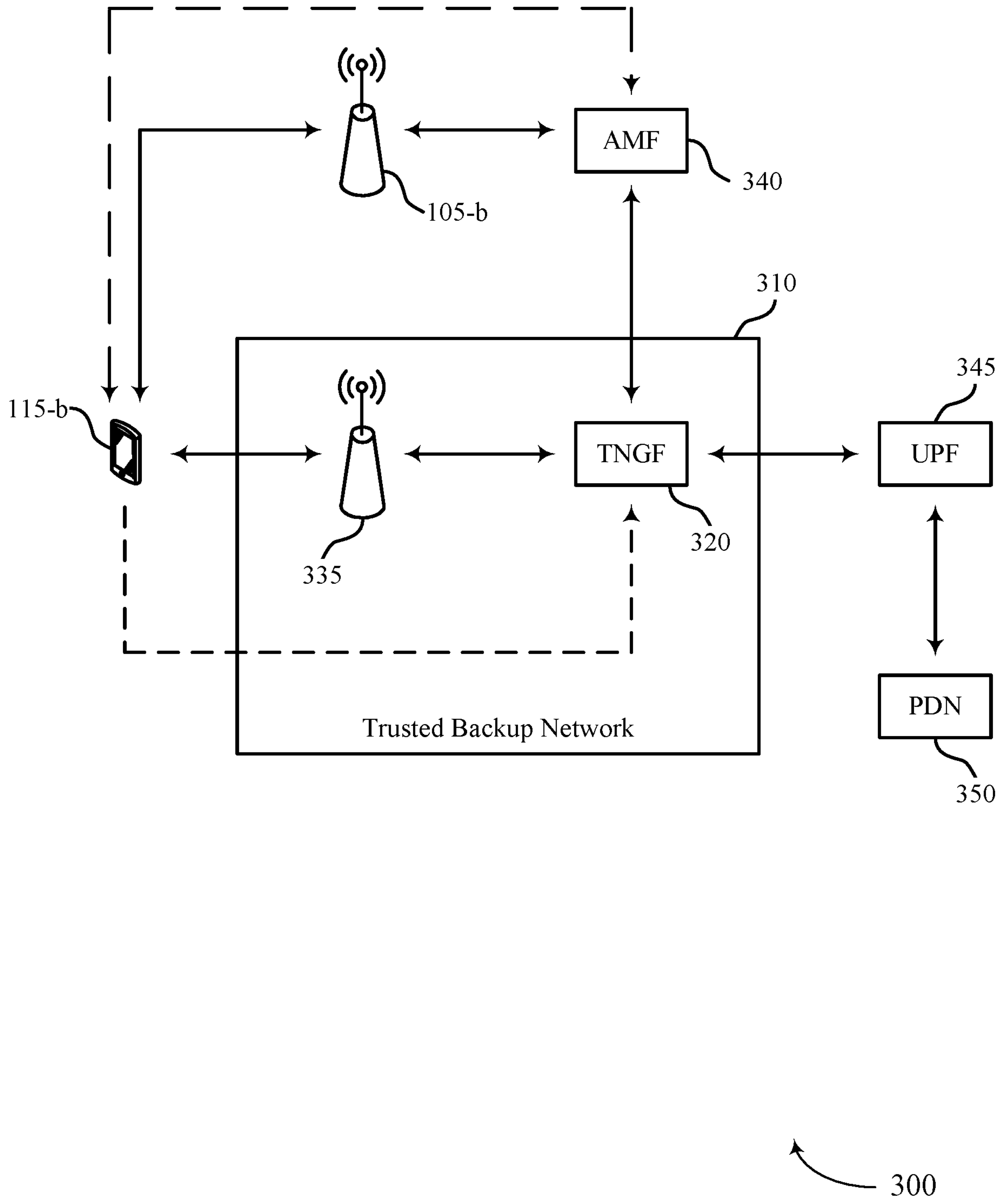
FIGS. 3 and 4 show examples of integrated network architectures that support deployment of a private network using integration with a trusted backup network in accordance with one or more aspects of the present disclosure.

FIG. 3 shows an example of an integrated network architecture 300 that supports deployment of a private network using integration with a trusted backup network in accordance with one or more aspects of the present disclosure. The integrated network architecture 300 may implement or be implemented by aspects of the wireless communications system 100 or the network architecture 200, as described with reference to FIGS. 1 and 2. For example, the integrated network architecture 300 illustrates a trusted backup network 310 that is integrated with a private network during deployment of the private network. The trusted backup network 310, the private network, or a combination of the two networks, may provide mobile network services to a UE 115-*b*, which may represent an example of a UE 115 as described with reference to FIGS. 1 and 2.

As described with reference to FIGS. 1 and 2, the trusted backup network 310 may operate as a temporary backup network for the private network or may operate as a standby access during deployment of the private network, or both. The trusted backup network 310 may be of a first network type that may be different than a second network type associated with the private network. The network type may represent a set of protocols, frequency bands, and/or standards that are used by the respective network. In some examples, the private network may be a 3GPP-based private network (e.g., a 5G network) and the trusted backup network 310 may be a Wi-Fi-based network, or some other types of networks. In some examples, the trusted backup network 310 may be referred to as a trusted non-3GPP access network (TNAN).

The trusted backup network 310 may include one or more network nodes. For example, the trusted backup network 310 may include a TNAP 335, which may be an AP for the trusted backup network 310. In some examples, the trusted backup network 310 may include multiple APs (not illustrated in FIG. 3) the one or more TNAPs 335 may establish wireless connections or wireless communication links (e.g., Yt) with one or more UEs 115-*b*, such that the UE 115-*b* may connect to the trusted backup network 310 via the TNAP 335. The UEs 115-*b* in this example may support multiple different RATs, including the RAT associated with the first network type and the RAT associated with the second network type (e.g., a Wi-Fi and 5G-capable UE 115, for example).

The trusted backup network 310 may additionally, or alternatively, include a TNGF 320, which may represent an example of a TNGF 220, as described with reference to FIG. 2. The TNGF 320 may be a gateway function for the trusted backup network 310. The TNGF 320 may connect to the TNAP 335 via a backhaul link (e.g., Ta). Although the trusted backup network 310 is shown as including the TNAP 335 and the TNGF 320 in FIG. 3, it is to be understood that a trusted backup network 310 as described herein may include any quantity of one or more network nodes or other components, including the network nodes illustrated in FIG. 3, and/or one or more other network nodes or components that may not be illustrated in FIG. 3. Other components in the integrated network architecture 300 may, in some examples, be included in or components of the private network.

The TNGF 320 may connect to a cloud associated with the second network type via one or more backhaul links (e.g., an N2 interface). The cloud, in this example, may include the AMF 340, the UPF 345, or both. In some examples, the cloud may be of a same network type as the private network, such as a 3GPP network type, or some other type of network. The cloud may represent an example of a core network 130, as described with reference to FIGS. 1 and 2. For example, the cloud may include at least one control plane entity, such as the AMF 340, to manage access and mobility, and at least one user plane entity to route packets or interconnect external networks, such as the UPF 345 and/or the PDN 350. The UPF 345 may connect with a PDN 350, such as the internet. In some examples, the AMF 340 may manage signaling for the connection with the UE 115-*b* and the UPF 345 may manage data associated with the connection with the UE 115-*b*.

The network entity 105-*b* may represent an AP for the private network (e.g., a 5G AP, or some other type of AP). The UE 115-*b* may establish a connection with the private network via the network entity 105-*b*. The network entity 105-*b* may relay signaling from the UE 115-*b* to the AMF 340 via a backhaul link (e.g., an N2 interface). That is, the AMF 340 may be connected with the network entity 105-*b* associated with the private network via a first N2 interface and with the TNGF 320 associated with the trusted backup network 310 via a second N2 interface. The UE 115-*b* may, additionally, or alternatively, communicate directly with the AMF 340 via an N1 interface or directly with the TNGF 320 via an Nwt interface, as shown by the dashed lines in FIG. 3.

As described herein, the UE 115-*b* may represent a wireless device that is capable of connecting with more than one network type (e.g., a multi-RAT capability). For example, the UE 115-*b* may be capable of connecting with the AP of the trusted backup network 310, which may support a first RAT, and the UE 115-*b* may be capable of connecting with an AP of the private network, which may support a second RAT. The first RAT may be associated with unlicensed RF spectrum bands (e.g., Wi-Fi) and the second RAT may be associated with unlicensed and/or licensed RF spectrum bands.

Techniques, systems, and devices described herein provide for improved utilization of the trusted backup network 310 during deployment of the private network by defining one or more interfaces between the TNGF 320 of the trusted backup network 310 and one or more network intelligent controllers of the private network. Such interfaces may be utilized to exchange messages and signaling between the two network types to facilitate an improved connection between the UE 115-*b* and the private network, as described in further detail elsewhere herein, including with reference to FIGS. 4-12.

FIG. 4 shows an example of an integrated network architecture 400 that supports deployment of a private network using integration with a trusted backup network in accordance with one or more aspects of the present disclosure. The integrated network architecture 400 may implement or be implemented by aspects of the wireless communications system 100, the network architecture 200, and the integrated network architecture 300, as described with reference to FIGS. 1-3. For example, the integrated network architecture 400 illustrates a trusted backup network (e.g., the TNAN 410) that is integrated with a private network (e.g., the core network 430 and corresponding network nodes) during deployment of the private network. The TNAN 410 may be integrated with the private network via one or more interfaces, as described herein.

The TNAN 410 may include a TNAP 435 and a TNGF 420, which may represent examples of the TNAP 335 and the TNGF 320, as described with reference to FIG. 3. The TNAP 435 and the TNGF 420 may be connected via a wireless backhaul link, such as the Ta interface illustrated in FIG. 4. In some examples, the TNAP 435 may establish a wireless connection (e.g., a Yt connection) with a UE 115-*c*.

The private network may include a core network 430, which may manage multiple network nodes or controllers. For example, the private network may include an RU 470 (e.g., an O-RAN RU (O-RU)), which may connect with and communicate with wireless devices, such as the UE 115-*b*, via one or more communication links (e.g., Uu links). The RU 470 may, in some examples, be connected with a fronthaul multiplexer (FHM) 485, which may be operable to split and/or combine multiple radio signals on the fronthaul. The RU 470 may also be connected (e.g., directly or via the FHM 485) with one or more network nodes within an O-cloud 205-*a*. The network nodes, which may be referred to as E2 nodes in some examples, may include a DU 465 and one or more CUs 460 (e.g., a control plane CU 460, a user plane CU 460, or both), which may be distributed nodes within the O-cloud 205-*a* (e.g., an O-RAN CU (O-CU) and an O-RAN DU (O-DU)). The O-cloud 205-*a* may include the DU 465, the CU 460, a near-RT RIC 475-*b*, a disaggregated network entity (e.g., an O-eNB), other network nodes or components, or any combination thereof. The near-RT RIC 475-*b* may connect with the various network nodes, such as the DU 465 and the CU 460, via an E2 interface. The RU 470, DU 465, CU 460, O-cloud 205-*a*, and the near-RT RIC 475-*b* may represent examples of corresponding devices and components as described with reference to FIGS. 1 and 2.

The private network may include an SMO 180-*b* (e.g., an SMO framework). The SMO 180-*b* may represent an example of the SMO 180-*a* described with reference to FIG. 2. For example, the SMO 180-*b* may represent an operation support system (OSS) that may provide an automation platform for the private network (e.g., the RAN). The SMO 180-*b* may support or facilitate a fault, configuration, accounting, performance, and security (FCAPS) network management framework. For example, the SMO 180-*b* may support FCAPS for the private network. The SMO 180-*b* may additionally, or alternatively, manage one or more PHY layer functions.

The SMO 180-*b* may interface with other entities in the private network via an O1 interface to provide the service and management functionalities. For example, the SMO 180-*b* may interface with the DU 465, the CU 460, and the near-RT RIC 475-*b* via O1 interfaces. The SMO 180-*b* may interface with the RU 470 and the FHM 485, among other components, via the O1 interfaces and/or a management plane (M-Plane).

The SMO 180-*b* may include or be coupled with a non-RT RIC 475-*a*, which may represent an example of the non-RT RIC 175-*a* described with reference to FIG. 2. The non-RT RIC 475-*a* and the near-RT RIC 475-*b* may represent examples of network intelligent controllers that may manage operation of the network entities, such as the DU 465 and the CU 460. The non-RT RIC 475-*a* and the near-RT RIC 475-*b* may use different timings to decide optimization and automation decisions for the network entities. In some examples, decisions on policy and changes to the RAN may be made by the non-RT RIC 475-*a* in a time period that is greater than or equal to one second, or some other time period. Decisions on policy and changes to the RAN may be made by the near-RT RIC 475-*b* in a time period that is greater than or equal to 10 milliseconds and less than or equal to one second, or some other time period that is shorter than the time period associated with decisions by the non-RT RIC 475-*a* (e.g., the near-RT RIC 475-*b* may operate in near-real time).

Each network entity may be managed by both the non-RT RIC 475-*a* and the near-RT RIC 475-*b* to achieve the different timings, which may improve reliability and efficiency of the FCAPS services. For example, the near-RT RIC 475-*b* may, in some examples, facilitate radio resource management and mobility management, which may be associated with relatively strict latency requirements, and the non-RT RIC 475-*a* may facilitate other decisions for the RAN that may be able to wait longer periods of time for more robust data sets, for a result of a machine learning algorithm, or the like.

As described herein, to improve integration between the TNAN 410 and the private network, one or more interfaces may be established between the TNGF 420 and various network intelligent controllers within the private network. As described with reference to FIG. 3, the TNGF 420 may be connected with the core network 430. For example, the TNGF 420 may be connected with an AMF and/or a UPF of the core network 430 via one or more backhaul links. The described techniques include an extension of the O1 and E2 interfaces between the network nodes and the non-RT RIC 475-*a* or the near-RT RIC 475-*b*, respectively. For example, the TNGF 420 may establish an interface (e.g., the O1t interface) with the non-RT RIC 475-*a*. The TNGF 420 may establish another interface (e.g., the E2tr interface) with the near-RT RIC 475-*b*. The TNGF 420 may communicate KPIs or other metrics associated with the TNAN 410 to the non-RT RIC 475-*a* and the near-RT RIC 475-*b* to facilitate integration between the TNAN 410 and the private network.

Examples of signaling that may be exchanged via the interfaces defined herein may be described in further detail elsewhere herein, including with reference to FIGS. 5-12.

Figure 5:
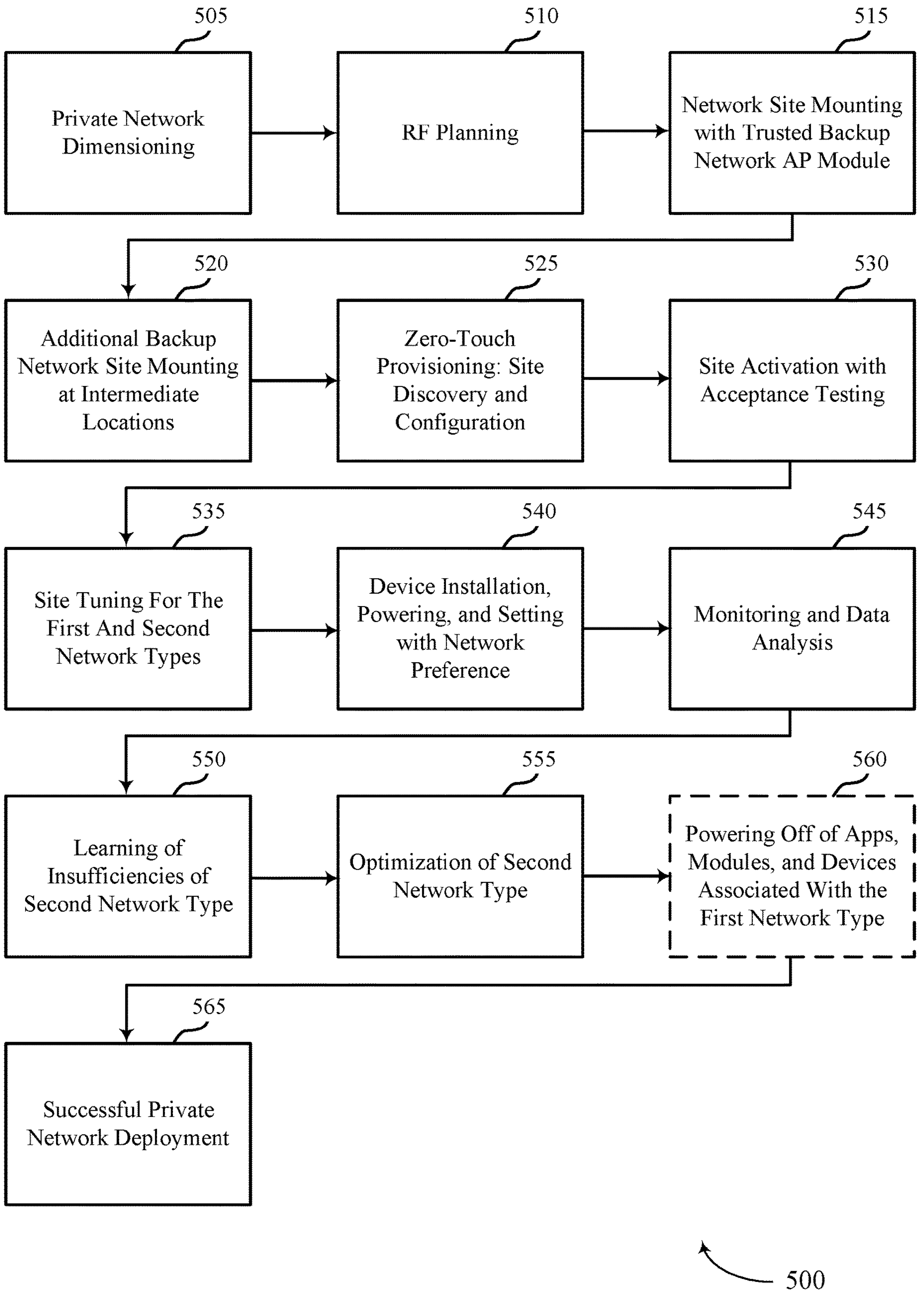
FIG. 5 shows an example of a greenfield deployment workflow that supports deployment of a private network using integration with a trusted backup network in accordance with one or more aspects of the present disclosure.

FIG. 5 shows an example of a greenfield deployment workflow 500 that supports deployment of a private network using integration with a trusted backup network in accordance with one or more aspects of the present disclosure. The greenfield deployment workflow 500 may implement or be implemented by aspects of the wireless communications system 100, the network architecture 200, and the integrated network architectures 300 and 400, as described with reference to FIGS. 1-4. For example, FIG. 5 illustrates actions performed by a client device (e.g., a UE 115), a TNAP, a TNGF, a near-RT RIC, and a non-RT RIC, among other devices, as part of deployment of a private network of a second type (e.g., 3GPP) using integration of a first network type (e.g., non-3GPP). The devices and components described with reference to FIG. 5 may represent examples of corresponding devices and components as described with reference to FIGS. 1-4. Additionally, FIG. 5 illustrates actions performed by a network operator, a network planner, or a network engineer.

The greenfield deployment workflow 500 illustrates an example of deployment of a private network of the second type (e.g., 3GPP) using integration with the second network type (e.g., Wi-Fi). In this example, the deployment may be an example of a greenfield deployment, which may correspond to network deployment in a system in which there is no historic or previous wireless private network deployment, as described with reference to FIG. 1. For example, a client may build a new stadium that may support (e.g., exclusively) private network coverage using the second network type without any pre-existing network coverage.

In the following description of greenfield deployment workflow 500, the operations described may be performed in a different order than the order shown, or other operations may be added or removed from the greenfield deployment workflow 500. Specific operations may also be left out of the greenfield deployment workflow 500 or may be performed in different orders or at different times. Further, although some operations or signaling may be shown to occur at different times for discussion purposes, these operations may actually occur at the same time.

At 505, private network dimensioning may occur based on customer requirements, such as the features and functions required to meet the needs, business goals, and technical requirements identified by the customer. At 510, RF planning may occur. For example, site locations of the second network type (e.g., 5G, 3GPP, or the like) may be identified and customer profiles may be created or determined for each site location. The network dimensioning and RF planning may be performed to determine proper dimensions for a planned private network that may serve one or more clients on licensed frequency bands, unlicensed frequency bands, or both.

At 515, the network sites of the second network type, the first network type, or both may be mounted at one or more desired physical locations. An AP module of a trusted backup network of the first network type (e.g., Wi-Fi) may additionally, or alternatively, be mounted. In some examples, the trusted backup network AP module may be inherent, detachable, or both.

At 520, one or more additional network sites may be mounted at intermediate locations (e.g., physical locations). The additional network sites may be exclusive to the first network type, in some examples. For example, if the network sites of the second network type identified at 510 have wider coverage than the respective or corresponding network sites of the first network type, additional site mounting may be beneficial.

At 525, zero-touch provisioning may occur to discover and configure the network sites of the first and/or second network types (e.g., unlicensed and/or licensed). For example, wireless devices within the networks may be configured using a switch feature to automatically update operating systems, deploy patches or bug fixes, and implement features prior to connection.

At 530, the network sites of the first and/or second network types may be activated with a quality assurance process (e.g., acceptance testing). In some examples, each network site of the second network type may be activated, or each network site of the first network type may be activated, or both. In other examples, a subset of selected network sites of the second network type or selected network sites of the first network type may be activated. The acceptance testing may determine the degree to which the deployment meets the customer needs and approval, and may include beta testing, application testing, field testing, or end-user testing.

At 535, the network sites of the first and second network types may be activated and tuned. The tuning may be performed according to the respective profiles of each network site of the first and second types.

At 540, one or more wireless devices to be served by the private network (e.g., client devices) may be installed with a chipset that supports the second network type (e.g., a 5G chipset), a chipset that supports the first network type (e.g., a Wi-Fi chipset), and/or a subscriber identity module (SIM). The wireless devices may be powered on. The wireless devices may be configured to (e.g., set) with a default network preference setting, which may indicate a preferred network type for the wireless device. In this example, the preferred network type may be the second network type (e.g., a "prefer licensed network" or "prefer 5G" option), such that the device utilizes the first network type (e.g., Wi-Fi) only when there is no (or limited) network coverage for the second network type. In some examples, one or more of the described actions for deployment of the network may be performed by a network operator or planner, or by one or more other network entities or components.

At 545, the one or more devices, one or more networks, one or more network sites of the second network type, and one or more network sites of the first network type may be monitored (e.g., relatively continuous and aggressive monitoring). In some examples, data may be collected and analyzed. The monitoring, data collection, and analysis may be performed autonomously (e.g., by using the deployed network entities).

At 550, one or more insufficiencies (e.g., access management issues, connection management issues, or mobility management issues) of the RAN of the second network type may be learned via at least one of an arrival of registration requirements at an AMF via the gateway function (e.g., the TNGF, as described with reference to FIG. 2) or KPI monitoring related to the network of the first network type. In some examples, the registration requirements may be fed, via the TNGF, to the near-RT RIC via the E2tr interface. In some examples, the KPI monitoring may be performed by the TNGF and a non-RT RIC. For example, the non-RT RIC may perform a communication management operation and may collect KPIs from the TNGF, as described further with reference to FIG. 7.

At 555, the network RAN of the second network type may be optimized to meet service level agreements (SLAs) and/or the agreed upon KPIs. Network RAN optimization may include revisions to the basic RAN plan based on insufficiencies, if any, identified at 550.

At 560, in some examples, once a desired optimization is reached, network APs and modules of the first network type may optionally be powered off and/or detached in devices. In some other examples, the network APs and modules of the first network type may remain as a backup in case the network of the second network type experiences issues again (e.g., via an integrated USB-based interface or connection).

At 565, private network deployment may be successful, and KPI monitoring and analysis may continue to maintain a stable and reliable network connection for the one or more customers.

Examples of signaling that may be exchanged via the interfaces defined herein may be described in further detail elsewhere herein, including with reference to FIGS. 6-12

Figure 6:
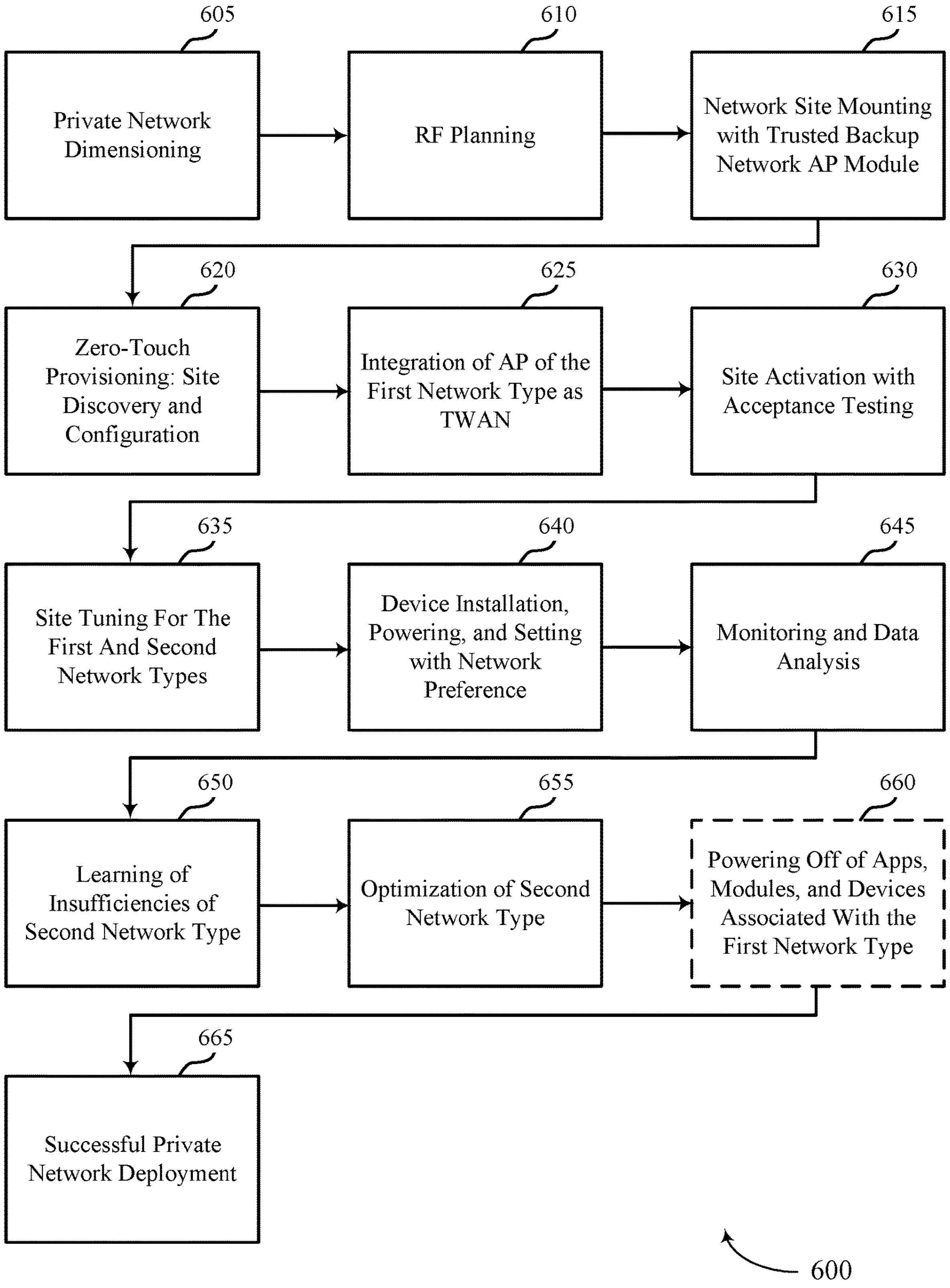
FIG. 6 shows an example of a brownfield deployment workflow that supports deployment of a private network using integration with a trusted backup network in accordance with one or more aspects of the present disclosure.

FIG. 6 shows an example of a brownfield deployment workflow 600 that supports deployment of a private network using integration with a trusted backup network in accordance with one or more aspects of the present disclosure. The brownfield deployment workflow 600 may implement or be implemented by aspects of the wireless communications system 100, the network architecture 200, and the integrated network architectures 300 and 400, as described with reference to FIGS. 1-4. For example, FIG. 6 illustrates actions performed by a client device (e.g., a UE 115), a TNAP, a TNGF, a near-RT RIC, and a non-RT RIC, among other devices, as part of deployment of a private network of a second type (e.g., 3GPP) using integration of a first network type (e.g., non-3GPP). The devices and components described with reference to FIG. 6 may represent examples of corresponding devices and components as described with reference to FIGS. 1-4. Additionally, FIG. 6 illustrates actions performed by a network operator, a network planner, or network engineer.

The brownfield deployment workflow 600 illustrates an example of deployment of a private network of the second type (e.g., 3GPP) using integration with the first network type (e.g., Wi-Fi). In this example, the deployment may be an example of a brownfield deployment, which may correspond to network deployment in a system in which there is a previous wireless private network deployment, as described with reference to FIG. 1. For example, a client with an office building which already uses the first network type (e.g., Wi-Fi) may implement a second network type (e.g., for increase security). In another example, a factory may implement a second network type on top of an existing first network type in the factory to support relatively high-speed and low-latency operations to meet the growing demands of automation.

In the following description of brownfield deployment workflow 600, the operations described may be performed in a different order than the order shown, or other operations may be added or removed from the brownfield deployment workflow 600. Specific operations may also be left out of the brownfield deployment workflow 600 or may be performed in different orders or at different times. Further, although some operations or signaling may be shown to occur at different times for discussion purposes, these operations may actually occur at the same time.

At 605, private network dimensioning may occur based on customer requirements, such as the features and functions required to meet the needs, business goals, and technical requirements identified by the customer.

At 610, RF planning occurs. For example, site locations of the second network type (e.g., 5G, 3GPP, or the like) may be identified and customer profiles may be created or determined for each site location. The network dimensioning and RF planning may be performed to determine proper dimensions for a planned private network that may serve one or more clients on licensed frequency bands, unlicensed frequency bands, or both.

At 615, the network sites may be mounted at one or more desired physical locations. An AP module of a trusted backup network of a first network type (e.g., Wi-Fi) may additionally, or alternatively, be mounted. In some examples, the trusted backup network AP module may be inherent, detachable, or both.

At 620, zero-touch provisioning may occur to discover and configure the network sites of the first and/or second network types (e.g., unlicensed and/or licensed). For example, wireless devices within the networks may be configured using a switch feature to automatically update operating systems, deploy patches or bug fixes, and implement features prior to connection.

At 625, any existing network APs of the first network type may be integrated as a trusted WLAN (TWAN) via the gateway function (e.g., the TNGF) to the private network core of the second network type. The one or more APs may be routed to the second network core via the TNGF of the first network type as a trusted device. The one or more APs may thereby be leveraged during deployment of the private network (e.g., the 5G RAN).

At 630, the network sites of the first and/or second network types may be activated with a quality assurance process (e.g., acceptance testing). In some examples, each network site of the second network type may be activated, or each network site of the first network type may be activated, or both. In other examples, a subset of selected network sites of the second network type or selected network sites of the first network type may be activated. The acceptance testing may determine the degree to which the deployment meets the customer needs and approval, and may include beta testing, application testing, field testing, or end-user testing.

At 635, the network sites of the first and second network types may be activated and tuned. The tuning may be performed according to the respective profiles of each network site of the first and second types.

At 640, one or more wireless devices to be served by the private network (e.g., client devices) may be installed with a chipset that supports the second network type (e.g., a 5G chipset), a chipset that supports the first network type (e.g., a Wi-Fi chipset), and/or a SIM. The wireless devices may be powered on. The wireless devices may be configured to (e.g., set) with a default network preference setting, which may indicate a preferred network type of the wireless device. In this example, the preferred network type may be the second network type (e.g., a "prefer licensed network" or "prefer 5G" option), such that the device utilizes the first network (e.g., Wi-Fi) only when there is no network coverage for the second network type. In some examples, one or more of the described actions for deployment of the network may be performed by a network operator or planner, or by one or more other network entities or components.

At 645, the one or more devices, one or more networks, one or more network sites of the second network type, and one or more network sites of the first network type may be monitored (e.g., relatively aggressive and continuous monitoring). In some examples, data may be collected and analyzed. The monitoring, data collection, and analysis may be performed autonomously (e.g., by using the deployed network entities).

At 650, one or more insufficiencies of the RAN of the second network type may be learned via at least one of an arrival of registration requirements at an AMF via the gateway function (e.g., the TNGF) or KPI monitoring related to the network of the first type. In some examples, the KPI monitoring may be performed by the TNGF and a non-RT RIC of the second network type. For example, the non-RT RIC may perform a communication management operation and may collect KPIs from the TNGF, as described further with reference to FIG. 7.

At 655, the network RAN of the second network type may be optimized to meet SLAs and/or the agreed upon KPIs. Network RAN optimization may include revisions to the basic RAN plan based on insufficiencies identified at 650.

At 660, in some examples, once a desired optimization is reached, network APs and modules of the first network type may optionally be powered off in devices. In some other examples, the network APs and modules of the first network type may remain as a backup in case the network of the second network type experiences issues again (e.g., via an integrated USB-based interface or connection).

At 665, private network deployment may be successful, and KPI monitoring and analysis may continue to maintain a stable network connection for the customers (e.g., users of the private network).

Examples of signaling that may be exchanged via the interfaces defined herein may be described in further detail elsewhere herein, including with reference to FIGS. 7-12.

Figure 7:
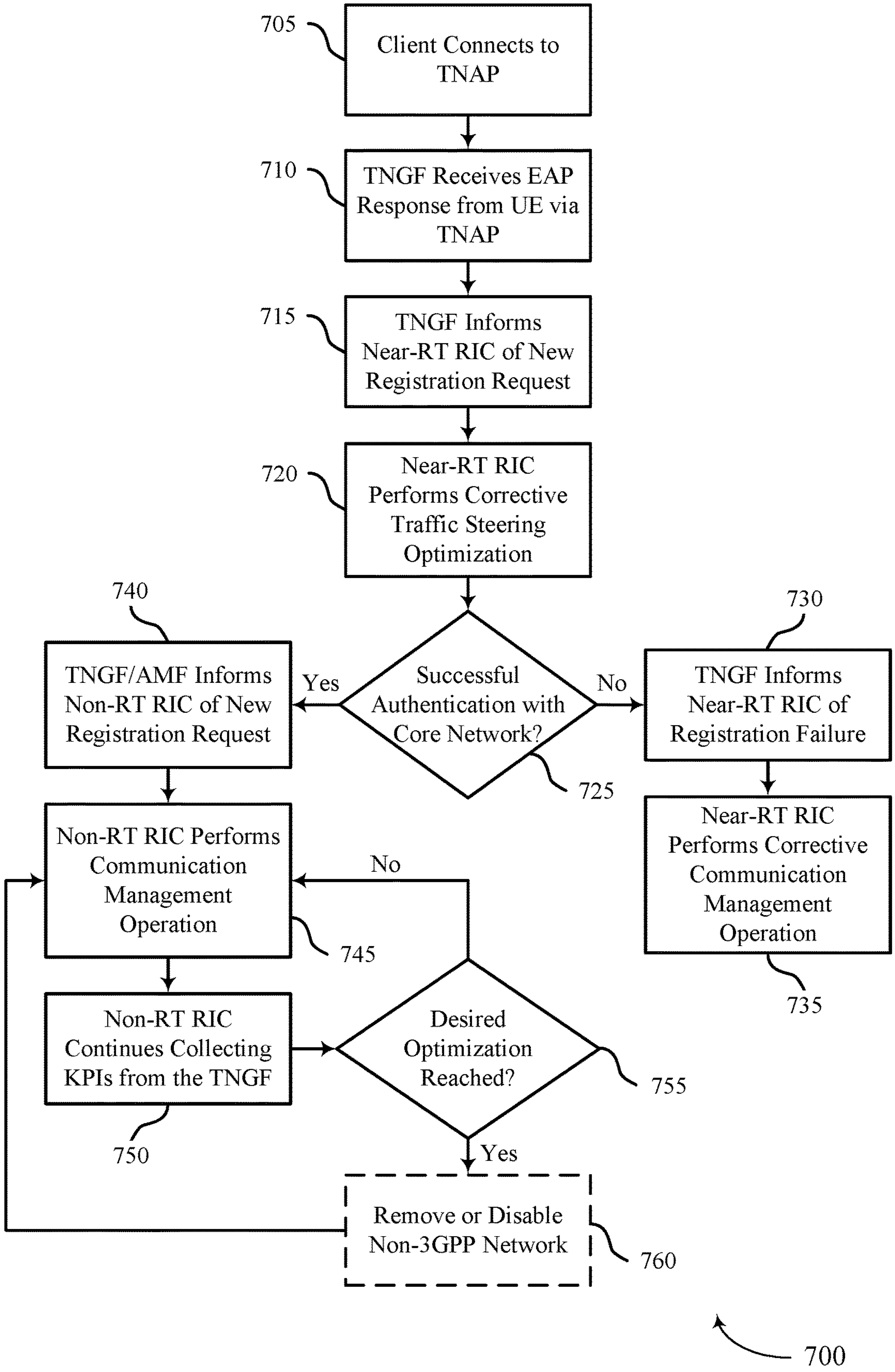
FIG. 7 shows an example of a flow chart that supports deployment of a private network using integration with a trusted backup network in accordance with one or more aspects of the present disclosure.

FIG. 7 shows an example of a flow chart 700 that supports deployment of a private network using integration with a trusted backup network in accordance with one or more aspects of the present disclosure. The flow chart 700 may implement or be implemented by aspects of the wireless communications system 100, the network architecture 200, and the integrated network architectures 300 and 400, as described with reference to FIGS. 1-4. For example, the flow chart 700 illustrates actions performed by a client device (e.g., a UE 115), a TNAP, a TNGF, a near-RT RIC, and a non-RT RIC, among other devices, as part of deployment of a private network of a second type (e.g., 3GPP) using integration of a first network type (e.g., non-3GPP). The devices and components described with reference to FIG. 7 may represent examples of corresponding devices and components as described with reference to FIGS. 1-4.

In the following description of the flow chart 700, the operations described may be performed in a different order than the order shown, or other operations may be added or removed from the flow chart 700. Specific operations may also be left out of the flow chart 700 or may be performed in different orders or at different times. Further, although some operations or signaling may be shown to occur at different times for discussion purposes, these operations may actually occur at the same time.

At 705, a client (e.g., a UE) may connect to the network of the first type. For example, a wireless device, such as a UE, may connect to the first network type by establishing a connection with or requesting to establish a connection with a TNAP or other AP of the first network type. In some examples, the UE may connect to the TNAP in response to or based on a failed connection or connection attempt with the second network type based on, for example, dead spots or mobility issues with the network of the second network type, among other potential scenarios in which a connection may fail.

At 710, the gateway function (e.g., the TNGF 220, 320, or 420, as described with reference to FIGS. 2-4) may receive a message (e.g., a radius message, or some other type of message) that includes an extensible authentication protocol (EAP) response from the UE. The message may be relayed to the TNFG via the TNAP, in some examples. The EAP response may include an EAP identity that conveys one or more IDs associated with the UE (e.g., a licensed network globally unique temporary identifier (GUTI), a licensed network subscription concealed identifier (SUCI), or a network access identifier (NAI)).

At 715, The TNGF may inform the near-RT RIC of the new registration request from the UE. For example, the TNGF may establish an interface between the TNGF and the near-RT RIC of the second network type. The interface may be referred to as an E2tr interface, as described with reference to FIGS. 2-4. The TNGF may transmit, to the near-RT RIC via the E2tr interface, a message that indicates the connection between the TNGF and the UE. In some examples, the message may include one or more IDs, such as client-level and/or TNAP IDs, which may be presented as inputs.

At 720, the near-RT RIC (e.g., a network intelligent controller) may perform corrective traffic steering optimization on licensed network RAN sites (e.g., co-located sites). For example, radio resource allocation (e.g., resource management), radio access control, connection management, and mobility management may be improved, as discussed elsewhere in the present disclosure. In some examples, corrective traffic steering optimization may include corrective actions such as antenna adjustments (e.g., antenna orientation, azimuth, or elevation changes on the RU), beamforming changes (e.g., on the transmitter or receiver), power control (e.g., for uplink, downlink, or both), optimization based on client capabilities and use cases (e.g., dynamic beacon intervals for IoT devices), or any combination thereof. Decisions on policy and changes to the RAN may be made by the near-RT RIC in a time period that is greater than or equal to 10 milliseconds and less than or equal to one second, or some other time period that is shorter than the time period associated with decisions by the non-RT RIC 475-*a*. For example, at 715, the TNGF may transmit a message to the near-RT RIC via the E2tr interface, and the near-RT RIC may perform corrective actions within 10 milliseconds of receiving the message.

At 725, the TNGF may monitor the EAP registration between the UE and the private network core of the second network type. In some examples, the TNGF may determine that the EAP registration was not successful. In some other examples, the TNGF may determine that the EAP registration was successful.

At 730, if the EAP authentication with the core network was not successful, the TNGF may inform the near-RT RIC of registration failure. In some examples, the TNGF may present the client-level ID, the AP ID (e.g., the TWAN identifier (ID)), or both as inputs. At 735, the near-RT RIC may perform a corrective communication management operation based on receiving the indication of registration failure (e.g., within 10 milliseconds of receiving the indication of registration failure). For example, the near-RT RIC may perform a reversive traffic steering optimization on co-located licensed RAN sites, which may include, for example, switching from one network type to another network type according to dynamic network and traffic environments. In some examples, this operation may be the same as, similar to, or different than the optimization performed by the near-RT RIC in step 720.

At 740, if the authentication with the core network was successful, the TNGF may inform the non-RT RIC (e.g., within the SMO) of the new registration request from the UE (e.g., within one second of determining that the authentication was successful). For example, the TNGF may establish an interface between the TNGF and the non-RT RIC of the second network type. The interface may be referred to as an O1t interface, as described with reference to FIGS. 2-4. The TNGF may transmit, to the non-RT RIC via the O1t interface, a message that indicates the connection between the TNGF and the UE. In some examples, the message may include one or more IDs, such as a client-level ID, an AP ID (e.g., a TNAP ID), or both as inputs via the O1t interface.

Additionally, or alternatively, the AMF may inform the non-RT RIC (e.g., within the SMO) of the new registration request from the UE. For example, the AMF may transmit, to the non-RT RIC, a message that indicates the connection between the AMF and the UE is established. In some examples, the message may include one or more IDs, such as a client-level ID, an AP ID (e.g., a TNAP ID), or both as inputs.

At 745. The non-RT RIC may perform a communication management operation. For example, the non-RT RIC may determine how well the private network meets customer integration requirements, priorities, and goals and perform actions to mitigate any deficiencies. In some examples, the non-RT RIC may identify and update to appropriate software versions, provide critical bug analysis, implement system confirmation improvements, and generate reports on KPIs and critical success factors (CSFs). That is, the non-RT RIC may perform course-corrective network orchestration and optimization via the O1 interface towards a CU or a DU. In some examples, the non-RT RIC may perform network orchestration and optimization via the M-plane towards an RU.

At 750, the TNGF may continue to monitor the connection (e.g., the registration) between the UE and the network core of the second network type. In some examples, the TNGF may measure (e.g., collect) one or more KPIs associated with the connection between the UE and the network core of the second network type. In some examples, KPI collection may occur at the device or AP level. The TNGF may, in some examples, transmit a message containing and/or indicating the KPIs to the non-RT RIC (e.g., via the O1t interface). In some examples, KPI collection and/or transmission may occur at regular intervals (e.g., a periodicity greater than one second).

At 755, the non-RT RIC or some other device or component may determine whether the desired private network optimization has been reached. For example, the non-RT RIC may compare the metrics (e.g., KPI) received from the TNGF to a threshold quality of the connection between the UE and the second network type. If the desired optimization has not been reached (e.g., the received KPI is below the threshold quality), the non-RT RIC may repeat steps 745 and 750 (e.g., the non-RT RIC may continue to collect KPIs and perform corrective operations).

At 760, in some examples, if the desired optimization has been reached, the first network type may optionally be removed or disabled to, for example, reduce operational expenditures and improve power efficiency. For example, one or more modules and/or devices and APs of the second network type may be turned off or removed. In some examples, the TNGF entity may be removed or disabled. Techniques for disabling the first network type may be described in further detail elsewhere herein, including with reference to FIGS. 8-12. Additionally, or alternatively, in some examples, the first network type may remain integrated with the second network type after the desired optimization or threshold quality has been achieved. In such examples, the TNGF may continue monitoring and measuring KPIs associated with the connection between the UE and the second network type.

A first network type may thereby be integrated with a second network type via one or more interfaces to improve deployment of the second network type. By exchanging signaling via the interfaces during the deployment and setup of the second network type, the first network type may support improved deployment efficiency and reliability. Examples of signaling that may be exchanged via the interfaces defined herein may be described in further detail elsewhere herein, including with reference to FIGS. 8-12.

Figure 8:
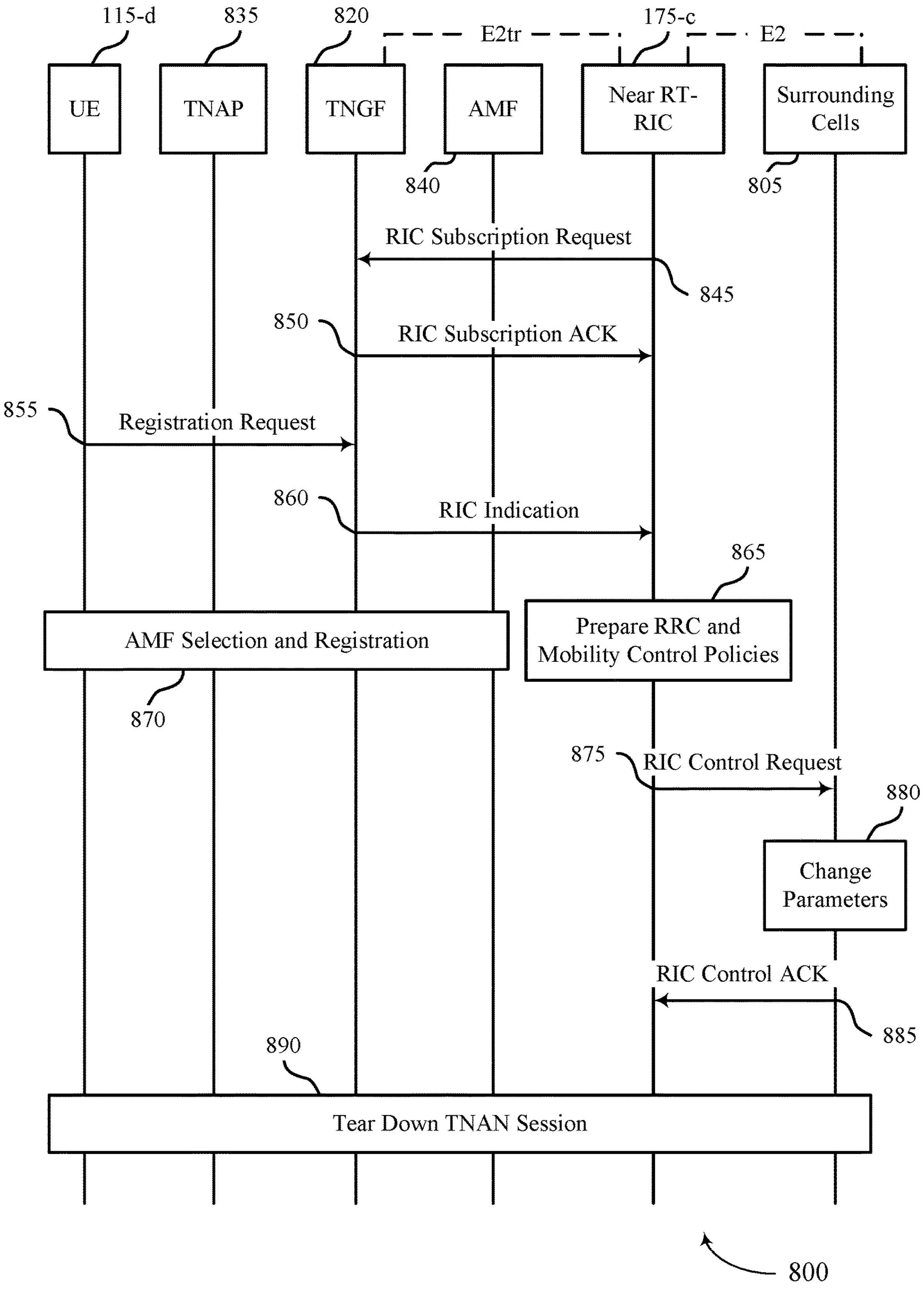
FIGS. 8-12 show examples of process flows that support deployment of a private network using integration with a trusted backup network in accordance with one or more aspects of the present disclosure.

FIG. 8 shows an example of a process flow 800 that supports deployment of a private network using integration with a trusted backup network in accordance with one or more aspects of the present disclosure. The process flow 800 shows how a UE 115-*d* may register with a trusted backup network (e.g., a TNAN), which may include a TNAP 835 and a TNGF 820 based on a failed registration attempt with a private network. The process flow 800 may implement or be implemented by aspects of the wireless communications system 100, the network architecture 200, and the integrated network architectures 300 and 400, as described with reference to FIGS. 1-4. For example, the process flow 800 illustrates actions performed by a client device (e.g., the UE 115-*d*), the TNAP 835, the TNGF 820, an AMF 840, a near-RT RIC 175-*c*, and surrounding cells 805 (e.g., a gNB, a CU, or a DU), among other devices, as part of deployment of a private network of a second type (e.g., 3GPP) using integration with a first network type (e.g., non-3GPP). The devices and components described with reference to FIG. 8 may represent examples of corresponding devices and components as described with reference to FIGS. 1-7.

In the following description of the process flow 800, the operations described may be performed in a different order than the order shown, or other operations may be added or removed from the process flow 800. Specific operations may also be left out of the process flow 800 or may be performed in different orders or at different times. Further, although some operations or signaling may be shown to occur at different times for discussion purposes, these operations may actually occur at the same time.

At 845, the near-RT RIC 175-*c* may transmit, and the TNGF 820 may receive, a RIC subscription request. The RIC subscription request may be an E2AP RIC subscription request and, in some examples, may be based on a trigger. For example, the RIC subscription request transmission and/or the generation or transmission of a report may be triggered by the arrival of a registration request from the first network type (e.g., the trusted backup network). In some examples, the subscription request may represent an example of a request for the TNGF 820 to establish an interface between the TNGF 820 and the near-RT RIC 175-*c*. The interface may represent an example of the E2tr interface, as described with reference to FIGS. 2-7.

At 850, the TNGF 820 may transmit, and the near-RT RIC 175-*c* may receive, a RIC subscription acknowledgment (ACK). The RIC subscription ACK may indicate to the near-RT RIC 175-*c* that the RIC subscription request was received. In some examples, the RIC subscription ACK may indicate successful establishment of the E2tr interface. Additionally, or alternatively, the TNGF 820 may establish communication with the near-RT RIC 175-*c* via the E2tr interface subsequent to transmitting the subscription ACK.

At 855, the UE 115-*d* may transmit, and the TNGF 820 may receive, a registration request. The registration request may request registration with the first network type. The UE 115-*d* may transmit the registration request and attempt to connect to the first network type, for example, due to decreased or lost coverage of the second network type at the UE 115-*d*. For example, if a connection between the UE 115-*d* and the second network type is unreliable or disconnected, the UE 115-*d* may attempt to connect to the first network type, which may be the trusted backup network. The registration request may include an EAP response and one or more access network (AN) parameters. The one or more AN parameters may include a UE ID (e.g., an international mobile subscriber ID (IMSI), a subscription permanent ID (SUPI), or a GUTI), a selected public land mobile network (PLMN) ID, requested network slice assistance information (NSAI), an establishment cause (e.g., a lost connection to the network of the second network type), an indication of a non-access stratum (NAS) protocol data unit (PDU), or any combination thereof.

At 860, the TNGF 820 may transmit, and the near-RT RIC 175-*c* may receive, a RIC indication (e.g., an E2AP RIC indication) via the E2tr interface. The RIC indication may indicate that the connection between the TNGF 820 and the UE 115-*d* is established, as described, for example, with reference to step 715 in FIG. 7. For example, the TNGF 820 may establish a connection for communications with the UE 115-*d* in accordance with the first network type in response to the request from the UE 115-*d*. The TNGF 820 may transmit the RIC indication to inform the near-RT RIC 175-*c* that the UE 115-*d* connected to the first network type. The RIC indication may implicitly or explicitly indicate that the UE 115-*d* attempted to connect to the first network type based on a failed connection with the second network type, in some examples.

At 865, the near-RT RIC 175-*c* may prepare RRC and mobility control policies. For example, the near-RT RIC may prepare an idle mode and a connected mode for the surrounding cells 805, which may be target cells for connection with the UE 115-*d* that surround the TNAP (e.g., a collocated cell). Preparing the RRC and mobility control policies may be referred to as performing a communication management operation or a corrective traffic steering optimization process in some examples herein. That is, the near-RT RIC 175-*c* may adjust one or more communication management parameters for one or more network entities associated with the second network type. The near-RT RIC 175-*c* may perform the communication management operation based on the RIC indication received from the TNGF 820. The near-RT RIC 175-*c* may perform the communication management operation in an attempt to improve conditions within the second network type to improve future connections with the UE 115-*d*.

At 870, the UE 115-*d* may register with (e.g., connect to) the second network type. For example, an AMF 840 may be selected for the connection with the UE 115-*d*, and the UE 115-*d* and may subsequently perform a registration procedure with the core network of the second network type via the TNGF 820 and the AMF 840. The UE 115-*d* may connect to the second network type based on the optimizations performed by the near-RT RIC 175-*c* at 865, in some examples. Additionally, or alternatively, the UE 115-*d* may be configured to prioritize a connection with the second network type over a connection with the first network type, and the UE 115-*d* may attempt to connect to the second network periodically or at various time instances.

At 875, the near-RT RIC 175-*c* may transmit, and the surrounding cells 805 may receive, a message including a RIC control request (e.g., an E2AP RIC control request via an E2 interface). The near-RT RIC 175-*c* may, in some examples, transmit the message in response to receiving the RIC indication that indicates the connection between the UE 115-*d* and the TNGF 820 at 860. In some examples, the message may include an indication of one or more network optimization parameters to be used by the surrounding cells 805, which may improve network efficiency and reliability across the surrounding cells 805. The message may be associated with the communication management operation described in more detail with reference to step 735 of FIG. 7 and to step 1240 of FIG. 12.

At 880, the surrounding cells 805 may change one or more parameters in accordance with or based on the RIC control request received from the near-RT RIC 175-*c* at 875. For example, a gNB CU or DU, or some other network entity in each of the one or more surrounding cells 805, may change radio resource management (RRM) parameters and/or mobility management parameters to optimize coverage.

At 885, the surrounding cells 805 may transmit, and the near-RT RIC 175-*c* may receive, a RIC control ACK (e.g., via the E2 interface or some other interface), which may indicate that the RIC control request was received at 875. In some examples, the RIC control ACK may include an indication of the parameters changed at 880. In some examples, the near-RT RIC may transmit the RIC control request and/or receive the RIC control ACK within a 10-millisecond timeframe.

At 890, the TNAN session may be torn down. For example, the TNGF 820, the TNAP 835, and one or more other devices or components associated with the first network type may be disabled or disconnected to conserve power and costs. The first network may be disabled based on the connection between the UE 115-*d* and the second network type being successful or associated with at least a threshold connection quality. The deconstruction or removal of the first network type may be initiated by one or more devices in the second network type, the first network type, or both.

In a first example, the UE 115-*d* may initiate a TNAN session teardown in response to detecting improved conditions associated with the connection between the UE 115-*d* and the second network type. In some instances, the correction and optimization procedures performed by the near-RT RIC 175-*c* and/or one or more other entities within the second network (e.g., profile tuning) may improve the network conditions for the second network type. The UE 115-*d* may be configured with a preference to connect with the second network type over the first network type when conditions support such a connection, such that the UE 115-*d* may initiate the disconnection of the backup network after the UE 115-*d* determines the connection with the second network type is stable and reliable. UE-initiated TNAN session teardown may be described in more detail elsewhere herein, including with reference to FIG. 9.

In a second example, the network core of the second network type may initiate the TNAN session teardown. For example, the network core of the second network type may determine to disable the first network type based on receiving KPIs from surrounding cells 805 that meet KPI criteria or exceed a threshold. Network core-initiated TNAN session teardown may be described in more detail elsewhere herein, including with reference to FIG. 10.

In a third example, the non-RT RIC may initiate the TNAN session teardown. For example, the non-RT RIC may receive machine learning data and/or KPIs over a period of time from the surrounding cells 805 (which may be private network gNBs). If the indicated KPIs meet or exceed a threshold, the non-RT RIC may initiate the TNAN session teardown. Non-RT RIC-initiated TNAN session teardown may be described in more detail elsewhere herein, including with reference to FIG. 11.

Figure 9:
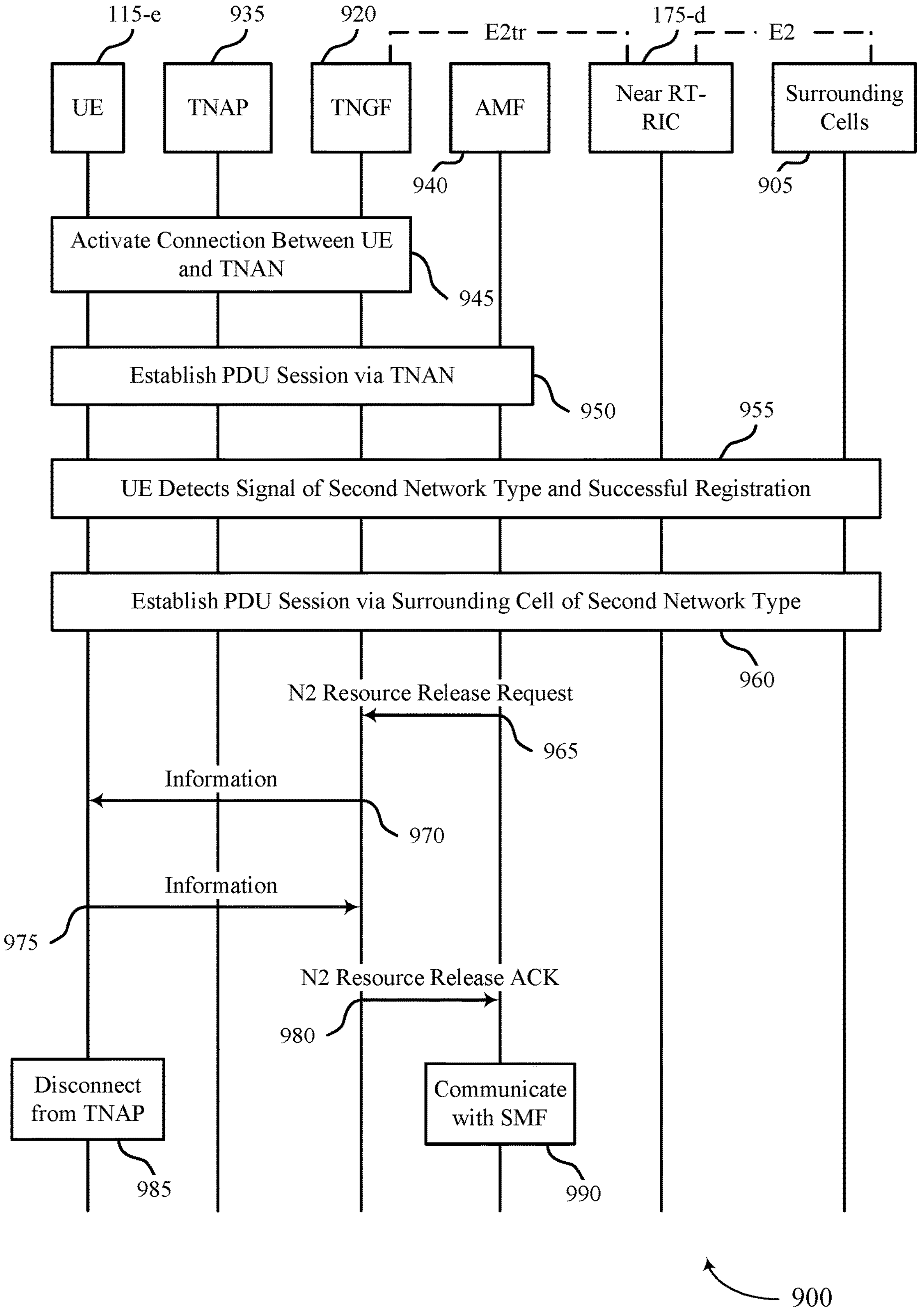

FIG. 9 shows an example of a process flow 900 that supports deployment of a private network using integration with a trusted backup network in accordance with one or more aspects of the present disclosure. The process flow 900 shows a UE 115-*e* initiating a TNAN session disconnection based on a successful registration between the UE 115-*e* and the second network type. The process flow 900 may implement or be implemented by aspects of the wireless communications system 100, the network architecture 200, and the integrated network architectures 300 and 400, as described with reference to FIGS. 1-8. For example, the process flow 900 illustrates actions performed by a client device (e.g., the UE 115-*e*), the TNAP 935, the TNGF 920, an AMF 940, a near-RT RIC 175-*d*, and surrounding cells 905 (e.g., a gNB, a CU, or a DU), among other devices, as part of deployment of a private network of a second type (e.g., 3GPP) using integration with a first network type (e.g., non-3GPP). The devices and components described with reference to FIG. 9 may represent examples of corresponding devices and components as described with reference to FIGS. 1-8.

In the following description of the process flow 900, the operations described may be performed in a different order than the order shown, or other operations may be added or removed from the process flow 900. Specific operations may also be left out of the process flow 900 or may be performed in different orders or at different times. Further, although some operations or signaling may be shown to occur at different times for discussion purposes, these operations may actually occur at the same time.

In this example, the UE 115-*e* may connect to a trusted backup network via the TNGF 920 based on a failed connection with the second network type. For example, at 945, a connection may be activated between the UE 115-*e* and the TNAN, which may include the TNAP 935 and the TNGF 920. At 950, the UE 115-*e* may establish a PDU session via the TNAN based on the connection. The connection between the UE 115-*e* and the backup network (e.g., first network) after a failed connection with the second network may be described in further detail elsewhere herein, including with reference to steps 845-860 in FIG. 8.

At 955, the UE 115-*e* may detect a network signal of the second network type and successful registration with one or more surrounding cells 905 of the second network type. At 960, the UE 115-*e* may successfully establish a PDU session via at least one surrounding cell 905 of the second network type. That is, the TNGF 920 and the second network may communicate via one or more interfaces to improve connection parameters of the second network. For example, the one or more interfaces may represent examples of the E2tr interface, as described with reference to FIGS. 2-8. The UE 115-*e* may attempt to re-connect to the second network based on the improved connection parameters. The UE 115-*e* may transfer from a connection with the backup network of the first type to a connection with the second network type, as described in further detail elsewhere herein, including with reference to FIG. 7 and steps 860-885 of FIG. 8.

The UE 115-*e* may detect at least one signal from the second network and determine that registration was successful with a network entity of the second network. The UE 115-*e* may establish the PDU session based on determining the registration was successful. In some examples, if a quality of the connection between the UE 115-*e* and the second network exceeds a threshold quality, the UE 115-*e* may initiate a disconnection of the first network, which may be referred to as a TNAN session teardown or disconnection, as described with reference to FIG. 8. That is, in this example, the TNAN session disconnection as described with reference to FIG. 8 may be initiated by the UE 115-*c*.

At 965, the AMF 940 may transmit, and the TNGF 920 may receive, an N2 resource release request. For example, the N2 resource release request may request the release of TNGF resources. That is, the resource release request may request for a connection between the TNGF 920 and the second network to be disabled. In some examples, the AMF 940 may transmit the N2 resource release request based on the UE 115-*e* connecting to the second network type. Additionally, or alternatively, the UE 115-*e* may transmit a signal or indication to the AMF 940 that triggers the AMF 940 to transmit the N2 resource release request. In some other examples, one or more measurements or parameters associated with the connection between the UE 115-*e* and the second network may exceed a threshold quality, and the AMF 940 may transmit the resource release request based on the connection exceeding the threshold quality.

At 970, the TNGF 920 may transmit, and the UE 115-*e* may receive, information, such as an indication or request to delete a payload (e.g., a request to release AN resources corresponding to the PDU session with the backup network, the PDU session ID, or the like). In some examples, the information may be transmitted via an RRC message. In some examples, the TNGF 920 may include information from the N2 resource release request received at 965. At 975, the UE 115-*e* may transmit, and the TNGF 920 may receive, information, such as an acknowledgment of the request to delete a payload, a message confirming that the payload was deleted, indicating the PDU session ID, or the like.

At 980, the TNGF 920 may transmit, and the AMF 940 may receive, an N2 resource release ACK. For example, the N2 resource release ACK may acknowledge that the TNGF resources have been released, or the N2 resource release ACK may indicate that the TNGF resources will be released. That is, the resource release ACK may indicate that the connection between the TNGF 920 and the second network type is disabled.

At 985, the UE 115-*e* may disconnect from the TNAP 935. That is, the TNAN session may be torn down. For example, the TNGF 920, the TNAP 935, and one or more other devices or components associated with the first network type may be disabled or disconnected to conserve power and costs. In this example, the UE 115-*e* may trigger or initiate the first network disablement based on the connection between the UE 115-*e* and the second network type being successful or associated with at least a threshold connection quality. In some examples, the UE 115-*e* may continue to use the network of the second network type until second network type coverage is lost or drops below a threshold connection quality.

At 990, the AMF 940 may communicate with a session management function (SMF). For example, the AMF 940 may transmit, and the SMF may receive, N2 SM resource release acknowledgment, secondary RAT usage data, user location information, and the like. In some examples, the SMF may transmit, and the AMF 940 may receive, a response to the information transmitted by the AMF 940.

In this example, the UE 115-*e* may thereby initiate a disconnection from the first network type after using the first network type as a backup network during deployment of the second network type. In some other examples, the disconnection of the first network type may be initiated by one or more other entities, as described in further detail elsewhere herein, including with reference to FIGS. 10 and 11.

Figure 10:
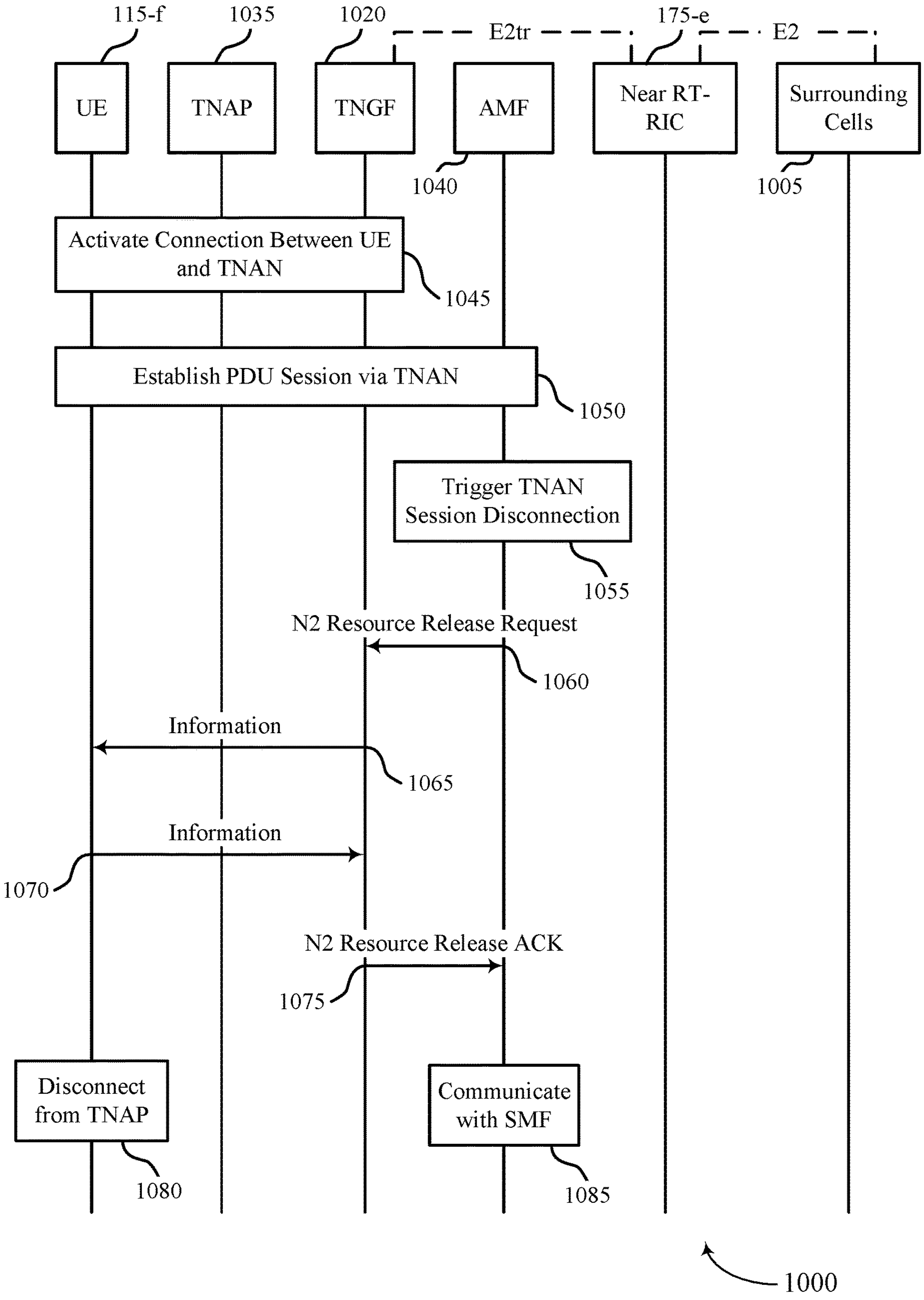

FIG. 10 shows an example of a process flow 1000 that supports deployment of a private network using integration with a trusted backup network in accordance with one or more aspects of the present disclosure. The process flow 1000 shows a network core of the second network type (e.g., an AMF 1040) initiating a TNAN session disconnection (that is, disabling the first network type) based on receiving KPIs from surrounding cells 1005 that meet KPI criteria or exceed a threshold. The process flow 1000 may implement or be implemented by aspects of the wireless communications system 100, the network architecture 200, and the integrated network architectures 300 and 400, as described with reference to FIGS. 1-9. For example, the process flow 1000 illustrates actions performed by a client device (e.g., the UE 115-*f*), the TNAP 1035, the TNGF 1020, an AMF 1040, a near-RT RIC 175-*e*, and surrounding cells 1005 (e.g., a gNB, a CU, or a DU), among other devices, as part of deployment of a private network of a second type (e.g., 3GPP) using integration with a first network type (e.g., non-3GPP). The devices and components described with reference to FIG. 10 may represent examples of corresponding devices and components as described with reference to FIGS. 1-9.

In the following description of the process flow 1000, the operations described may be performed in a different order than the order shown, or other operations may be added or removed from the process flow 1000. Specific operations may also be left out of the process flow 1000 or may be performed in different orders or at different times. Further, although some operations or signaling may be shown to occur at different times for discussion purposes, these operations may actually occur at the same time.

In this example, the UE 115-*f* may connect to a trusted backup network via the TNGF 1020 based on a failed connection with the second network type. For example, at 1045, a connection may be activated between the UE 115-*f* and the TNAN, which may include the TNAP 1035 and the TNGF 1020.

At 1050, the UE 115-*f* may establish a PDU session via the TNAN based on the connection. The connection between the UE 115-*f* and the backup network (e.g., first network) after a failed connection with the second network may be described in further detail elsewhere herein, including with reference to steps 845-860 in FIG. 8.

At 1055, the AMF 1040 (e.g., the core network of the second network type) may trigger the TNAN session disconnection based on successful registration between the UE 115-*f* and the second network type. For example, the AMF 1040 may monitor KPIs associated with the connection between the UE 115-*f* and the second network type (e.g., the surrounding cells 1005), as described in more detail with reference to FIGS. 11 and 12. The AMF 1040 may initiate the TNAN session disconnection based on identifying that the monitored KPIs indicate that a quality of the second network connection meets or exceeds a threshold quality.

At 1060, the AMF 1040 may transmit, and the TNGF 1020 may receive, an N2 resource release request as part of the TNAN session disconnection initiated by the AMF 1040. For example, the N2 resource release request may request the release of TNGF resources. That is, the resource release request may request for a connection between the TNGF 1020 and the second network to be disabled. In some examples, the AMF 1040 may transmit the N2 resource release request based on receiving KPI associated with the connection between the UE 115-*f* and the second network type that exceed a threshold. Additionally, or alternatively, the AMF 1040 may identify that one or more other measurements or parameters associated with the connection between the UE 115-*f* and the second network may exceed a threshold quality, and the AMF 1040 may transmit the resource release request based on the connection exceeding the threshold quality.

At 1065, the TNGF 1020 may transmit, and the UE 115-*f* may receive, information, such as an indication or request to delete a payload (e.g., a request to release AN resources corresponding to the PDU session with the backup network, the PDU session ID, or the like). In some examples, the information may be transmitted via an RRC message. In some examples, the TNGF 1020 may include information from the N2 resource release request received at 1060. At 1070, the UE 115-*f* may transmit, and the TNGF 1020 may receive information, such as an acknowledgment of the request to delete a payload, a message confirming that the payload was deleted, indicating the PDU session ID, or the like.

At 1075, the TNGF 1020 may transmit, and the AMF 1040 may receive, an N2 resource release ACK. For example, the N2 resource release ACK may acknowledge that the TNGF resources have been released, or the N2 resource release ACK may indicate that the TNGF resources will be released. That is, the resource release ACK may indicate that the connection between the TNGF 1020 and the second network type is disabled.

At 1080, the UE 115-*f* may disconnect from the TNAP 1035. That is, the TNAN session may be torn down. For example, the TNGF 1020, the TNAP 1035, and one or more other devices or components associated with the first network type may be disabled or disconnected to conserve power and costs. In this example, the AMF 1040 may trigger or initiate the first network disablement based on the connection between the UE 115-*f* and the second network type being successful or associated with at least a threshold connection quality. In some examples, the UE 115-*f* may continue to use the network of the second network type until second network type coverage is lost or drops below a threshold connection quality.

At 1085, the AMF 1040 may communicate with an SMF. For example, the AMF 1040 may transmit, and the SMF may receive, an N2 SM resource release acknowledgment, secondary RAT usage data, user location information, and the like. In some examples, the SMF may transmit, and the AMF 1040 may receive, a response to the information transmitted by the AMF 1040.

In this example, the AMF 1040 may thereby initiate a disconnection of the first network type after using the first network type as a backup network during deployment of the second network type. In some other examples, the disconnection of the first network type may be initiated by one or more other entities, as described in further detail elsewhere herein, including with reference to FIGS. 9 and 11.

Figure 11:
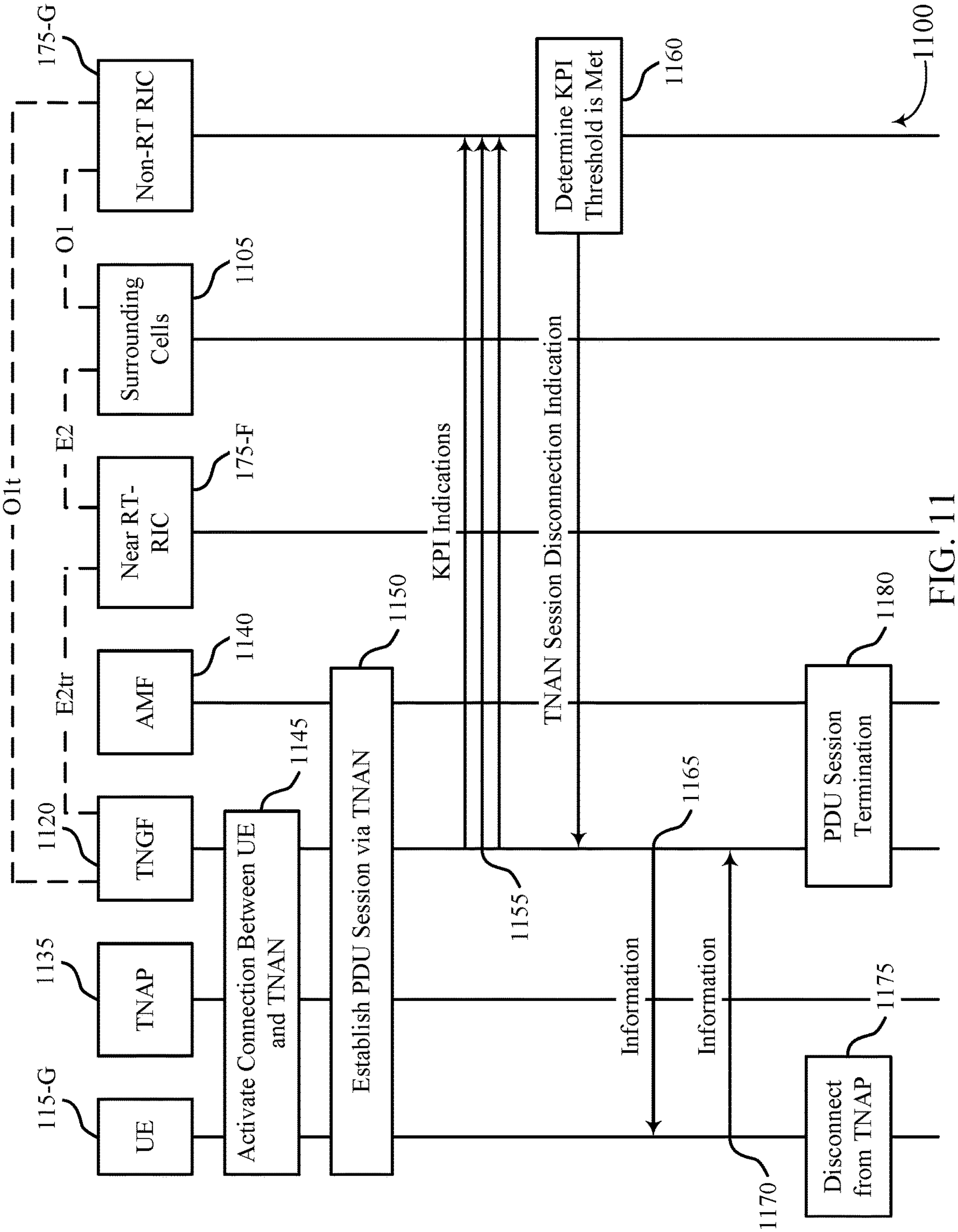

FIG. 11 shows an example of a process flow 1100 that supports deployment of a private network using integration with a trusted backup network in accordance with one or more aspects of the present disclosure. The process flow 1100 shows a non-RT RIC 175-*g* (e.g., a node or component of an SMO) initiating a TNAN session disconnection. The process flow 1100 may implement or be implemented by aspects of the wireless communications system 100, the network architecture 200, and the integrated network architectures 300 and 400, as described with reference to FIGS. 1-10. For example, the process flow 1100 illustrates actions performed by a client device (e.g., the UE 115-*g*), the TNAP 1135, the TNGF 1120, an AMF 1140, a near-RT RIC 175-*f*, surrounding cells 1105 (e.g., a gNB, a CU, or a DU), and a non-RT RIC 175-*g*, among other devices, as part of deployment of a private network of a second type (e.g., 3GPP) using integration of a first network type (e.g., non-3GPP). The devices and components described with reference to FIG. 11 may represent examples of corresponding devices and components as described with reference to FIGS. 1-10.

In the following description of the process flow 1100, the operations described may be performed in a different order than the order shown, or other operations may be added or removed from the process flow 1100. Specific operations may also be left out of the process flow 1100 or may be performed in different orders or at different times. Further, although some operations or signaling may be shown to occur at different times for discussion purposes, these operations may actually occur at the same time.

In this example, the UE 115-*g* may connect to a trusted backup network via the TNGF 1120 based on a failed connection with the second network type. For example, at 1145, a connection may be activated between the UE 115-*g* and the TNAN, which may include the TNAP 1135 and the TNGF 1120.

At 1150, the UE 115-*g* may establish a PDU session via the TNAN based on the connection. The connection between the UE 115-*g* and the backup network (e.g., first network) after a failed connection with the second network may be described in further detail elsewhere herein, including with reference to steps 845-860 in FIG. 8.

At 1155, the TNGF 1120 may transmit, and the non-RT RIC 175-*g* (e.g., the SMO) may receive, indications of KPI associated with the connection between the UE 115-*g* and the second network type (e.g., the surrounding cells 1105, which may be associated with one or more private network gNBs). The TNGF 1120 may transmit the KPI indications periodically or semi-statically over time. In some examples, the non-RT RIC 175-*g* may also receive machine learning data from the TNGF 1120.

At 1160, the non-RT RIC 175-*g* may determine that the received KPI indications indicate a quality of the second network connection meets or exceeds a threshold quality. Additionally, or alternatively, in some examples, the non-RT RIC 175-*g* may input the KPIs and one or more other parameters into a machine learning algorithm, and the machine learning algorithm may output an indication of the connection between the UE 115-*f* and the second network type exceeding a threshold quality. Based on determining that the threshold has been met or exceeded or based on the machine learning output, in some examples, the non-RT RIC 175-*g* may transmit, and the TNGF 1120 may receive, an indication to disconnect the TNAN session. In some examples, the TNAN session disconnection indication may be transmitted via an interface, such as the O1t interface, as described with reference to FIGS. 4 and 7.

At 1165, the TNGF 1120 may transmit, and the UE 115-*g* may receive, information, such as an indication or request to delete a payload (e.g., a request to release AN resources corresponding to the PDU session with the backup network, the PDU session ID, or the like). In some examples, the information may be transmitted via an RRC message. In some examples, the TNGF 1120 may include information from the TNAN session disconnection indication received at 1160. Additionally, or alternatively, the TNGF 1120 may transmit a message instructing the TNAP 1135 to perform MAC-based kick-off for a configurable duration to give the UE 115-*g* sufficient time (e.g., sufficient retries) to perform successful registration & session establishment with the second network.

At 1170, the UE 115-*g* may transmit, and the TNGF 1120 may receive, information, such as an acknowledgment of the request to delete a payload, a message confirming that the payload was deleted, indicating the PDU session ID, or the like.

At 1175, the UE 115-*g* may disconnect from the TNAP 1135. That is, the TNAN session may be torn down. For example, the TNGF 1120, the TNAP 1135, and one or more other devices or components associated with the first network type may be disabled or disconnected to conserve power and costs. One or more interfaces may be disabled in response to the non-RT RIC 175-*g* determining that a threshold connection quality is reached, e.g., the O1t and E2tr interfaces described with reference to FIGS. 2-10. In some examples, the UE 115-*g* may continue to use the network of the second network type until second network type coverage is lost.

At 1180, the TNGF 1120 and the AMF 1140 may terminate the PDU session via at least one surrounding cell 1105 of the second network type. That is, based on the non-RT RIC 175-*g* determining that a threshold connection quality is reached between the UE 115-*g* and the second network type, the PDU session connecting the UE 115-*g* to the first network type may be disconnected.

In this example, the non-RT RIC 175-*g* may thereby initiate a disconnection between the UE and the first network type after using the first network type as a backup network during deployment of the second network type. In some other examples, the disconnection of the first network type may be initiated by one or more other entities, as described in further detail elsewhere herein, including with reference to FIGS. 9 and 10.

Figure 12:
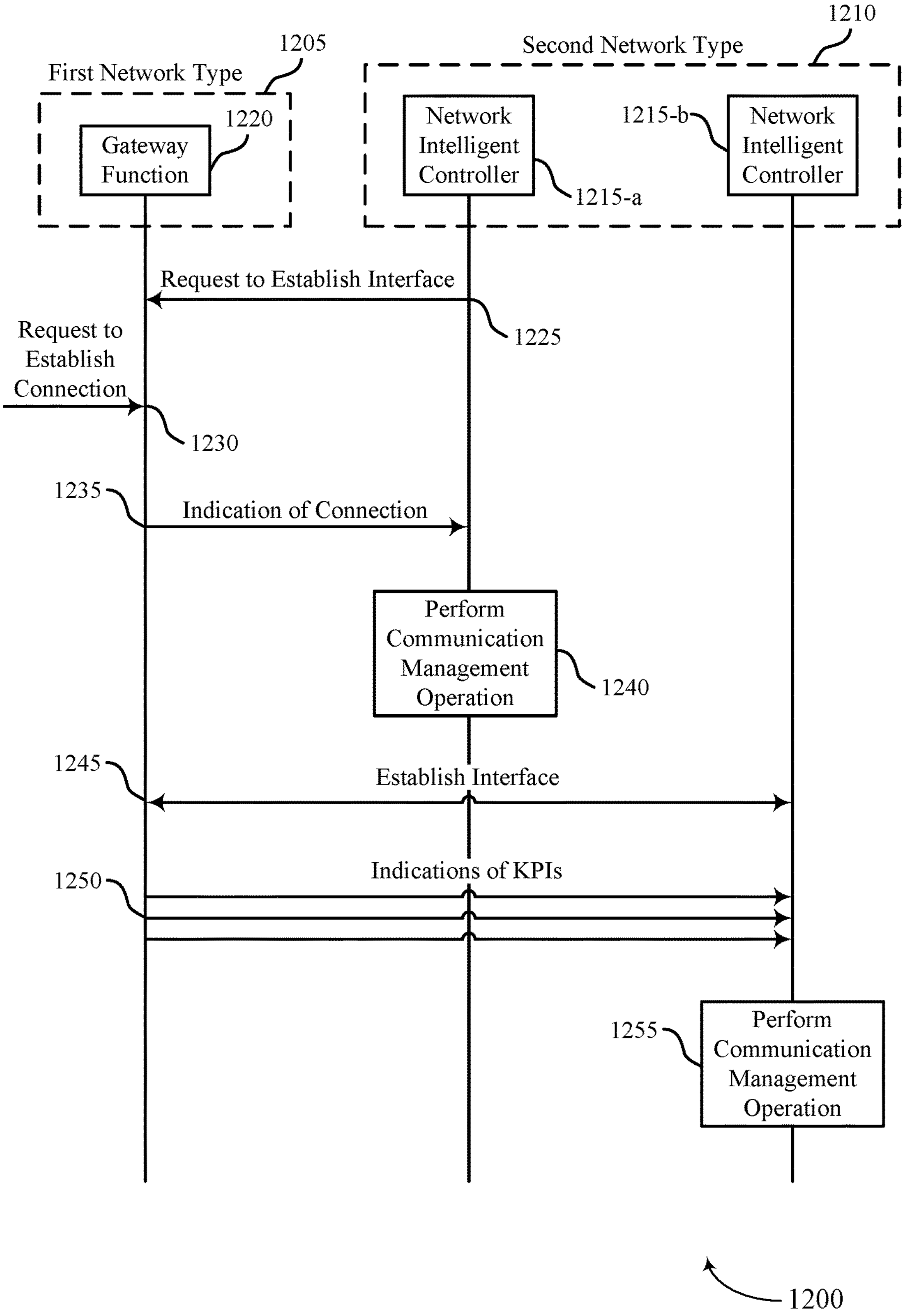

FIG. 12 shows an example of a process flow 1200 that supports deployment of a private network using integration with a trusted backup network in accordance with one or more aspects of the present disclosure. The process flow 1200 may implement or be implemented by aspects of the wireless communications system 100, the network architecture 200, and the integrated network architectures 300 and 400, as described with reference to FIGS. 1-11. For example, the process flow 1200 illustrates actions performed by one or more devices of a first network type 1205 (e.g., non-3GPP) and one or more devices of a second network type 1210 (e.g., 3GPP), among other devices (such as a wireless device), as part of deployment of a private network of the second type using integration of the first network type. The devices and components described with reference to FIG. 12 may represent examples of corresponding devices and components as described with reference to FIGS. 1-11. For example, a gateway function 1220 of the first network type 1205 may be an example of a TNGF, a network intelligent controller 1215-*a* of the second network type 1210 may be an example of a near-RT RIC, and a network intelligent controller 1215-*b* may be an example of a non-RT RIC or SMO, as described with reference to FIGS. 1-11

In the following description of the process flow 1200, the operations described may be performed in a different order than the order shown, or other operations may be added or removed from the process flow 1200. Specific operations may also be left out of the process flow 1200 or may be performed in different orders or at different times. Further, although some operations or signaling may be shown to occur at different times for discussion purposes, these operations may actually occur at the same time.

At 1225, the network intelligent controller 1215-*a* may transmit, and the gateway function 1220 may receive, a message including a request to establish an interface between the gateway function 1220 and the network intelligent controller 1215-*a*. The message may represent an example of an E2AP RIC subscription request, or some other type of message, and the interface may represent an E2tr interface, or some other type of interface as described herein.

At 1230, a wireless device (e.g., a client device, such as a UE 115 as described with reference to FIGS. 1-11) may transmit, and the gateway function 1220 may receive, a message (e.g., an early access protocol message) including a request to establish a connection with between wireless device and the gateway function 1220 in accordance with the first network type 1205. The connection request message may be transmitted based on a failed connection between the wireless device and the second network type 1210. The message may also convey an ID associated with the wireless device.

At 1235, the gateway function 1220 may transmit, and the network intelligent controller 1215-*a* may receive (e.g., via the E2tr interface), a message including an indication that the connection between the wireless device and the gateway function 1220 is established, as described with reference to step 740 of FIG. 7. The message may include an ID of the wireless device and/or an ID of an AP associated with the first network type 1205.

At 1240, the network intelligent controller 1215-*a* may perform a communication management operation for one or more RAN components of the second network type 1210 based on receiving the message at 1235. Performing the communication management operation may include, for example, modifying an allocation of one or more radio resources within the second network type 1210, modifying one or more parameters associated with radio access control for the second network type 1210, modifying one or more parameters associated with a connection management for the second network type 1210, modifying one or more parameters associated with a mobility management for the second network type 1210, or any combination thereof. In some examples, the network intelligent controller 1215-*a* may transmit and one or more network entities of the second network type 1210 may receive, a control request that indicates the connection between the gateway function 1220 ad the wireless device is established. In such examples, the control request may indicate one or more network optimization parameters associated with the communication management operation.

At 1245, the network intelligent controller 1215-*b* may establish, as part of network integration, an interface (e.g., an O1t interface, as described with reference to FIGS. 1-11) between the network intelligent controller 1215-*b* and the gateway function 1220. In some examples, the network intelligent controller 1215-*b* may receive (e.g., via the O1t interface) a message indicating a successful registration between the wireless device and the second network type 1210. The message may include an ID of the wireless device and an ID of an AP associated with the first network type 1205.

At 1250, the gateway function 1220 may transmit, and the network intelligent controller 1215-*b* may receive, an indication of one or more KPIs associated with the connection between the wireless device and the second network type 1210. In some examples, the KPIs may be transmitted periodically via the interface established at 1245. In some examples, the network intelligent controller 1215-*b* may receive the KPIs based on the successful registration indicated at 1245.

At 1255, the network intelligent controller 1215-*b* may perform a communication management operation for one or more network entities of the second network type 1210 based on the one or more KPIs received at 1250 (as described in more detail with reference to FIG. 7). If a desired optimization has not been reached (e.g., the received KPIs are below a threshold value), the network intelligent controller 1215-*b* may perform course-corrective network orchestration and optimization. If a desired optimization has been reached (e.g., the received KPIs are at or exceed a threshold value), the network intelligent controller 1215-*b*, the wireless device, the network core of the second network type 1210, or any combination thereof may initiate a TNAN session teardown or disconnection in response to improved conditions associated with the connection between the UE 115-*d* and the second network type, as described with reference to FIGS. 9-11.

The gateway function 1220, among other components and devices of the first network type 1205, may thereby be integrated with one or more components of the second network type 1210 to facilitate efficient and reliable deployment of the second network type 1210. By using the first network type 1205 as a backup network, the second network type 1210 may be able to adjust network parameters and establish a reliable connection with a wireless device more efficiently than if the second network type 1210 did not use the first network type 1205.

Figure 13:
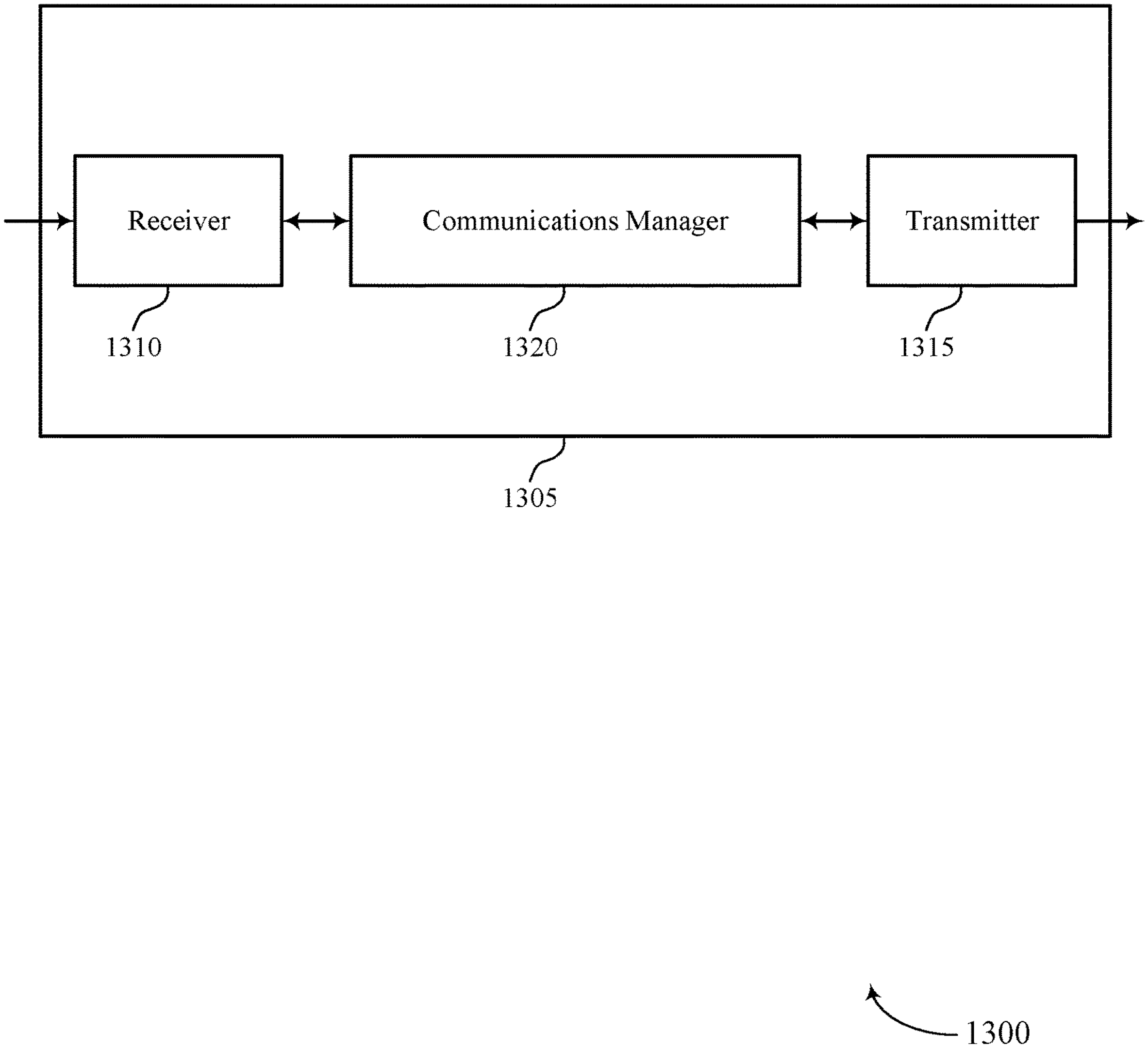
FIGS. 13 and 14 show block diagrams of devices that support deployment of a private network using integration with a trusted backup network in accordance with one or more aspects of the present disclosure.

FIG. 13 shows a block diagram 1300 of a device 1305 that supports deployment of a private network using integration with a trusted backup network in accordance with one or more aspects of the present disclosure. The device 1305 may be an example of aspects of a gateway function as described herein. The device 1305 may include a receiver 1310, a transmitter 1315, and a communications manager 1320. The device 1305 may also include at least one processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to deployment of a private network using integration with a trusted backup network). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to deployment of a private network using integration with a trusted backup network). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of deployment of a private network using integration with a trusted backup network as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include at least one processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, in some examples, the communications manager 1320, the receiver 1310, the transmitter 1315, or various combinations or components thereof may be implemented in code (e.g., as communications management software or firmware) executed by at least one processor. If implemented in code executed by at least one processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

Additionally, or alternatively, the communications manager 1320 may support wireless communication at a gateway function of a first network type in accordance with examples as disclosed herein. For example, the communications manager 1320 is capable of, configured to, or operable to support a means for receiving a first message including a first request to establish, as part of a network integration, an interface between the gateway function of the first network type and a network intelligent controller of a second network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The communications manager 1320 is capable of, configured to, or operable to support a means for receiving, based on the network integration and a failed connection between a wireless device and the second network type, a second message including a second request to establish a connection with the wireless device in accordance with the first RAT, the failed connection associated with the second RAT. The communications manager 1320 is capable of, configured to, or operable to support a means for transmitting, to the network intelligent controller of the second network type via the interface, a third message indicating that the connection between the gateway function of the first network type and the wireless device is established.

By including or configuring the communications manager 1320 in accordance with examples as described herein, the device 1305 (e.g., at least one processor controlling or otherwise coupled with the receiver 1310, the transmitter 1315, the communications manager 1320, or a combination thereof) may support techniques for reduced processing, reduced power consumption, and more efficient utilization of communication resources during deployment of a network, among other possibilities.

Figure 14:
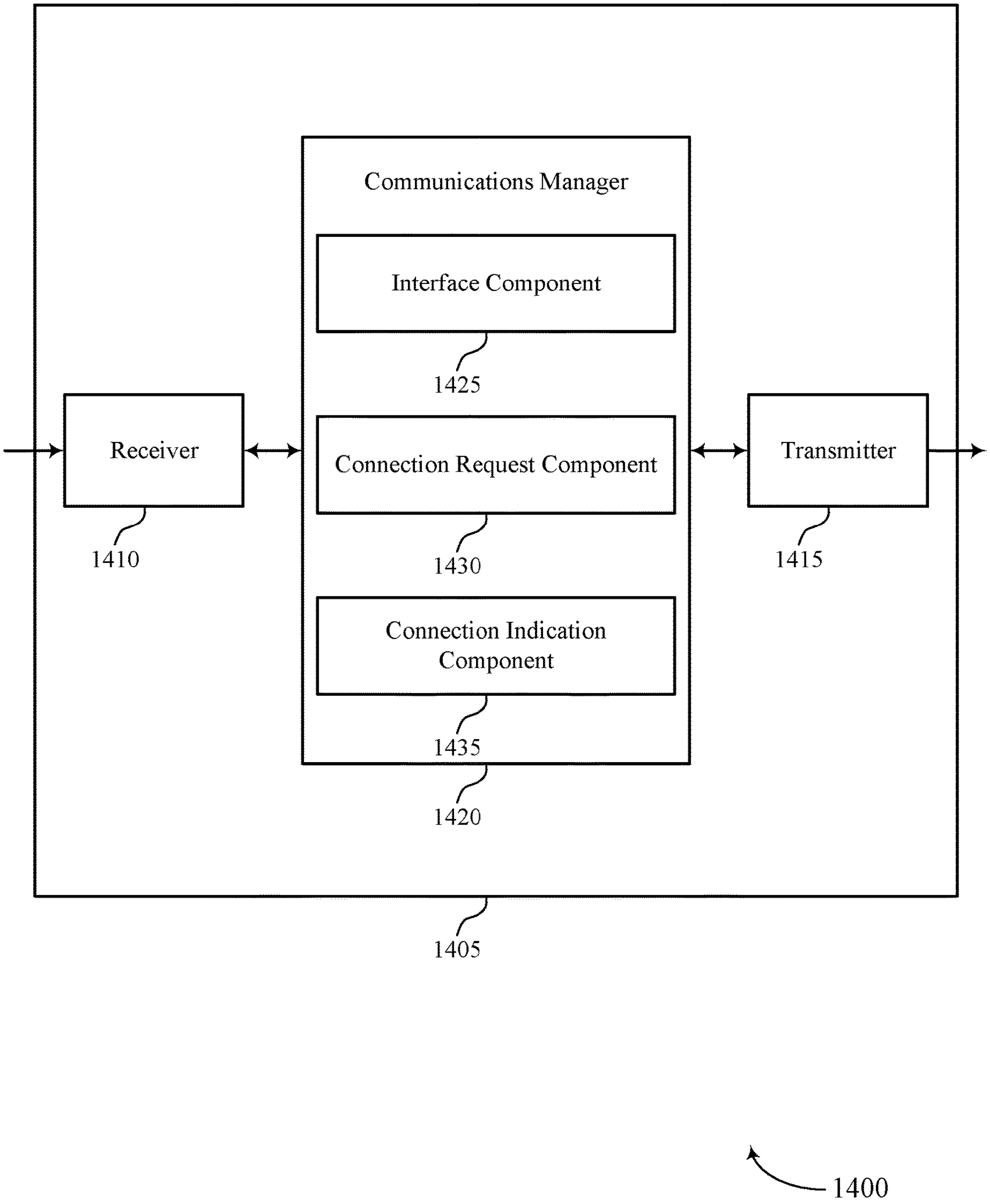

FIG. 14 shows a block diagram 1400 of a device 1405 that supports deployment of a private network using integration with a trusted backup network in accordance with one or more aspects of the present disclosure. The device 1405 may be an example of aspects of a device 1305 or a gateway function as described herein. The device 1405 may include a receiver 1410, a transmitter 1415, and a communications manager 1420. The device 1405 may also include at least one processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to deployment of a private network using integration with a trusted backup network). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to deployment of a private network using integration with a trusted backup network). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of deployment of a private network using integration with a trusted backup network as described herein. For example, the communications manager 1420 may include an interface component 1425, a connection request component 1430, a connection indication component 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a gateway function of a first network type in accordance with examples as disclosed herein. The interface component 1425 is capable of, configured to, or operable to support a means for receiving a first message including a first request to establish, as part of a network integration, an interface between the gateway function of the first network type and a network intelligent controller of a second network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The connection request component 1430 is capable of, configured to, or operable to support a means for receiving, based on the network integration and a failed connection between a wireless device and the second network type, a second message including a second request to establish a connection with the wireless device in accordance with the first RAT, the failed connection associated with the second RAT. The connection indication component 1435 is capable of, configured to, or operable to support a means for transmitting, to the network intelligent controller of the second network type via the interface, a third message indicating that the connection between the gateway function of the first network type and the wireless device is established.

Figure 15:
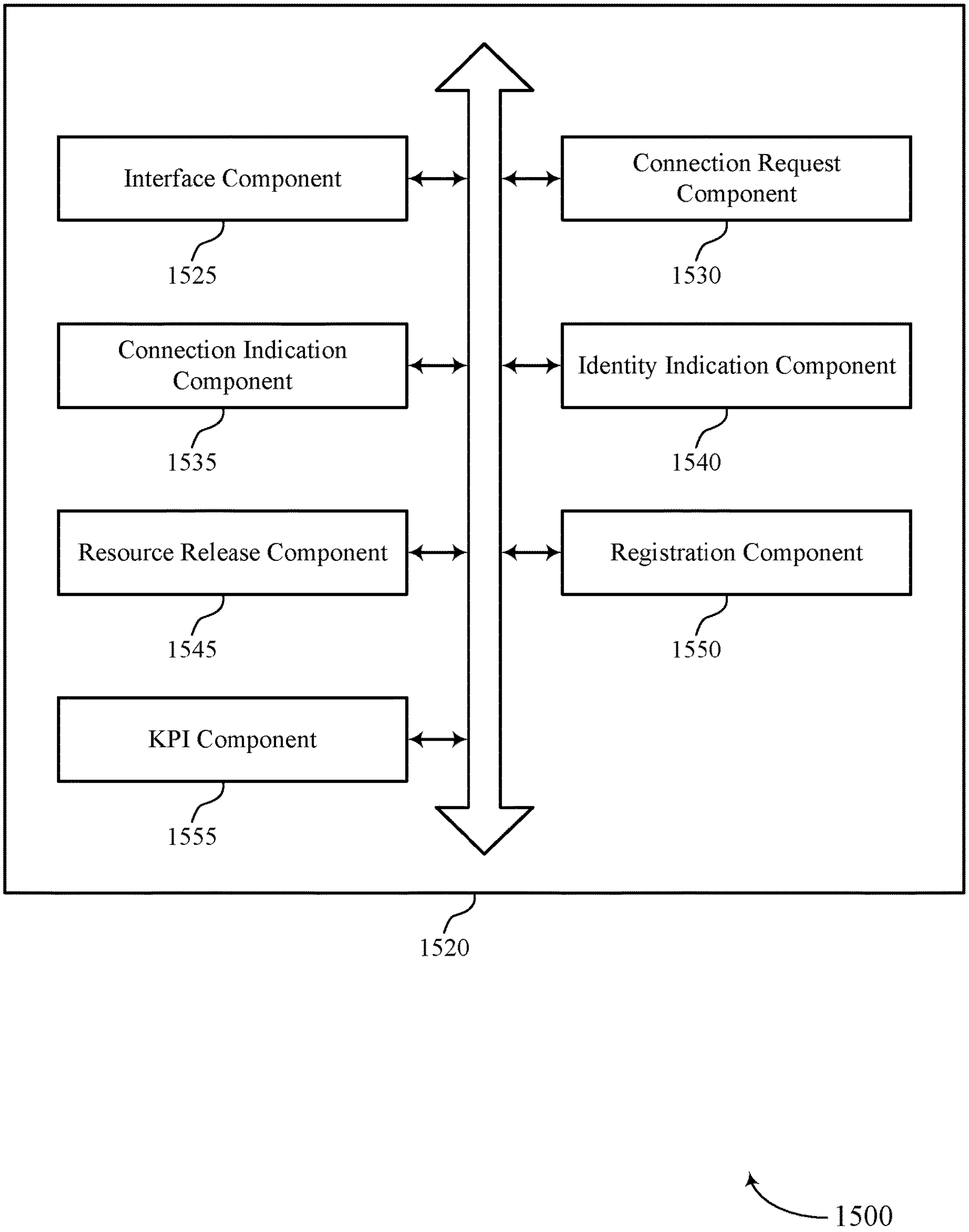
FIG. 15 shows a block diagram of a communications manager that supports deployment of a private network using integration with a trusted backup network in accordance with one or more aspects of the present disclosure.

FIG. 15 shows a block diagram 1500 of a communications manager 1520 that supports deployment of a private network using integration with a trusted backup network in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of deployment of a private network using integration with a trusted backup network as described herein. For example, the communications manager 1520 may include an interface component 1525, a connection request component 1530, a connection indication component 1535, an identity indication component 1540, a resource release component 1545, a registration component 1550, a KPI component 1555, or any combination thereof. Each of these components may communicate, directly or indirectly, with one another (e.g., via one or more buses).

Additionally, or alternatively, the communications manager 1520 may support wireless communication at a gateway function of a first network type in accordance with examples as disclosed herein. The interface component 1525 is capable of, configured to, or operable to support a means for receiving a first message including a first request to establish, as part of a network integration, an interface between the gateway function of the first network type and a network intelligent controller of a second network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The connection request component 1530 is capable of, configured to, or operable to support a means for receiving, based on the network integration and a failed connection between a wireless device and the second network type, a second message including a second request to establish a connection with the wireless device in accordance with the first RAT, the failed connection associated with the second RAT. The connection indication component 1535 is capable of, configured to, or operable to support a means for transmitting, to the network intelligent controller of the second network type via the interface, a third message indicating that the connection between the gateway function of the first network type and the wireless device is established.

In some examples, to support receiving the second message, the identity indication component 1540 is capable of, configured to, or operable to support a means for receiving an indication of a GUTI, an IMSI, a SUPI, PLMN ID, NSAI, or any combination thereof associated with the wireless device.

In some examples, to support receiving the second message, the identity indication component 1540 is capable of, configured to, or operable to support a means for receiving an early access protocol message that indicates an ID of the wireless device and indicates the second request to establish the connection with the wireless device.

In some examples, the identity indication component 1540 is capable of, configured to, or operable to support a means for transmitting, via the third message based on establishing the connection with the wireless device, an ID of the wireless device and an ID of an AP associated with the first network type.

In some examples, the interface component 1525 is capable of, configured to, or operable to support a means for establishing a second interface between the gateway function of the first network type and a second network intelligent controller of the second network type.

In some examples, the registration component 1550 is capable of, configured to, or operable to support a means for monitoring a registration between the wireless device and the second network type. In some examples, the registration component 1550 is capable of, configured to, or operable to support a means for transmitting, via the second interface, a fourth message that indicates the registration between the wireless device and the second network type is successful, where the fourth message includes an ID of the wireless device and an ID of an AP associated with the first network type.

In some examples, the KPI component 1555 is capable of, configured to, or operable to support a means for measuring one or more KPIs associated with a second connection between the wireless device and the second network type. In some examples, the KPI component 1555 is capable of, configured to, or operable to support a means for transmitting, via the second interface and in accordance with a periodicity, an indication of the one or more KPIs.

In some examples, the KPI component 1555 is capable of, configured to, or operable to support a means for receiving, via the second interface, an indication that values of the one or more KPIs exceed a threshold, where the indication includes a trigger to disable the connection between the wireless device and the gateway function. In some examples, the connection indication component 1535 is capable of, configured to, or operable to support a means for disabling the connection between the wireless device and the gateway function based on the indication. In some examples, the interface component 1525 is capable of, configured to, or operable to support a means for disabling the interface and the second interface based on the indication.

In some examples, the resource release component 1545 is capable of, configured to, or operable to support a means for receiving a resource release request based on a quality of a second connection between the wireless device and the second network type exceeding a threshold quality. In some examples, the resource release component 1545 is capable of, configured to, or operable to support a means for disabling the connection between the gateway function of the first network type and the wireless device based on the resource release request. In some examples, the resource release component 1545 is capable of, configured to, or operable to support a means for transmitting, based on disabling the connection, an acknowledgment message responsive to the resource release request.

In some examples, the registration component 1550 is capable of, configured to, or operable to support a means for monitoring a registration between the wireless device and the second network type. In some examples, the registration component 1550 is capable of, configured to, or operable to support a means for transmitting, via the interface, a fourth message indicating that the registration between the wireless device and the second network type failed, where the fourth message includes an ID of the wireless device and an ID of an AP associated with the first network type.

In some examples, the first network type includes a trusted non-third generation partnership project (3GPP) network and the second network type includes a 3GPP network.

Figure 16:
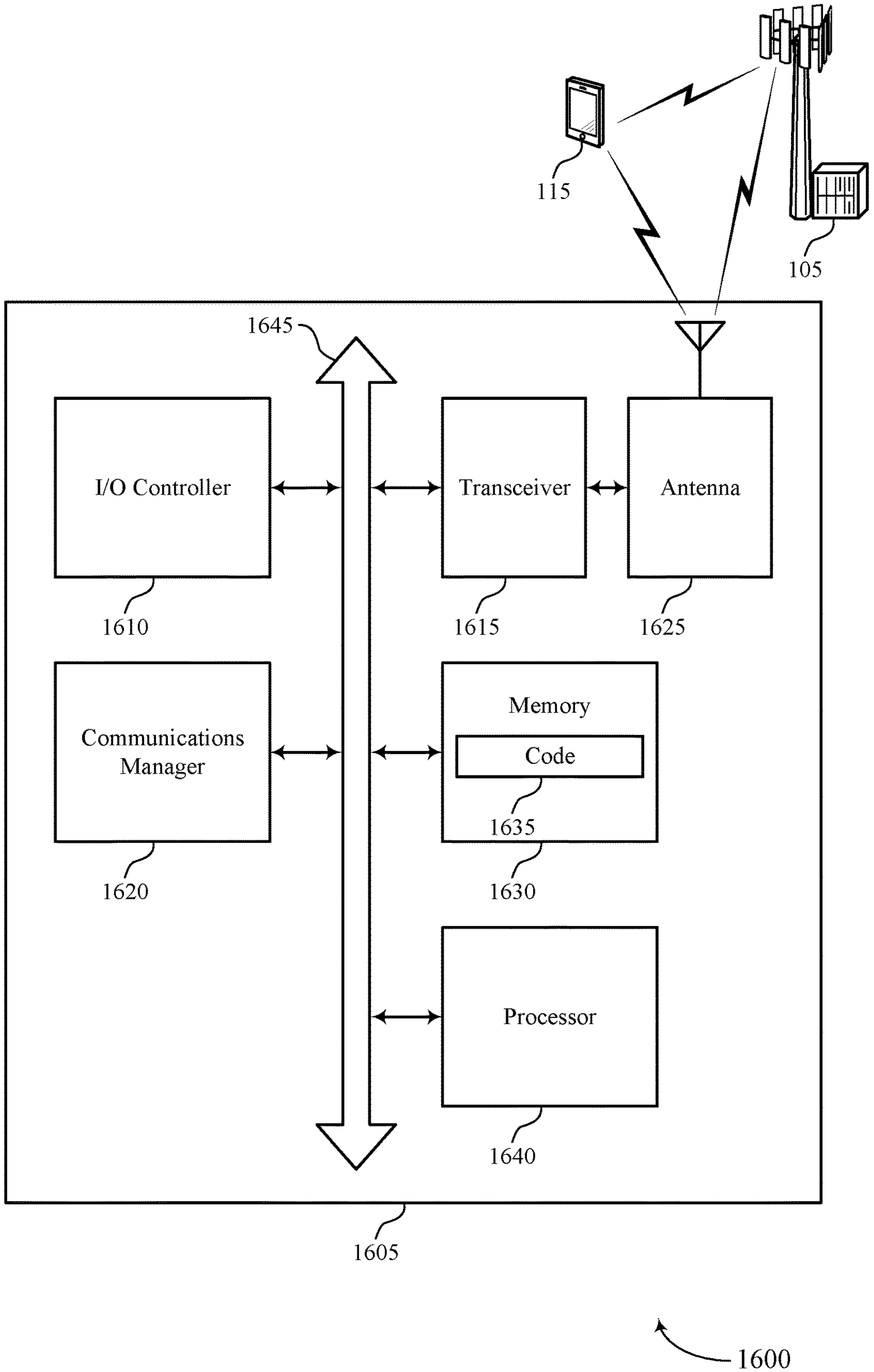
FIG. 16 shows a diagram of a system including a device that supports deployment of a private network using integration with a trusted backup network in accordance with one or more aspects of the present disclosure.

FIG. 16 shows a diagram of a system 1600 including a device 1605 that supports deployment of a private network using integration with a trusted backup network in accordance with one or more aspects of the present disclosure. The device 1605 may be an example of or include the components of a device 1305, a device 1405, or a gateway function as described herein. The device 1605 may include components for bi-directional voice and data communications including components for transmitting and receiving communications, such as a communications manager 1620, an I/O controller 1610, a transceiver 1615, an antenna 1625, at least one memory 1630, code 1635, and at least one processor 1640. These components may be in electronic communication or otherwise coupled (e.g., operatively, communicatively, functionally, electronically, electrically) via one or more buses (e.g., a bus 1645).

The I/O controller 1610 may manage input and output signals for the device 1605. The I/O controller 1610 may also manage peripherals not integrated into the device 1605. In some cases, the I/O controller 1610 may represent a physical connection or port to an external peripheral. In some cases, the I/O controller 1610 may utilize an operating system such as iOS®, ANDROID®, MS-DOS®, MS-WINDOWS®, OS/2®, UNIX®, LINUX®, or another known operating system. Additionally, or alternatively, the I/O controller 1610 may represent or interact with a modem, a keyboard, a mouse, a touchscreen, or a similar device. In some cases, the I/O controller 1610 may be implemented as part of at least one processor, such as the at least one processor 1640. In some cases, a user may interact with the device 1605 via the I/O controller 1610 or via hardware components controlled by the I/O controller 1610.

In some cases, the device 1605 may include a single antenna 1625. However, in some other cases, the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The at least one memory 1630 may include RAM and ROM. The at least one memory 1630 may store computer-readable, computer-executable code 1635 including instructions that, when executed by the at least one processor 1640, cause the device 1605 to perform various functions described herein. The code 1635 may be stored in a non-transitory computer-readable medium such as system memory or another type of memory. In some cases, the code 1635 may not be directly executable by the at least one processor 1640 but may cause a computer (e.g., when compiled and executed) to perform functions described herein. In some cases, the at least one memory 1630 may contain, among other things, a BIOS which may control basic hardware or software operation such as the interaction with peripheral components or devices.

The at least one processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1640 may be configured to operate at least one memory array using at least one memory controller. In some other cases, at least one memory controller may be integrated into the at least one processor 1640. The at least one processor 1640 may be configured to execute computer-readable instructions stored in at least one memory (e.g., the at least one memory 1630) to cause the device 1605 to perform various functions (e.g., functions or tasks supporting deployment of a private network using integration with a trusted backup network). For example, the device 1605 or a component of the device 1605 may include at least one processor 1640 and memory 1630 coupled with or to the at least one processor 1640, the at least one processor 1640 and the at least one memory 1630 configured to perform various functions described herein.

Additionally, or alternatively, the communications manager 1620 may support wireless communication at a gateway function of a first network type in accordance with examples as disclosed herein. For example, the communications manager 1620 is capable of, configured to, or operable to support a means for receiving a first message including a first request to establish, as part of a network integration, an interface between the gateway function of the first network type and a network intelligent controller of a second network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The communications manager 1620 is capable of, configured to, or operable to support a means for receiving, based on the network integration and a failed connection between a wireless device and the second network type, a second message including a second request to establish a connection with the wireless device in accordance with the first RAT, the failed connection associated with the second RAT. The communications manager 1620 is capable of, configured to, or operable to support a means for transmitting, to the network intelligent controller of the second network type via the interface, a third message indicating that the connection between the gateway function of the first network type and the wireless device is established.

By including or configuring the communications manager 1620 in accordance with examples as described herein, the device 1605 may support techniques for improved communication reliability, improved user experience related to reduced processing, reduced power consumption, and more efficient utilization of communication resources during deployment of a network, among other possibilities.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the at least one processor 1640, the at least one memory 1630, the code 1635, or any combination thereof. For example, the code 1635 may include instructions executable by the at least one processor 1640 to cause the device 1605 to perform various aspects of deployment of a private network using integration with a trusted backup network as described herein, or the at least one processor 1640 and the at least one memory 1630 may be otherwise configured to perform or support such operations.

Figure 17:
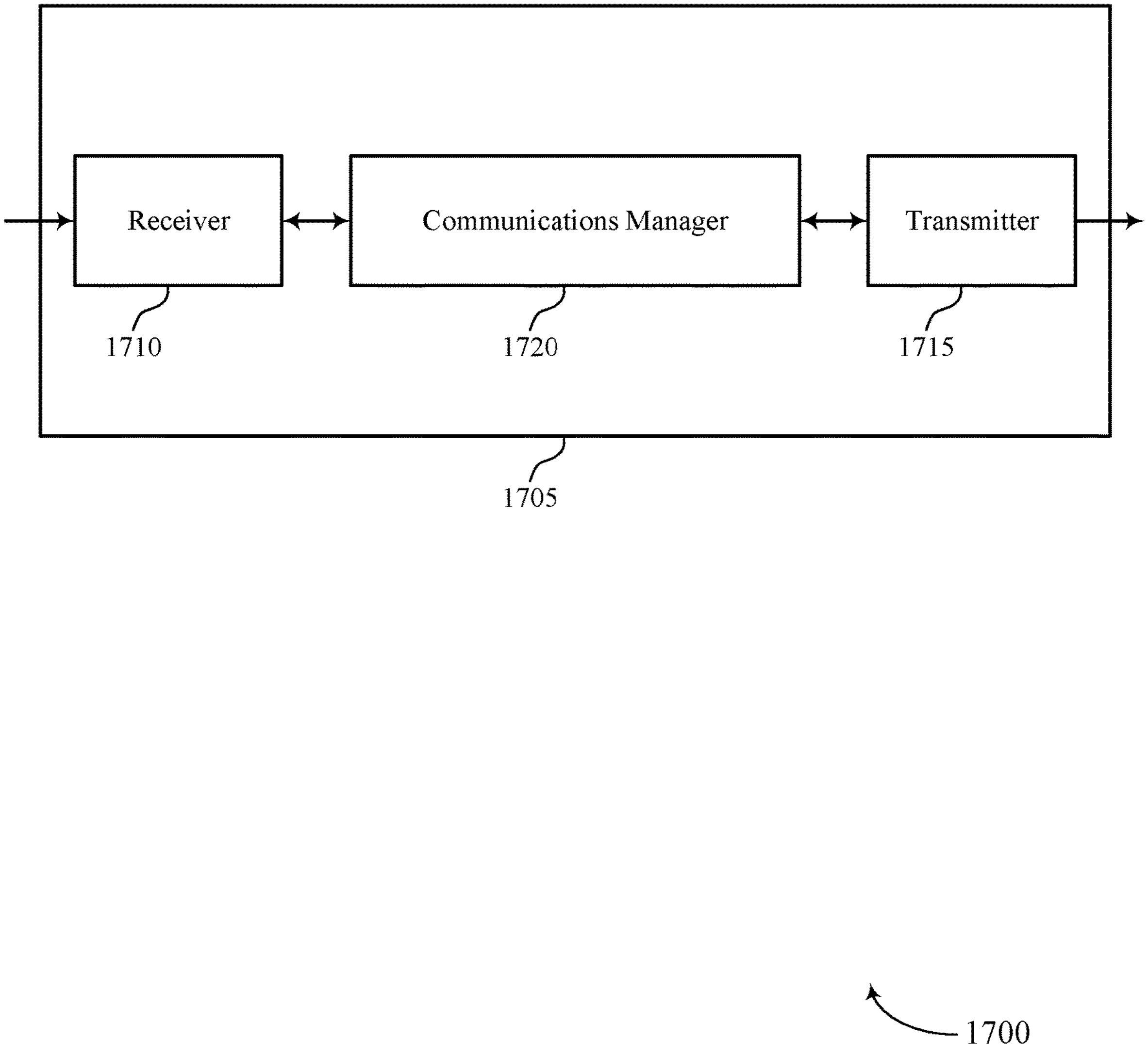
FIGS. 17 and 18 show block diagrams of devices that support deployment of a private network using integration with a trusted backup network in accordance with one or more aspects of the present disclosure.

FIG. 17 shows a block diagram 1700 of a device 1705 that supports deployment of a private network using integration with a trusted backup network in accordance with one or more aspects of the present disclosure. The device 1705 may be an example of aspects of a network intelligent controller as described herein. The device 1705 may include a receiver 1710, a transmitter 1715, and a communications manager 1720. The device 1705 may also include at least one processor. Each of these components may be in communication with one another (e.g., via one or more buses).

The receiver 1710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1705. In some examples, the receiver 1710 may support obtaining information by receiving signals via one or more antennas. Additionally, or alternatively, the receiver 1710 may support obtaining information by receiving signals via one or more wired (e.g., electrical, fiber optic) interfaces, wireless interfaces, or any combination thereof.

The transmitter 1715 may provide a means for outputting (e.g., transmitting, providing, conveying, sending) information generated by other components of the device 1705. For example, the transmitter 1715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1715 may support outputting information by transmitting signals via one or more antennas. Additionally, or alternatively, the transmitter 1715 may support outputting information by transmitting signals via one or more wired (e.g., electrical, fiber optic) interfaces, wireless interfaces, or any combination thereof. In some examples, the transmitter 1715 and the receiver 1710 may be co-located in a transceiver, which may include or be coupled with a modem.

The communications manager 1720, the receiver 1710, the transmitter 1715, or various combinations thereof or various components thereof may be examples of means for performing various aspects of deployment of a private network using integration with a trusted backup network as described herein. For example, the communications manager 1720, the receiver 1710, the transmitter 1715, or various combinations or components thereof may support a method for performing one or more of the functions described herein.

In some examples, the communications manager 1720, the receiver 1710, the transmitter 1715, or various combinations or components thereof may be implemented in hardware (e.g., in communications management circuitry). The hardware may include at least one processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, in some examples, the communications manager 1720, the receiver 1710, the transmitter 1715, or various combinations or components thereof may be implemented in code (e.g., as communications management software or firmware) executed by at least one processor. If implemented in code executed by at least one processor, the functions of the communications manager 1720, the receiver 1710, the transmitter 1715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1720 may be configured to perform various operations (e.g., receiving, obtaining, monitoring, outputting, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to obtain information, output information, or perform various other operations as described herein.

Additionally, or alternatively, the communications manager 1720 may support wireless communication at a network intelligent controller of a second network type in accordance with examples as disclosed herein. For example, the communications manager 1720 is capable of, configured to, or operable to support a means for transmitting a first message including a request to establish, as part of a network integration, an interface between the network intelligent controller of the second network type and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The communications manager 1720 is capable of, configured to, or operable to support a means for receiving, via the interface, a second message indicating that a connection between the gateway function of the first network type and a wireless device is established in accordance with the first RAT, the connection between the gateway function and the wireless device established based on a failed connection between the wireless device and the second network type, the failed connection associated with the second RAT. The communications manager 1720 is capable of, configured to, or operable to support a means for performing a communication management operation for one or more RAN components of the second network type based on the second message.

Additionally, or alternatively, the communications manager 1720 may support wireless communication at a network intelligent controller of a second network type in accordance with examples as disclosed herein. For example, the communications manager 1720 is capable of, configured to, or operable to support a means for establishing, as part of a network integration, an interface between the network intelligent controller and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The communications manager 1720 is capable of, configured to, or operable to support a means for receiving, periodically via the interface, an indication of one or more KPIs associated with a connection between a wireless device and the second network type. The communications manager 1720 is capable of, configured to, or operable to support a means for performing, based on the one or more KPIs, a communication management operation for one or more network entities of the second network type.

By including or configuring the communications manager 1720 in accordance with examples as described herein, the device 1705 (e.g., at least one processor controlling or otherwise coupled with the receiver 1710, the transmitter 1715, the communications manager 1720, or a combination thereof) may support techniques for reduced processing, reduced power consumption, and more efficient utilization of communication resources during deployment of a network, among other possibilities.

Figure 18:
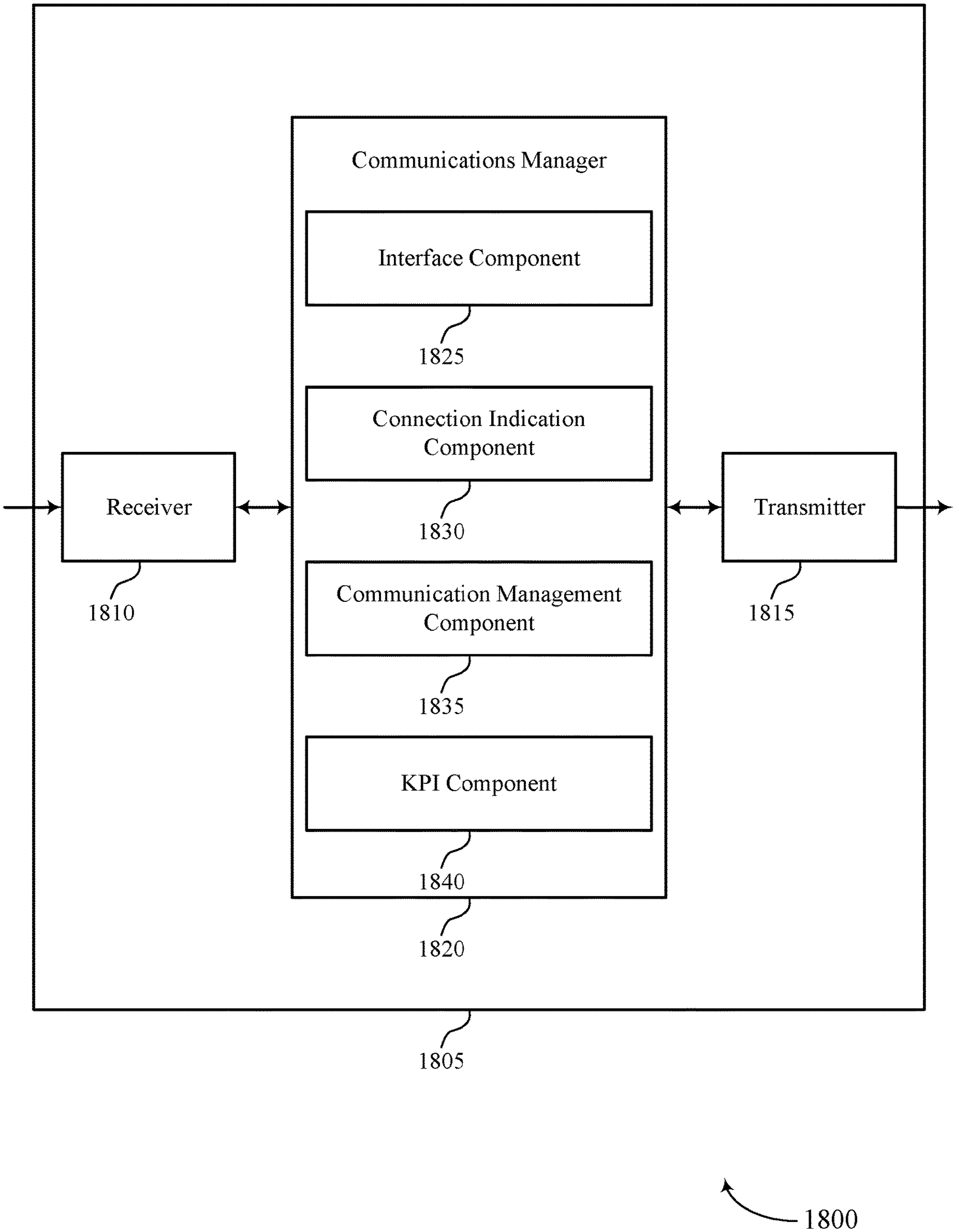

FIG. 18 shows a block diagram 1800 of a device 1805 that supports deployment of a private network using integration with a trusted backup network in accordance with one or more aspects of the present disclosure. The device 1805 may be an example of aspects of a device 1705 or a network intelligent controller as described herein. The device 1805 may include a receiver 1810, a transmitter 1815, and a communications manager 1820. The device 1805 may also include at least one processor. Each of these components may be in communication with one another (e.g., via one or more buses).

The receiver 1810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1805. In some examples, the receiver 1810 may support obtaining information by receiving signals via one or more antennas. Additionally, or alternatively, the receiver 1810 may support obtaining information by receiving signals via one or more wired (e.g., electrical, fiber optic) interfaces, wireless interfaces, or any combination thereof.

The transmitter 1815 may provide a means for outputting (e.g., transmitting, providing, conveying, sending) information generated by other components of the device 1805. For example, the transmitter 1815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1815 may support outputting information by transmitting signals via one or more antennas. Additionally, or alternatively, the transmitter 1815 may support outputting information by transmitting signals via one or more wired (e.g., electrical, fiber optic) interfaces, wireless interfaces, or any combination thereof. In some examples, the transmitter 1815 and the receiver 1810 may be co-located in a transceiver, which may include or be coupled with a modem.

The device 1805, or various components thereof, may be an example of means for performing various aspects of deployment of a private network using integration with a trusted backup network as described herein. For example, the communications manager 1820 may include an interface component 1825, a connection indication component 1830, a communication management component 1835, a KPI component 1840, or any combination thereof. The communications manager 1820 may be an example of aspects of a communications manager 1720 as described herein. In some examples, the communications manager 1820, or various components thereof, may be configured to perform various operations (e.g., receiving, obtaining, monitoring, outputting, transmitting) using or otherwise in cooperation with the receiver 1810, the transmitter 1815, or both. For example, the communications manager 1820 may receive information from the receiver 1810, send information to the transmitter 1815, or be integrated in combination with the receiver 1810, the transmitter 1815, or both to obtain information, output information, or perform various other operations as described herein.

The communications manager 1820 may support wireless communication at a network intelligent controller of a second network type in accordance with examples as disclosed herein. The interface component 1825 is capable of, configured to, or operable to support a means for transmitting a first message including a request to establish, as part of a network integration, an interface between the network intelligent controller of the second network type and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The connection indication component 1830 is capable of, configured to, or operable to support a means for receiving, via the interface, a second message indicating that a connection between the gateway function of the first network type and a wireless device is established in accordance with the first RAT, the connection between the gateway function and the wireless device established based on a failed connection between the wireless device and the second network type, the failed connection associated with the second RAT. The communication management component 1835 is capable of, configured to, or operable to support a means for performing a communication management operation for one or more RAN components of the second network type based on the second message.

Additionally, or alternatively, the communications manager 1820 may support wireless communication at a network intelligent controller of a second network type in accordance with examples as disclosed herein. The interface component 1825 is capable of, configured to, or operable to support a means for establishing, as part of a network integration, an interface between the network intelligent controller and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The KPI component 1840 is capable of, configured to, or operable to support a means for receiving, periodically via the interface, an indication of one or more KPIs associated with a connection between a wireless device and the second network type. The communication management component 1835 is capable of, configured to, or operable to support a means for performing, based on the one or more KPIs, a communication management operation for one or more network entities of the second network type.

Figure 19:
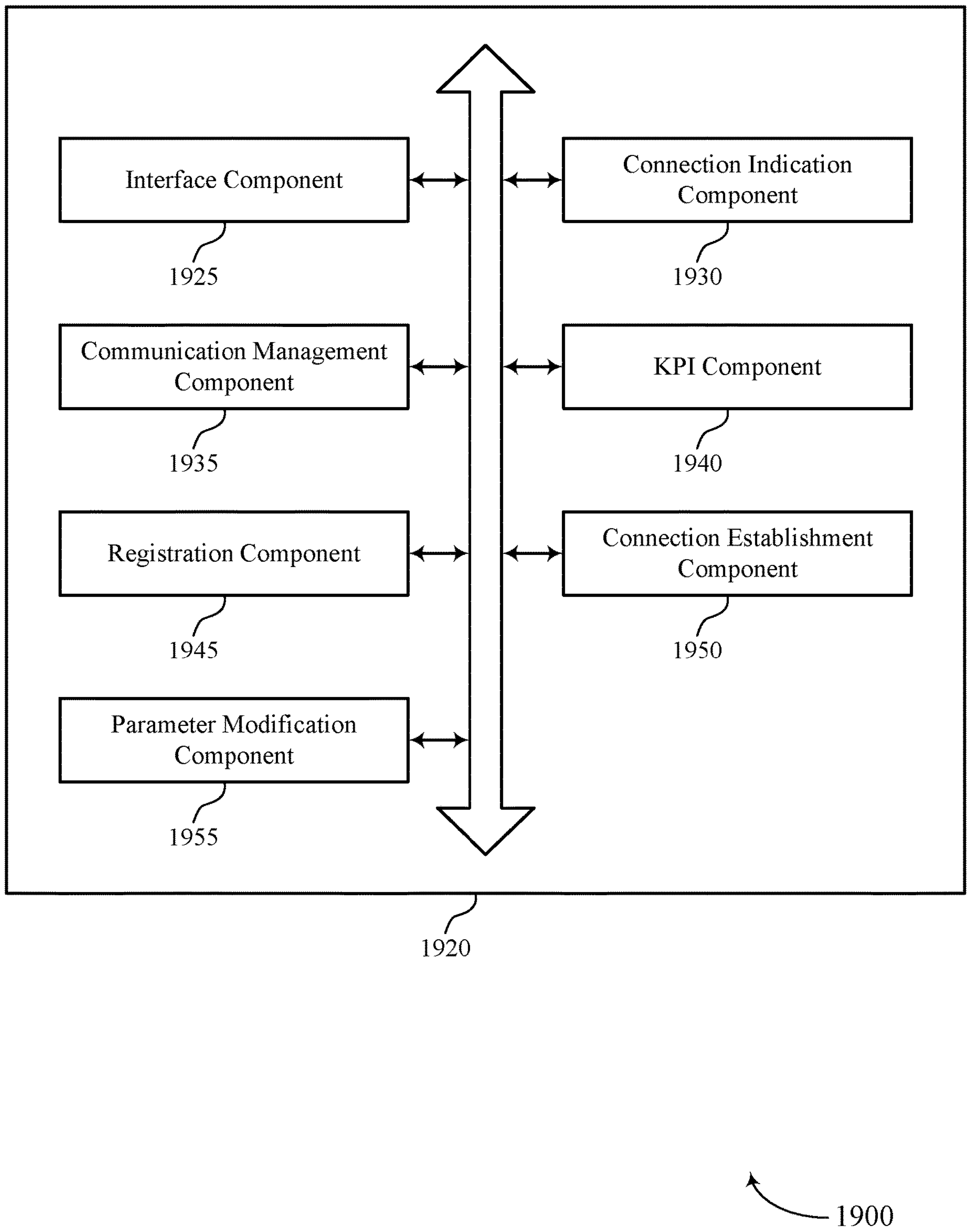
FIG. 19 shows a block diagram of a communications manager that supports deployment of a private network using integration with a trusted backup network in accordance with one or more aspects of the present disclosure.

FIG. 19 shows a block diagram 1900 of a communications manager 1920 that supports deployment of a private network using integration with a trusted backup network in accordance with one or more aspects of the present disclosure. The communications manager 1920 may be an example of aspects of a communications manager 1720, a communications manager 1820, or both, as described herein. The communications manager 1920, or various components thereof, may be an example of means for performing various aspects of deployment of a private network using integration with a trusted backup network as described herein. For example, the communications manager 1920 may include an interface component 1925, a connection indication component 1930, a communication management component 1935, a KPI component 1940, a registration component 1945, a connection establishment component 1950, a parameter modification component 1955, or any combination thereof. Each of these components may communicate, directly or indirectly, with one another (e.g., via one or more buses).

Additionally, or alternatively, the communications manager 1920 may support wireless communication at a network intelligent controller of a second network type in accordance with examples as disclosed herein. The interface component 1925 is capable of, configured to, or operable to support a means for transmitting a first message including a request to establish, as part of a network integration, an interface between the network intelligent controller of the second network type and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The connection indication component 1930 is capable of, configured to, or operable to support a means for receiving, via the interface, a second message indicating that a connection between the gateway function of the first network type and a wireless device is established in accordance with the first RAT, the connection between the gateway function and the wireless device established based on a failed connection between the wireless device and the second network type, the failed connection associated with the second RAT. The communication management component 1935 is capable of, configured to, or operable to support a means for performing a communication management operation for one or more RAN components of the second network type based on the second message.

In some examples, the registration component 1945 is capable of, configured to, or operable to support a means for receiving, via the interface, a third message indicating that a registration between the wireless device and the second network type failed, where the third message includes an ID of the wireless device and an ID of an AP associated with the first network type.

In some examples, the communication management component 1935 is capable of, configured to, or operable to support a means for performing a second communication management operation for the one or more RAN components of the second network type based on the third message.

In some examples, the connection indication component 1930 is capable of, configured to, or operable to support a means for transmitting, to one or more network entities of the second network type based on the second message, a control request that indicates the connection between the gateway function and the wireless device is established, where the control request indicates one or more network optimization parameters associated with the communication management operation.

In some examples, the connection establishment component 1950 is capable of, configured to, or operable to support a means for establishing, before receiving the second message, a first connection with the wireless device via the second network type in accordance with the second RAT, where the connection between the gateway function and the wireless device is based on a failure of the first connection.

In some examples, to support performing the communication management operation, the parameter modification component 1955 is capable of, configured to, or operable to support a means for modifying an allocation of one or more radio resources within the second network type. In some examples, to support performing the communication management operation, the parameter modification component 1955 is capable of, configured to, or operable to support a means for modifying one or more parameters associated with radio access control for the second network type. In some examples, to support performing the communication management operation, the parameter modification component 1955 is capable of, configured to, or operable to support a means for modifying one or more parameters associated with a connection management for the second network type. In some examples, to support performing the communication management operation, the parameter modification component 1955 is capable of, configured to, or operable to support a means for modifying one or more parameters associated with a mobility management for the second network type.

In some examples, the first network type includes a trusted non-3GPP network and the second network type includes a 3GPP network.

In some examples, the network intelligent controller includes a near-RT intelligent controller of a network entity of the second network type.

Additionally, or alternatively, the communications manager 1920 may support wireless communication at a network intelligent controller of a second network type in accordance with examples as disclosed herein. In some examples, the interface component 1925 is capable of, configured to, or operable to support a means for establishing, as part of a network integration, an interface between the network intelligent controller and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The KPI component 1940 is capable of, configured to, or operable to support a means for receiving, periodically via the interface, an indication of one or more KPIs associated with a connection between a wireless device and the second network type. In some examples, the communication management component 1935 is capable of, configured to, or operable to support a means for performing, based on the one or more KPIs, a communication management operation for one or more network entities of the second network type.

In some examples, the registration component 1945 is capable of, configured to, or operable to support a means for receiving, via the interface, a message that indicates a successful registration between the wireless device and the second network type, where the message includes an ID of the wireless device and an ID of an AP associated with the first network type, and where periodically receiving the indication of the one or more KPIs is based on the successful registration.

In some examples, the KPI component 1940 is capable of, configured to, or operable to support a means for transmitting, via the interface, an indication that values of the one or more KPIs exceed a threshold, where the indication includes a trigger to disable a second connection between the wireless device and the gateway function of the first network type.

In some examples, to support performing the communication management operation, the KPI component 1940 is capable of, configured to, or operable to support a means for modifying one or more corrective network orchestration and optimization decisions for the one or more network entities of the second network type based on the one or more KPIs.

In some examples, the first network type includes a trusted non-third generation partnership project (3GPP) network and the second network type includes a 3GPP network.

In some examples, the network intelligent controller includes a non-RT intelligent controller of a network entity of the second network type.

Figure 20:
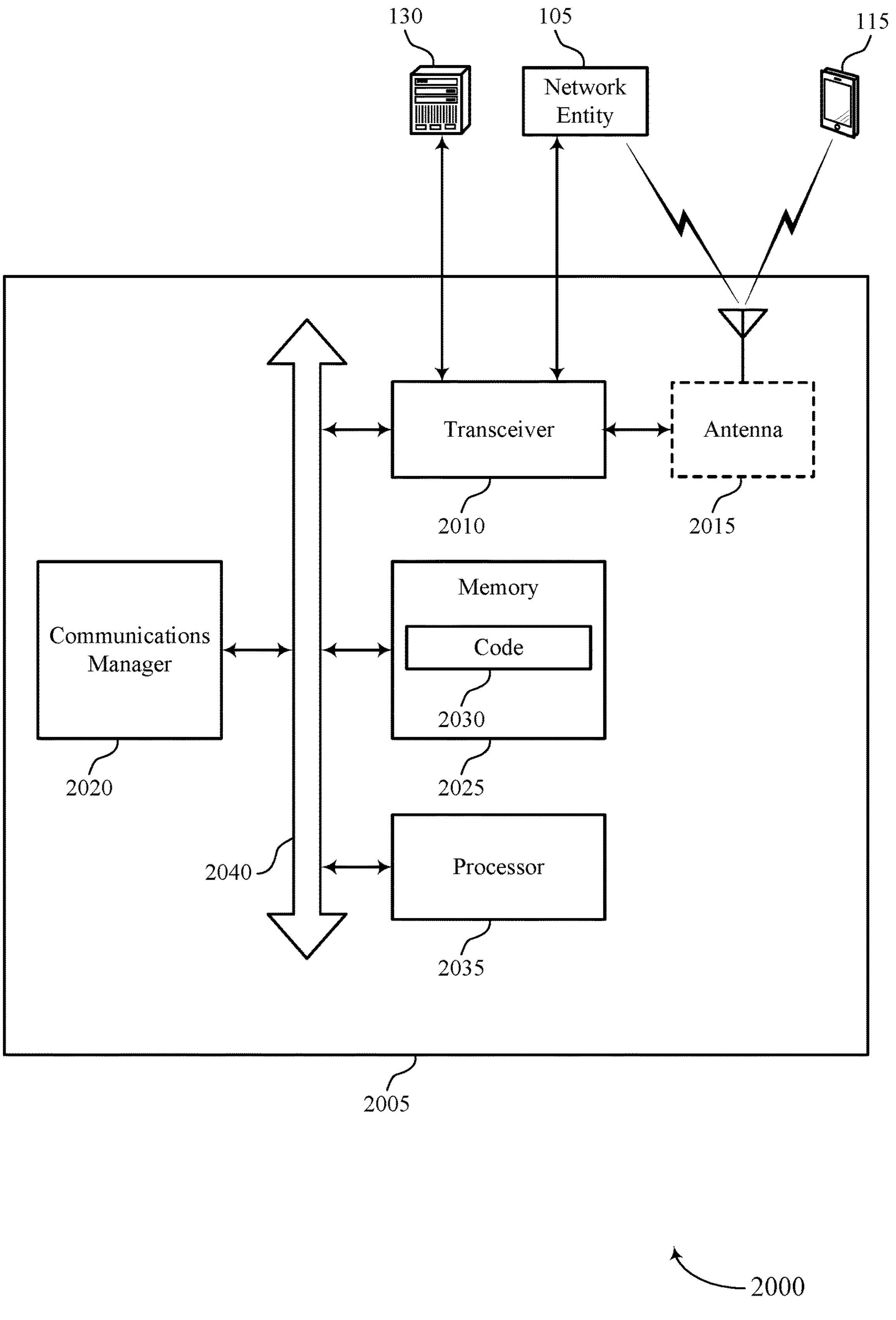
FIG. 20 shows a diagram of a system including a device that supports deployment of a private network using integration with a trusted backup network in accordance with one or more aspects of the present disclosure.

FIG. 20 shows a diagram of a system 2000 including a device 2005 that supports deployment of a private network using integration with a trusted backup network in accordance with one or more aspects of the present disclosure. The device 2005 may be an example of or include the components of a device 1705, a device 1805, or a network intelligent controller as described herein. The device 2005 may include components for bi-directional voice and data communications including components for transmitting and receiving communications, such as a communications manager 2020, a transceiver 2010, an antenna 2015, at least one memory 2025, code 2030, and at least one processor 2035. These components may be in electronic communication or otherwise coupled (e.g., operatively, communicatively, functionally, electronically, electrically) via one or more buses (e.g., a bus 2040).

The transceiver 2010 may support bi-directional communications via wired links, wireless links, or both as described herein. In some examples, the transceiver 2010 may include a wired transceiver and may communicate bi-directionally with another wired transceiver. Additionally, or alternatively, in some examples, the transceiver 2010 may include a wireless transceiver and may communicate bi-directionally with another wireless transceiver. In some examples, the device 2005 may include one or more antennas 2015, which may be capable of transmitting or receiving wireless transmissions (e.g., concurrently). The transceiver 2010 may also include a modem to modulate signals, to provide the modulated signals for transmission (e.g., by one or more antennas 2015, by a wired transmitter), to receive modulated signals (e.g., from one or more antennas 2015, from a wired receiver), and to demodulate signals. In some implementations, the transceiver 2010 may include one or more interfaces, such as one or more interfaces coupled with the one or more antennas 2015 that are configured to support various receiving or obtaining operations, or one or more interfaces coupled with the one or more antennas 2015 that are configured to support various transmitting or outputting operations, or a combination thereof. In some implementations, the transceiver 2010 may include or be configured for coupling with one or more processors or memory components that are operable to perform or support operations based on received or obtained information or signals, or to generate information or other signals for transmission or other outputting, or any combination thereof. In some implementations, the transceiver 2010, or the transceiver 2010 and the one or more antennas 2015, or the transceiver 2010 and the one or more antennas 2015 and one or more processors or memory components (for example, the at least one processor 2035, or the at least one memory 2025, or both), may be included in a chip or chip assembly that is installed in the device 2005. In some examples, the transceiver may be operable to support communications via one or more communications links (e.g., a communication link 125, a backhaul communication link 120, a midhaul communication link 162, a fronthaul communication link 168).

The at least one memory 2025 may include RAM and ROM. The at least one memory 2025 may store computer-readable, computer-executable code 2030 including instructions that, when executed by the at least one processor 2035, cause the device 2005 to perform various functions described herein. The code 2030 may be stored in a non-transitory computer-readable medium such as system memory or another type of memory. In some cases, the code 2030 may not be directly executable by the at least one processor 2035 but may cause a computer (e.g., when compiled and executed) to perform functions described herein. In some cases, the at least one memory 2025 may contain, among other things, a BIOS which may control basic hardware or software operation such as the interaction with peripheral components or devices.

The at least one processor 2035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 2035 may be configured to operate at least one memory array using at least one memory controller. In some other cases, at least one memory controller may be integrated into the at least one processor 2035. The at least one processor 2035 may be configured to execute computer-readable instructions stored in at least one memory (e.g., the at least one memory 2025) to cause the device 2005 to perform various functions (e.g., functions or tasks supporting deployment of a private network using integration with a trusted backup network). For example, the device 2005 or a component of the device 2005 may include at least one processor 2035 and at least one memory 2025 coupled with the at least one processor 2035, the at least one processor 2035 and the at least one memory 2025 configured to perform various functions described herein. The at least one processor 2035 may be an example of a cloud-computing platform (e.g., one or more physical nodes and supporting software such as operating systems, virtual machines, or container instances) that may host the functions (e.g., by executing code 2030) to perform the functions of the device 2005. The at least one processor 2035 may be any one or more suitable processors capable of executing scripts or instructions of one or more software programs stored in the device 2005 (such as within the at least one memory 2025). In some implementations, the at least one processor 2035 may be a component of a processing system. A processing system may generally refer to a system or series of machines or components that receives inputs and processes the inputs to produce a set of outputs (which may be passed to other systems or components of, for example, the device 2005). For example, a processing system of the device 2005 may refer to a system including the various other components or subcomponents of the device 2005, such as the at least one processor 2035, or the transceiver 2010, or the communications manager 2020, or other components or combinations of components of the device 2005. The processing system of the device 2005 may interface with other components of the device 2005, and may process information received from other components (such as inputs or signals) or output information to other components. For example, a chip or modem of the device 2005 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 2005 may transmit information output from the chip or modem. Additionally, or alternatively, in some implementations, the one or more interfaces may refer to an interface between the processing system of the chip or modem and a receiver, such that the device 2005 may obtain information or signal inputs, and the information may be passed to the processing system. A person having ordinary skill in the art will readily recognize that a first interface also may obtain information or signal inputs, and a second interface also may output information or signal outputs.

In some examples, a bus 2040 may support communications of (e.g., within) a protocol layer of a protocol stack. In some examples, a bus 2040 may support communications associated with a logical channel of a protocol stack (e.g., between protocol layers of a protocol stack), which may include communications performed within a component of the device 2005, or between different components of the device 2005 that may be co-located or located in different locations (e.g., where the device 2005 may refer to a system in which one or more of the communications manager 2020, the transceiver 2010, the at least one memory 2025, the code 2030, and the at least one processor 2035 may be located in one of the different components or divided between different components).

In some examples, the communications manager 2020 may manage aspects of communications with a core network 130 (e.g., via one or more wired or wireless backhaul links). For example, the communications manager 2020 may manage the transfer of data communications for client devices, such as one or more UEs 115. In some examples, the communications manager 2020 may manage communications with other network entities 105, and may include a controller or scheduler for controlling communications with UEs 115 in cooperation with other network entities 105. In some examples, the communications manager 2020 may support an X2 interface within an LTE/LTE-A wireless communications network technology to provide communication between network entities 105.

Additionally, or alternatively, the communications manager 2020 may support wireless communication at a network intelligent controller of a second network type in accordance with examples as disclosed herein. For example, the communications manager 2020 is capable of, configured to, or operable to support a means for transmitting a first message including a request to establish, as part of a network integration, an interface between the network intelligent controller of the second network type and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The communications manager 2020 is capable of, configured to, or operable to support a means for receiving, via the interface, a second message indicating that a connection between the gateway function of the first network type and a wireless device is established in accordance with the first RAT, the connection between the gateway function and the wireless device established based on a failed connection between the wireless device and the second network type, the failed connection associated with the second RAT. The communications manager 2020 is capable of, configured to, or operable to support a means for performing a communication management operation for one or more RAN components of the second network type based on the second message.

Additionally, or alternatively, the communications manager 2020 may support wireless communication at a network intelligent controller of a second network type in accordance with examples as disclosed herein. For example, the communications manager 2020 is capable of, configured to, or operable to support a means for establishing, as part of a network integration, an interface between the network intelligent controller and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The communications manager 2020 is capable of, configured to, or operable to support a means for receiving, periodically via the interface, an indication of one or more KPIs associated with a connection between a wireless device and the second network type. The communications manager 2020 is capable of, configured to, or operable to support a means for performing, based on the one or more KPIs, a communication management operation for one or more network entities of the second network type.

By including or configuring the communications manager 2020 in accordance with examples as described herein, the device 2005 may support techniques for improved communication reliability, improved user experience related to reduced processing, reduced power consumption, and more efficient utilization of communication resources during deployment of a network, among other possibilities.

In some examples, the communications manager 2020 may be configured to perform various operations (e.g., receiving, obtaining, monitoring, outputting, transmitting) using or otherwise in cooperation with the transceiver 2010, the one or more antennas 2015 (e.g., where applicable), or any combination thereof. Although the communications manager 2020 is illustrated as a separate component, in some examples, one or more functions described with reference to the communications manager 2020 may be supported by or performed by the transceiver 2010, the at least one processor 2035, the at least one memory 2025, the code 2030, or any combination thereof. For example, the code 2030 may include instructions executable by the at least one processor 2035 to cause the device 2005 to perform various aspects of deployment of a private network using integration with a trusted backup network as described herein, or the at least one processor 2035 and the at least one memory 2025 may be otherwise configured to perform or support such operations.

Figure 21:
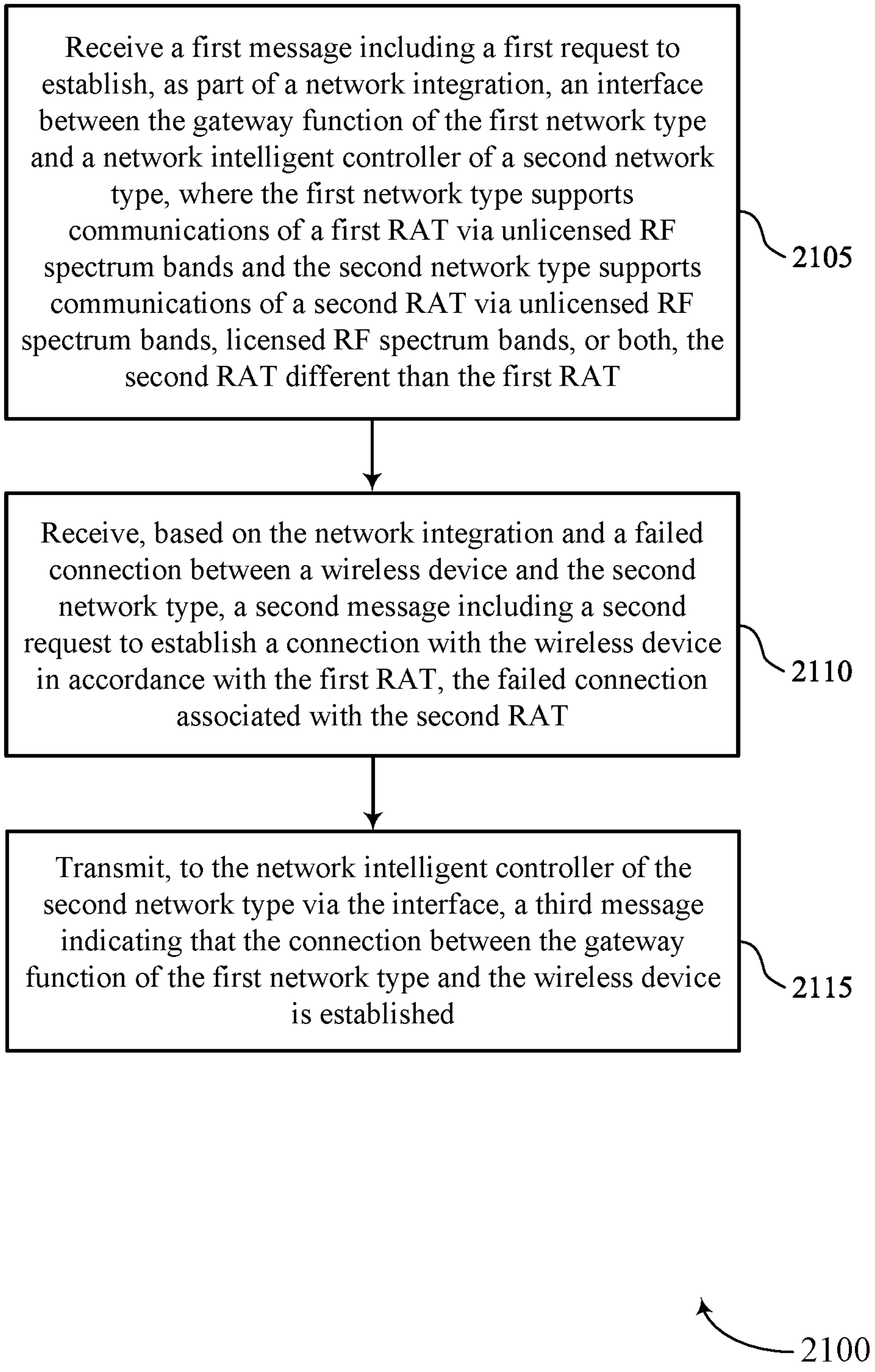
FIGS. 21 through 25 show flowcharts illustrating methods that support deployment of a private network using integration with a trusted backup network in accordance with one or more aspects of the present disclosure.

FIG. 21 shows a flowchart illustrating a method 2100 that supports deployment of a private network using integration with a trusted backup network in accordance with aspects of the present disclosure. The operations of the method 2100 may be implemented by a gateway function or its components as described herein. For example, the operations of the method 2100 may be performed by a gateway function as described with reference to FIGS. 1 through 16. In some examples, a gateway function may execute a set of instructions to control the functional elements of the gateway function to perform the described functions. Additionally, or alternatively, the gateway function may perform aspects of the described functions using special-purpose hardware.

At 2105, the method may include receiving a first message including a first request to establish, as part of a network integration, an interface between the gateway function of the first network type and a network intelligent controller of a second network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The operations of block 2105 may be performed in accordance with examples as disclosed herein. In some examples, aspects of the operations of 2105 may be performed by an interface component 1525 as described with reference to FIG. 15.

At 2110, the method may include receiving, based on the network integration and a failed connection between a wireless device and the second network type, a second message including a second request to establish a connection with the wireless device in accordance with the first RAT, the failed connection associated with the second RAT. The operations of block 2110 may be performed in accordance with examples as disclosed herein. In some examples, aspects of the operations of 2110 may be performed by a connection request component 1530 as described with reference to FIG. 15.

At 2115, the method may include transmitting, to the network intelligent controller of the second network type via the interface, a third message indicating that the connection between the gateway function of the first network type and the wireless device is established. The operations of block 2115 may be performed in accordance with examples as disclosed herein. In some examples, aspects of the operations of 2115 may be performed by a connection indication component 1535 as described with reference to FIG. 15.

Figure 22:
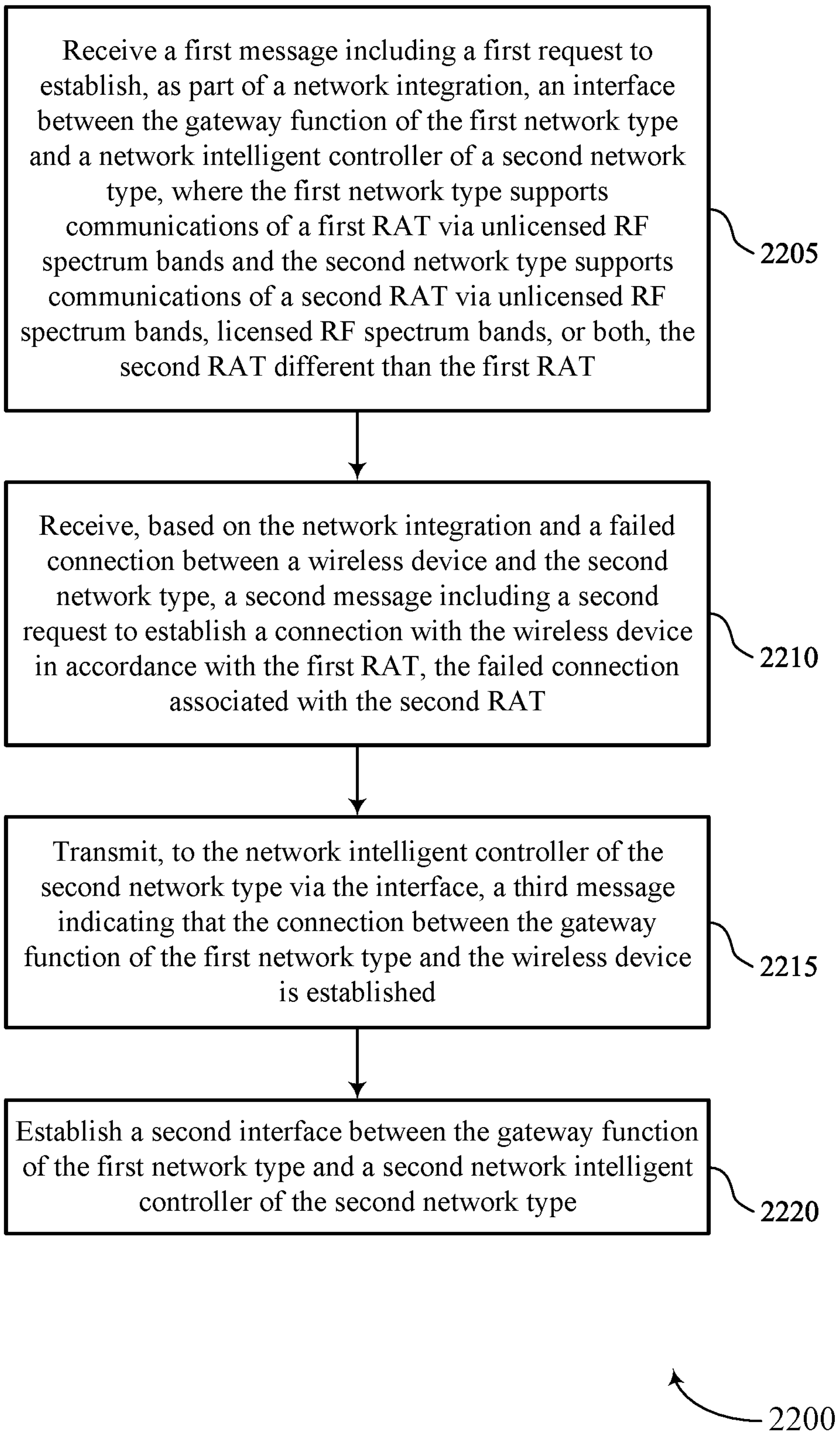

FIG. 22 shows a flowchart illustrating a method 2200 that supports deployment of a private network using integration with a trusted backup network in accordance with aspects of the present disclosure. The operations of the method 2200 may be implemented by a gateway function or its components as described herein. For example, the operations of the method 2200 may be performed by a gateway function as described with reference to FIGS. 1 through 16. In some examples, a gateway function may execute a set of instructions to control the functional elements of the gateway function to perform the described functions. Additionally, or alternatively, the gateway function may perform aspects of the described functions using special-purpose hardware.

At 2205, the method may include receiving a first message including a first request to establish, as part of a network integration, an interface between the gateway function of the first network type and a network intelligent controller of a second network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The operations of block 2205 may be performed in accordance with examples as disclosed herein. In some examples, aspects of the operations of 2205 may be performed by an interface component 1525 as described with reference to FIG. 15.

At 2210, the method may include receiving, based on the network integration and a failed connection between a wireless device and the second network type, a second message including a second request to establish a connection with the wireless device in accordance with the first RAT, the failed connection associated with the second RAT. The operations of block 2210 may be performed in accordance with examples as disclosed herein. In some examples, aspects of the operations of 2210 may be performed by a connection request component 1530 as described with reference to FIG. 15.

At 2215, the method may include transmitting, to the network intelligent controller of the second network type via the interface, a third message indicating that the connection between the gateway function of the first network type and the wireless device is established. The operations of block 2215 may be performed in accordance with examples as disclosed herein. In some examples, aspects of the operations of 2215 may be performed by a connection indication component 1535 as described with reference to FIG. 15.

At 2220, the method may include establishing a second interface between the gateway function of the first network type and a second network intelligent controller of the second network type. The operations of block 2220 may be performed in accordance with examples as disclosed herein. In some examples, aspects of the operations of 2220 may be performed by an interface component 1525 as described with reference to FIG. 15.

Figure 23:
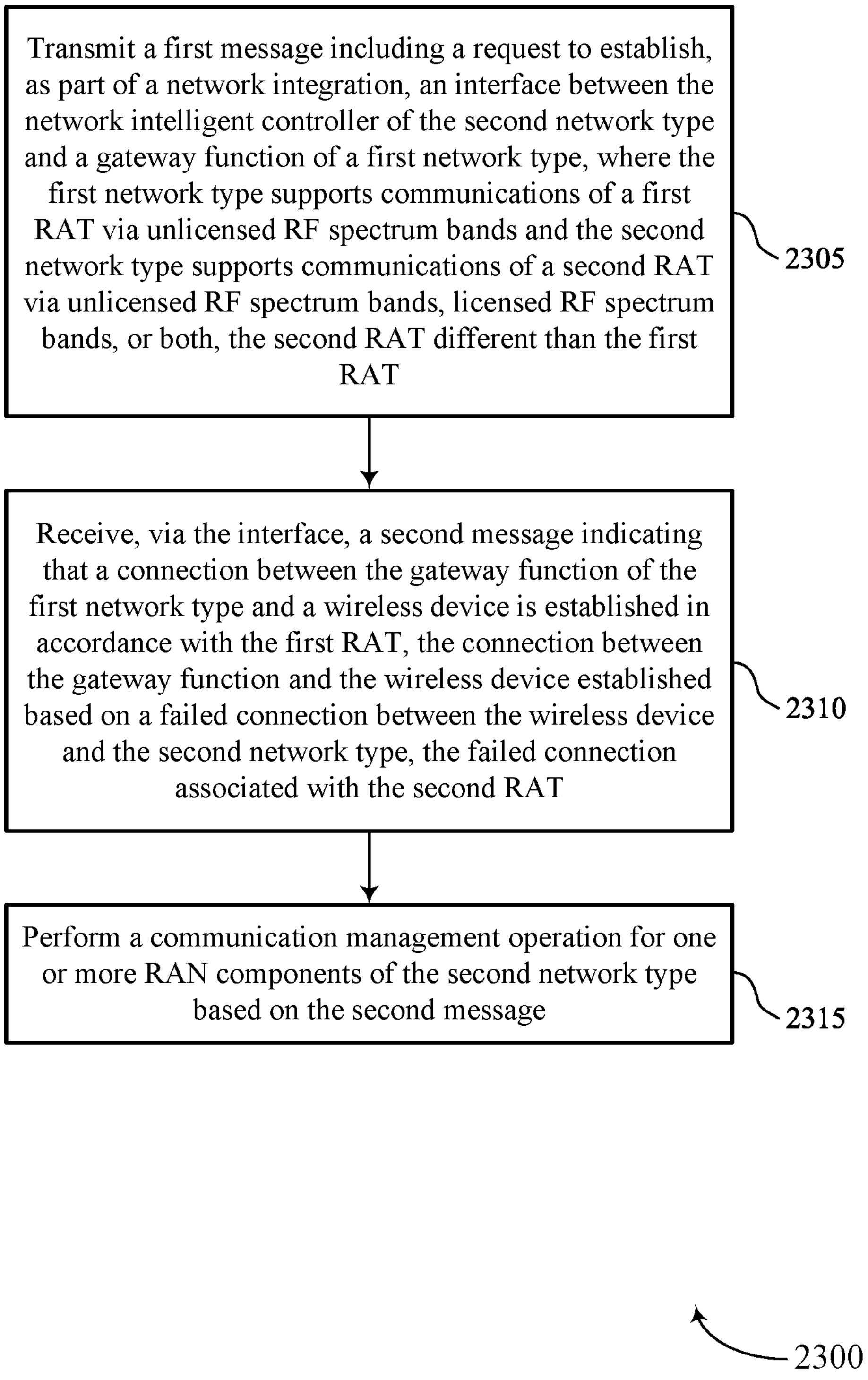

FIG. 23 shows a flowchart illustrating a method 2300 that supports deployment of a private network using integration with a trusted backup network in accordance with aspects of the present disclosure. The operations of the method 2300 may be implemented by a network intelligent controller or its components as described herein. For example, the operations of the method 2300 may be performed by a network intelligent controller as described with reference to FIGS. 1 through 12 and 17 through 20. In some examples, a network intelligent controller may execute a set of instructions to control the functional elements of the network intelligent controller to perform the described functions. Additionally, or alternatively, the network intelligent controller may perform aspects of the described functions using special-purpose hardware.

At 2305, the method may include transmitting a first message including a request to establish, as part of a network integration, an interface between the network intelligent controller of the second network type and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The operations of block 2305 may be performed in accordance with examples as disclosed herein. In some examples, aspects of the operations of 2305 may be performed by an interface component 1925 as described with reference to FIG. 19.

At 2310, the method may include receiving, via the interface, a second message indicating that a connection between the gateway function of the first network type and a wireless device is established in accordance with the first RAT, the connection between the gateway function and the wireless device established based on a failed connection between the wireless device and the second network type, the failed connection associated with the second RAT. The operations of block 2310 may be performed in accordance with examples as disclosed herein. In some examples, aspects of the operations of 2310 may be performed by a connection indication component 1930 as described with reference to FIG. 19.

At 2315, the method may include performing a communication management operation for one or more RAN components of the second network type based on the second message. The operations of block 2315 may be performed in accordance with examples as disclosed herein. In some examples, aspects of the operations of 2315 may be performed by a communication management component 1935 as described with reference to FIG. 19.

Figure 24:
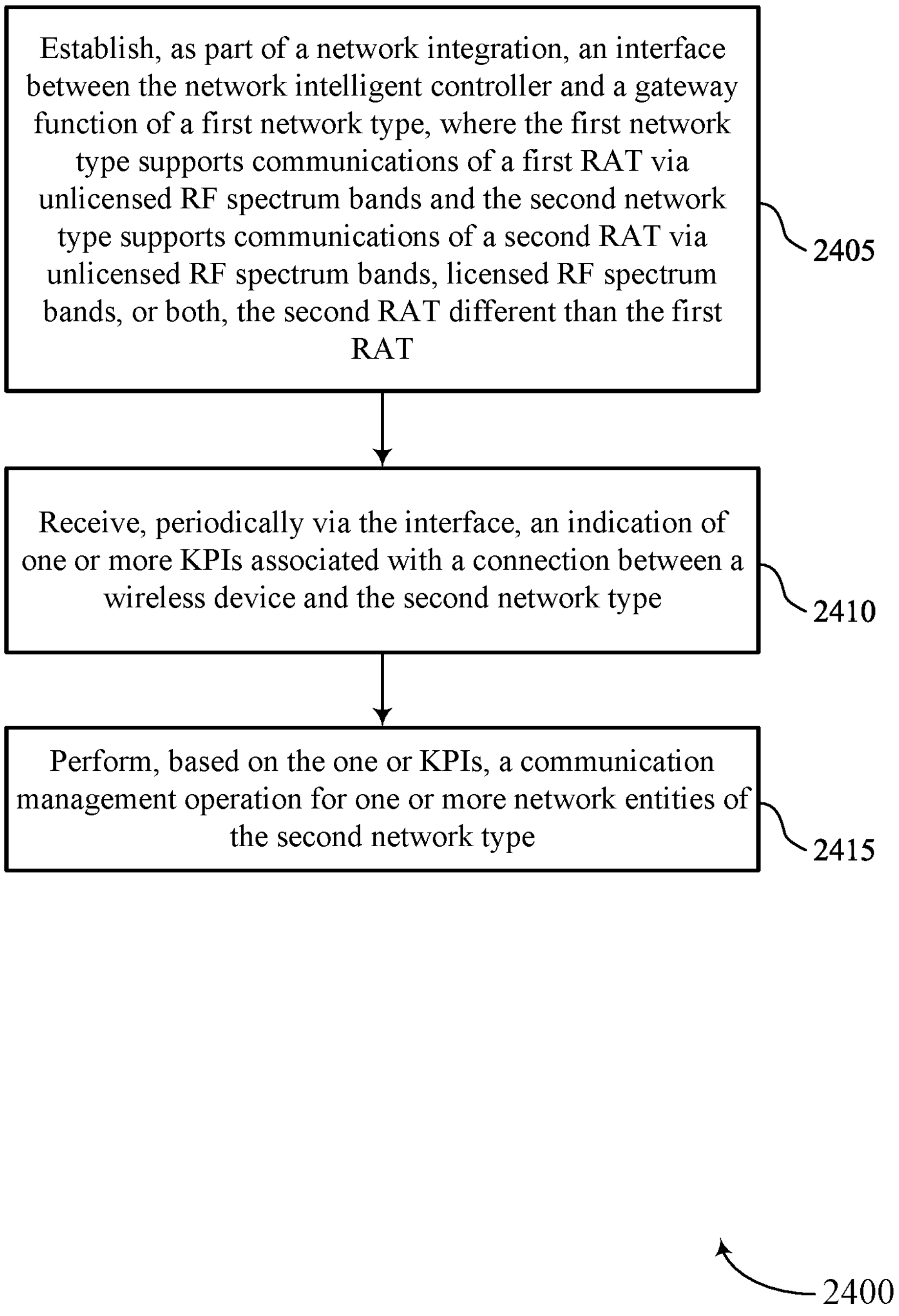

FIG. 24 shows a flowchart illustrating a method 2400 that supports deployment of a private network using integration with a trusted backup network in accordance with aspects of the present disclosure. The operations of the method 2400 may be implemented by a network intelligent controller or its components as described herein. For example, the operations of the method 2400 may be performed by a network intelligent controller as described with reference to FIGS. 1 through 12 and 17 through 20. In some examples, a network intelligent controller may execute a set of instructions to control the functional elements of the network intelligent controller to perform the described functions. Additionally, or alternatively, the network intelligent controller may perform aspects of the described functions using special-purpose hardware.

At 2405, the method may include establishing, as part of a network integration, an interface between the network intelligent controller and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The operations of block 2405 may be performed in accordance with examples as disclosed herein. In some examples, aspects of the operations of 2405 may be performed by an interface component 1925 as described with reference to FIG. 19.

At 2410, the method may include receiving, periodically via the interface, an indication of one or more KPIs associated with a connection between a wireless device and the second network type. The operations of block 2410 may be performed in accordance with examples as disclosed herein. In some examples, aspects of the operations of 2410 may be performed by a KPI component 1940 as described with reference to FIG. 19.

At 2415, the method may include performing, based on the one or more KPIs, a communication management operation for one or more network entities of the second network type. The operations of block 2415 may be performed in accordance with examples as disclosed herein. In some examples, aspects of the operations of 2415 may be performed by a communication management component 1935 as described with reference to FIG. 19.

Figure 25:
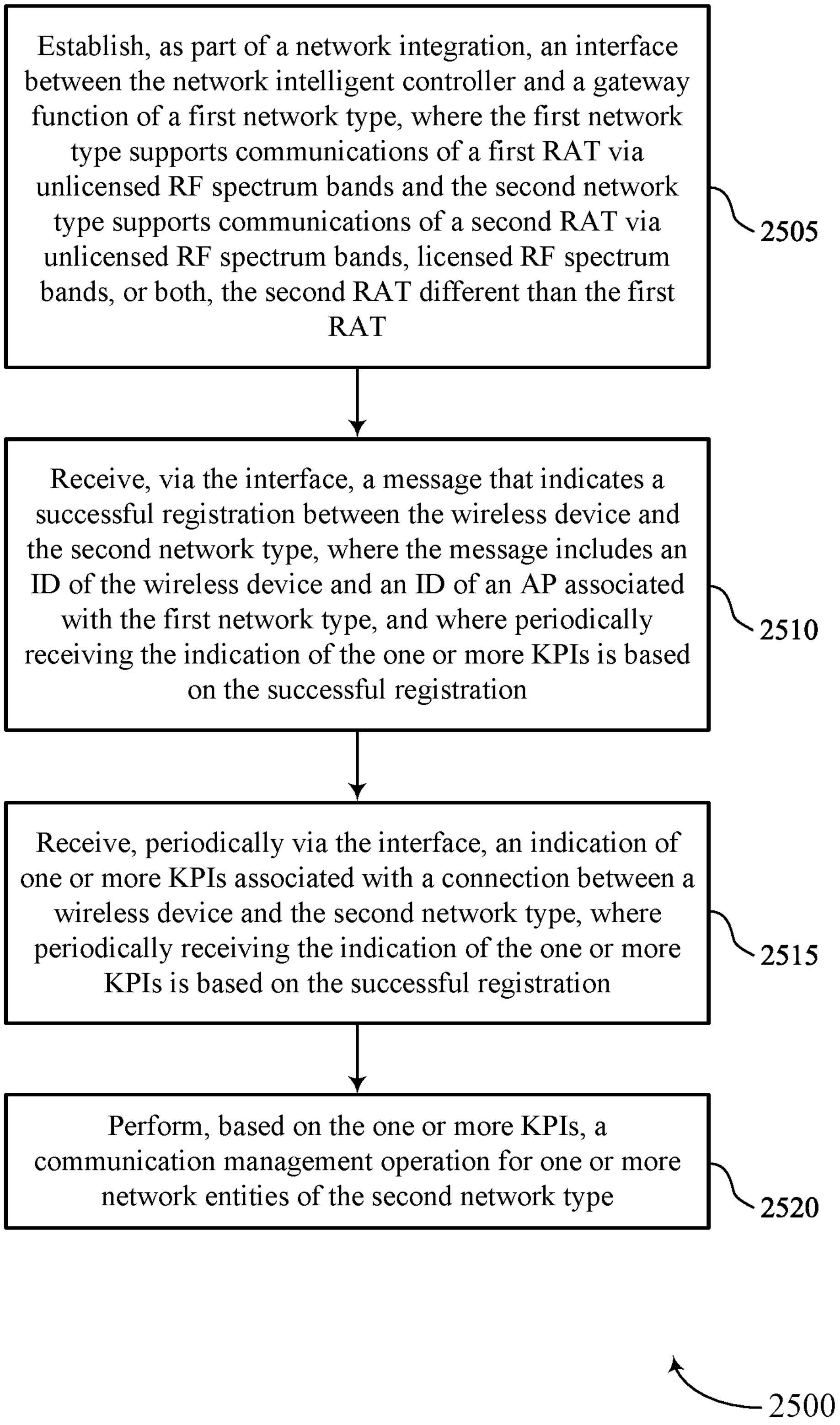

FIG. 25 shows a flowchart illustrating a method 2500 that supports deployment of a private network using integration with a trusted backup network in accordance with aspects of the present disclosure. The operations of the method 2500 may be implemented by a network intelligent controller or its components as described herein. For example, the operations of the method 2500 may be performed by a network intelligent controller as described with reference to FIGS. 1 through 12 and 17 through 20. In some examples, a network intelligent controller may execute a set of instructions to control the functional elements of the network intelligent controller to perform the described functions. Additionally, or alternatively, the network intelligent controller may perform aspects of the described functions using special-purpose hardware.

At 2505, the method may include establishing, as part of a network integration, an interface between the network intelligent controller and a gateway function of a first network type, where the first network type supports communications of a first RAT via unlicensed RF spectrum bands and the second network type supports communications of a second RAT via unlicensed RF spectrum bands, licensed RF spectrum bands, or both, the second RAT different than the first RAT. The operations of block 2505 may be performed in accordance with examples as disclosed herein. In some examples, aspects of the operations of 2505 may be performed by an interface component 1925 as described with reference to FIG. 19.

At 2510, the method may include receiving, via the interface, a message that indicates a successful registration between the wireless device and the second network type, where the message includes an ID of the wireless device and an ID of an AP associated with the first network type. The operations of block 2510 may be performed in accordance with examples as disclosed herein. In some examples, aspects of the operations of 2510 may be performed by a registration component 1945 as described with reference to FIG. 19.

At 2515, the method may include receiving, periodically via the interface, an indication of one or more KPIs associated with a connection between a wireless device and the second network type, where periodically receiving the indication of the one or more KPIs is based on the successful registration. The operations of block 2515 may be performed in accordance with examples as disclosed herein. In some examples, aspects of the operations of 2515 may be performed by a KPI component 1940 as described with reference to FIG. 19.

At 2520, the method may include performing, based on the one or more KPIs, a communication management operation for one or more network entities of the second network type. The operations of block 2520 may be performed in accordance with examples as disclosed herein. In some examples, aspects of the operations of 2520 may be performed by a communication management component 1935 as described with reference to FIG. 19.

The following provides an overview of aspects of the present disclosure:

Aspect 1: A method for wireless communication at a gateway function of a first network type, comprising: receiving a first message comprising a first request to establish, as part of a network integration, an interface between the gateway function of the first network type and a network intelligent controller of a second network type, wherein the first network type supports communications of a first RAT via unlicensed RF spectrum bands and the second network type supports communications of a second RAT via unlicensed RF spectrum bands, licensed RF spectrum bands, or both, the second RAT different than the first RAT; receiving, based at least in part on the network integration and a failed connection between a wireless device and the second network type, a second message comprising a second request to establish a connection with the wireless device in accordance with the first RAT, the failed connection associated with the second RAT; and transmitting, to the network intelligent controller of the second network type via the interface, a third message indicating that the connection between the gateway function of the first network type and the wireless device is established.

Aspect 2: The method of aspect 1, wherein receiving the second message comprises: receiving an indication of a GUTI, an IMSI, a SUPI, PLMN ID, NSAI, or any combination thereof associated with the wireless device.

Aspect 3: The method of any of aspects 1 through 2, wherein receiving the second message comprises: receiving an EAP message that indicates an ID of the wireless device and indicates the second request to establish the connection with the wireless device.

Aspect 4: The method of any of aspects 1 through 3, further comprising: transmitting, via the third message based at least in part on establishing the connection with the wireless device, an ID of the wireless device and an ID of an AP associated with the first network type.

Aspect 5: The method of any of aspects 1 through 4, further comprising: establishing a second interface between the gateway function of the first network type and a second network intelligent controller of the second network type.

Aspect 6: The method of aspect 5, further comprising: monitoring a registration between the wireless device and the second network type; and transmitting, via the second interface, a fourth message that indicates the registration between the wireless device and the second network type is successful, wherein the fourth message comprises an ID of the wireless device and an ID of an AP associated with the first network type.

Aspect 7: The method of any of aspects 5 through 6, further comprising: measuring one or more KPIs associated with a second connection between the wireless device and the second network type; and transmitting, via the second interface and in accordance with a periodicity, an indication of the one or more KPIs.

Aspect 8: The method of aspect 7, further comprising: receiving, via the second interface, an indication that values of the one or more KPIs exceed a threshold, wherein the indication comprises a trigger to disable the connection between the wireless device and the gateway function; disabling the connection between the wireless device and the gateway function based at least in part on the indication; and disabling the interface and the second interface based at least in part on the indication.

Aspect 9: The method of any of aspects 1 through 8, further comprising: receiving a resource release request based at least in part on a quality of a second connection between the wireless device and the second network type exceeding a threshold quality; disabling the connection between the gateway function of the first network type and the wireless device based at least in part on the resource release request; and transmitting, based at least in part on disabling the connection, an acknowledgment message responsive to the resource release request.

Aspect 10: The method of any of aspects 1 through 9, further comprising: monitoring a registration between the wireless device and the second network type; and transmitting, via the interface, a fourth message indicating that the registration between the wireless device and the second network type failed, wherein the fourth message comprises an ID of the wireless device and an ID of an AP associated with the first network type.

Aspect 11: The method of any of aspects 1 through 10, wherein the first network type comprises a trusted non-3GPP network and the second network type comprises a 3GPP network.

Aspect 12: A method for wireless communication at a network intelligent controller of a second network type, comprising: transmitting a first message comprising a request to establish, as part of a network integration, an interface between the network intelligent controller of the second network type and a gateway function of a first network type, wherein the first network type supports communications of a first RAT via unlicensed RF spectrum bands and the second network type supports communications of a second RAT via unlicensed RF spectrum bands, licensed RF spectrum bands, or both, the second RAT different than the first RAT; receiving, via the interface, a second message indicating that a connection between the gateway function of the first network type and a wireless device is established in accordance with the first RAT, the connection between the gateway function and the wireless device established based at least in part on a failed connection between the wireless device and the second network type, the failed connection associated with the second RAT; and performing a communication management operation for one or more RAN components of the second network type based at least in part on the second message.

Aspect 13: The method of aspect 12, further comprising: receiving, via the interface, a third message indicating that a registration between the wireless device and the second network type failed, wherein the third message comprises an ID of the wireless device and an ID of an AP associated with the first network type.

Aspect 14: The method of aspect 13, further comprising: performing a second communication management operation for the one or more RAN components of the second network type based at least in part on the third message.

Aspect 15: The method of any of aspects 12 through 14, further comprising: transmitting, to one or more network entities of the second network type based at least in part on the second message, a control request that indicates the connection between the gateway function and the wireless device is established, wherein the control request indicates one or more network optimization parameters associated with the communication management operation.

Aspect 16: The method of any of aspects 12 through 15, further comprising: establishing, before receiving the second message, a first connection with the wireless device via the second network type in accordance with the second RAT, wherein the connection between the gateway function and the wireless device is based at least in part on a failure of the first connection.

Aspect 17: The method of any of aspects 12 through 16, wherein performing the communication management operation comprises: modifying an allocation of one or more radio resources within the second network type; modifying one or more parameters associated with radio access control for the second network type; modifying one or more parameters associated with a connection management for the second network type; or modifying one or more parameters associated with a mobility management for the second network type.

Aspect 18: The method of any of aspects 12 through 17, wherein the first network type comprises a trusted non-3GPP network and the second network type comprises a 3GPP network.

Aspect 19: The method of any of aspects 12 through 18, wherein the network intelligent controller comprises a near-RT intelligent controller of a network entity of the second network type.

Aspect 20: A method for wireless communication at a network intelligent controller of a second network type, comprising: establishing, as part of a network integration, an interface between the network intelligent controller and a gateway function of a first network type, wherein the first network type supports communications of a first RAT via unlicensed RF spectrum bands and the second network type supports communications of a second RAT via unlicensed RF spectrum bands, licensed RF spectrum bands, or both, the second RAT different than the first RAT; receiving, periodically via the interface, an indication of one or more KPIs associated with a connection between a wireless device and the second network type; and performing, based at least in part on the one or more KPIs, a communication management operation for one or more network entities of the second network type.

Aspect 21: The method of aspect 20, further comprising: receiving, via the interface, a message that indicates a successful registration between the wireless device and the second network type, wherein the message comprises an ID of the wireless device and an ID of an AP associated with the first network type, and wherein periodically receiving the indication of the one or more KPIs is based at least in part on the successful registration.

Aspect 22: The method of any of aspects 20 through 21, further comprising: transmitting, via the interface, an indication that values of the one or more KPIs exceed a threshold, wherein the indication comprises a trigger to disable a second connection between the wireless device and the gateway function of the first network type.

Aspect 23: The method of any of aspects 20 through 22, wherein performing the communication management operation comprises: modifying one or more corrective network orchestration and optimization decisions for the one or more network entities of the second network type based at least in part on the one or more KPIs.

Aspect 24: The method of any of aspects 20 through 23, wherein the first network type comprises a trusted non-3GPP network and the second network type comprises a 3GPP network.

Aspect 25: The method of any of aspects 20 through 24, wherein the network intelligent controller comprises a non-RT intelligent controller of a network entity of the second network type.

Aspect 26: An apparatus for wireless communication at a gateway function of a first network type, comprising at least one processor; at least one memory coupled with the at least one processor; and instructions stored in the at least one memory and executable by the at least one processor to cause the apparatus to perform a method of any of aspects 1 through 11.

Aspect 27: An apparatus for wireless communication at a gateway function of a first network type, comprising at least one means for performing a method of any of aspects 1 through 11.

Aspect 28: A non-transitory computer-readable medium storing code for wireless communication at a gateway function of a first network type, the code comprising instructions executable by a processor to perform a method of any of aspects 1 through 11.

Aspect 29: An apparatus for wireless communication at a network intelligent controller of a second network type, comprising at least one processor; at least one memory coupled with the at least one processor; and instructions stored in the at least one memory and executable by the at least one processor to cause the apparatus to perform a method of any of aspects 12 through 19.

Aspect 30: An apparatus for wireless communication at a network intelligent controller of a second network type, comprising at least one means for performing a method of any of aspects 12 through 19.

Aspect 31: A non-transitory computer-readable medium storing code for wireless communication at a network intelligent controller of a second network type, the code comprising instructions executable by a processor to perform a method of any of aspects 12 through 19.

Aspect 32: An apparatus for wireless communication at a network intelligent controller of a second network type, comprising at least one processor; at least one memory coupled with the at least one processor; and instructions stored in the at least one memory and executable by the at least one processor to cause the apparatus to perform a method of any of aspects 20 through 25.

Aspect 33: An apparatus for wireless communication at a network intelligent controller of a second network type, comprising at least one means for performing a method of any of aspects 20 through 25.

Aspect 34: A non-transitory computer-readable medium storing code for wireless communication at a network intelligent controller of a second network type, the code comprising instructions executable by a processor to perform a method of any of aspects 20 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the at least one processor may be any processor, controller, microcontroller, or state machine. At least one processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by at least one processor, firmware, or any combination thereof. If implemented using software executed by at least one processor, the functions may be stored as or transmitted using one or more instructions or code of a computer-readable medium. Other examples and implementations are within the scope of the disclosure and appended claims. For example, due to the nature of software, functions described herein may be implemented using software executed by at least one processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a gateway function of a first network type, comprising:
- at least one processor;
- at least one memory coupled with the at least one processor; and
- instructions stored in the at least one memory and executable by the at least one processor to cause the apparatus to:
  - receive a first message comprising a first request to establish, as part of a network integration, an interface between the gateway function of the first network type and a network intelligent controller of a second network type, wherein the first network type supports communications of a first radio access technology via unlicensed radio frequency spectrum bands and the second network type supports communications of a second radio access technology via unlicensed radio frequency spectrum bands, licensed radio frequency spectrum bands, or both, the second radio access technology different than the first radio access technology;
  - receive, based at least in part on the network integration and a failed connection between a wireless device and the second network type, a second message comprising a second request to establish a connection with the wireless device in accordance with the first radio access technology, the failed connection associated with the second radio access technology; and
  - transmit, to the network intelligent controller of the second network type via the interface, a third message indicating that the connection between the gateway function of the first network type and the wireless device is established.

2. The apparatus of claim 1, wherein the instructions to receive the second message are executable by the at least one processor to cause the apparatus to:
- receive an indication of a globally unique temporary identifier, an international mobile subscriber identity, a subscription permanent identifier, public land mobile network identifier, network slice assistance information, or any combination thereof associated with the wireless device.

3. The apparatus of claim 1, wherein the instructions to receive the second message are executable by the at least one processor to cause the apparatus to:
- receive an early access protocol message that indicates an identifier of the wireless device and indicates the second request to establish the connection with the wireless device.

4. The apparatus of claim 1, wherein the instructions are further executable by the at least one processor to cause the apparatus to:
- transmit, via the third message based at least in part on establishing the connection with the wireless device, an identifier of the wireless device and an identifier of an access point associated with the first network type.

5. The apparatus of claim 1, wherein the instructions are further executable by the at least one processor to cause the apparatus to:
- establish a second interface between the gateway function of the first network type and a second network intelligent controller of the second network type.

6. The apparatus of claim 5, wherein the instructions are further executable by the at least one processor to cause the apparatus to:
- monitor a registration between the wireless device and the second network type; and
- transmit, via the second interface, a fourth message that indicates the registration between the wireless device and the second network type is successful, wherein the fourth message comprises an identifier of the wireless device and an identifier of an access point associated with the first network type.

7. The apparatus of claim 5, wherein the instructions are further executable by the at least one processor to cause the apparatus to:
measure one or more key performance indicators associated with a second connection between the wireless device and the second network type; and
transmit, via the second interface and in accordance with a periodicity, an indication of the one or more key performance indicators.

8. The apparatus of claim 7, wherein the instructions are further executable by the at least one processor to cause the apparatus to:
receive, via the second interface, an indication that values of the one or more key performance indicators exceed a threshold, wherein the indication comprises a trigger to disable the connection between the wireless device and the gateway function;
disable the connection between the wireless device and the gateway function based at least in part on the indication; and
disable the interface and the second interface based at least in part on the indication.

9. The apparatus of claim 1, wherein the instructions are further executable by the at least one processor to cause the apparatus to:
receive a resource release request based at least in part on a quality of a second connection between the wireless device and the second network type exceeding a threshold quality;
disable the connection between the gateway function of the first network type and the wireless device based at least in part on the resource release request; and
transmit, based at least in part on disabling the connection, an acknowledgment message responsive to the resource release request.

10. The apparatus of claim 1, wherein the instructions are further executable by the at least one processor to cause the apparatus to:
monitor a registration between the wireless device and the second network type; and
transmit, via the interface, a fourth message indicating that the registration between the wireless device and the second network type failed, wherein the fourth message comprises an identifier of the wireless device and an identifier of an access point associated with the first network type.

11. The apparatus of claim 1, wherein the first network type comprises a trusted non-third generation partnership project (3GPP) network and the second network type comprises a 3GPP network.

12. An apparatus for wireless communication at a network intelligent controller of a second network type, comprising:
at least one processor;
at least one memory coupled with the at least one processor; and
instructions stored in the at least one memory and executable by the at least one processor to cause the apparatus to:
transmit a first message comprising a request to establish, as part of a network integration, an interface between the network intelligent controller of the second network type and a gateway function of a first network type, wherein the first network type supports communications of a first radio access technology via unlicensed radio frequency spectrum bands and the second network type supports communications of a second radio access technology via unlicensed radio frequency spectrum bands, licensed radio frequency spectrum bands, or both, the second radio access technology different than the first radio access technology;
receive, via the interface, a second message indicating that a connection between the gateway function of the first network type and a wireless device is established in accordance with the first radio access technology, the connection between the gateway function and the wireless device established based at least in part on a failed connection between the wireless device and the second network type, the failed connection associated with the second radio access technology; and
perform a communication management operation for one or more radio access network components of the second network type based at least in part on the second message.

13. The apparatus of claim 12, wherein the instructions are further executable by the at least one processor to cause the apparatus to:
receive, via the interface, a third message indicating that a registration between the wireless device and the second network type failed, wherein the third message comprises an identifier of the wireless device and an identifier of an access point associated with the first network type.

14. The apparatus of claim 13, wherein the instructions are further executable by the at least one processor to cause the apparatus to:
perform a second communication management operation for the one or more radio access network components of the second network type based at least in part on the third message.

15. The apparatus of claim 12, wherein the instructions are further executable by the at least one processor to cause the apparatus to:
transmit, to one or more network entities of the second network type based at least in part on the second message, a control request that indicates the connection between the gateway function and the wireless device is established, wherein the control request indicates one or more network optimization parameters associated with the communication management operation.

16. The apparatus of claim 12, wherein the instructions are further executable by the at least one processor to cause the apparatus to:
establish, before receiving the second message, a first connection with the wireless device via the second network type in accordance with the second radio access technology, wherein the connection between the gateway function and the wireless device is based at least in part on a failure of the first connection.

17. The apparatus of claim 12, wherein the instructions to perform the communication management operation are executable by the at least one processor to cause the apparatus to:
modify an allocation of one or more radio resources within the second network type;
modify one or more parameters associated with radio access control for the second network type;
modify one or more parameters associated with a connection management for the second network type; or
modify one or more parameters associated with a mobility management for the second network type.

18. The apparatus of claim 12, wherein the first network type comprises a trusted non-third generation partnership project (3GPP) network and the second network type comprises a 3GPP network.

19. A method for wireless communication at a gateway function of a first network type, comprising:

receiving a first message comprising a first request to establish, as part of a network integration, an interface between the gateway function of the first network type and a network intelligent controller of a second network type, wherein the first network type supports communications of a first radio access technology via unlicensed radio frequency spectrum bands and the second network type supports communications of a second radio access technology via unlicensed radio frequency spectrum bands, licensed radio frequency spectrum bands, or both, the second radio access technology different than the first radio access technology;

receiving, based at least in part on the network integration and a failed connection between a wireless device and the second network type, a second message comprising a second request to establish a connection with the wireless device in accordance with the first radio access technology, the failed connection associated with the second radio access technology; and transmitting, to the network intelligent controller of the second network type via the interface, a third message indicating that the connection between the gateway function of the first network type and the wireless device is established.

20. The method of claim 19, wherein receiving the second message comprises:

receiving an indication of a globally unique temporary identifier, an international mobile subscriber identity, a subscription permanent identifier, public land mobile network identifier, network slice assistance information, or any combination thereof associated with the wireless device.

21. The method of claim 19, wherein receiving the second message comprises:

receiving an early access protocol message that indicates an identifier of the wireless device and indicates the second request to establish the connection with the wireless device.

22. The method of claim 19, further comprising:

transmitting, via the third message based at least in part on establishing the connection with the wireless device, an identifier of the wireless device and an identifier of an access point associated with the first network type.

23. The method of claim 19, further comprising:

establishing a second interface between the gateway function of the first network type and a second network intelligent controller of the second network type.

24. A method for wireless communication at a network intelligent controller of a second network type, comprising:

transmitting a first message comprising a request to establish, as part of a network integration, an interface between the network intelligent controller of the second network type and a gateway function of a first network type, wherein the first network type supports communications of a first radio access technology via unlicensed radio frequency spectrum bands and the second network type supports communications of a second radio access technology via unlicensed radio frequency spectrum bands, licensed radio frequency spectrum bands, or both, the second radio access technology different than the first radio access technology;

receiving, via the interface, a second message indicating that a connection between the gateway function of the first network type and a wireless device is established in accordance with the first radio access technology, the connection between the gateway function and the wireless device established based at least in part on a failed connection between the wireless device and the second network type, the failed connection associated with the second radio access technology; and performing a communication management operation for one or more radio access network components of the second network type based at least in part on the second message.

25. The method of claim 24, further comprising:

receiving, via the interface, a third message indicating that a registration between the wireless device and the second network type failed, wherein the third message comprises an identifier of the wireless device and an identifier of an access point associated with the first network type.

26. The method of claim 25, further comprising:

performing a second communication management operation for the one or more radio access network components of the second network type based at least in part on the third message.

27. The method of claim 24, further comprising:

transmitting, to one or more network entities of the second network type based at least in part on the second message, a control request that indicates the connection between the gateway function and the wireless device is established, wherein the control request indicates one or more network optimization parameters associated with the communication management operation.

28. The method of claim 24, further comprising:

establishing, before receiving the second message, a first connection with the wireless device via the second network type in accordance with the second radio access technology, wherein the connection between the gateway function and the wireless device is based at least in part on a failure of the first connection.

29. The method of claim 24, wherein performing the communication management operation comprises:

modifying an allocation of one or more radio resources within the second network type;

modifying one or more parameters associated with radio access control for the second network type;

modifying one or more parameters associated with a connection management for the second network type; or modifying one or more parameters associated with a mobility management for the second network type.

30. The method of claim 24, wherein the first network type comprises a trusted non-third generation partnership project (3GPP) network and the second network type comprises a 3GPP network.

* * * * *